United States Patent [19]
Sugauchi et al.

[11] Patent Number: 5,828,842
[45] Date of Patent: Oct. 27, 1998

[54] METHOD OF CREATING INFORMATION FOR EXECUTING NETWORK MANAGEMENT OPERATIONS FROM A SIMPLIFIED DEFINITION OF AN OPERATION SEQUENCE AND PROVIDING A NETWORK MANAGEMENT OPERATION SEQUENCE, USED IN THE INFORMATION

[75] Inventors: Kiminori Sugauchi; Michio Suzuki, both of Yokohama; Youji Kamata, Chigasaki; Shuji Watanuki; Takashi Aoyama, both of Yokohama, all of Japan

[73] Assignee: Hitachi, Ltd., Tokyo, Japan

[21] Appl. No.: 648,419

[22] Filed: May 15, 1996

[30] Foreign Application Priority Data

May 19, 1995 [JP] Japan .................................. 7-121112

[51] Int. Cl.⁶ .................................................. G06F 17/60
[52] U.S. Cl. .................... 395/200.53; 395/702; 395/705; 395/682; 395/683
[58] Field of Search ............................. 395/200.01, 682, 395/705, 702, 683, 200.53

[56] References Cited

U.S. PATENT DOCUMENTS

| | | | |
|---|---|---|---|
| 5,317,742 | 5/1994 | Bapat ....................................... | 395/680 |
| 5,504,906 | 4/1996 | Lutoff ...................................... | 395/682 |
| 5,519,868 | 5/1996 | Allen et al. .............................. | 395/705 |
| 5,586,255 | 12/1996 | Tanaka et al. ...................... | 395/200.53 |
| 5,632,035 | 5/1997 | Goodwin ................................. | 395/705 |

OTHER PUBLICATIONS

"Rec X.722, Guidelines for the Definition of Managed Objects", CCITT/ISO, 1992.

"Information Network", IN93–63, Technical Report of Institute of Electronics, Information and Communication Engineers of Japan, 1993, pp. 109–114. (Abstract only in English).

*Primary Examiner*—Kenneth S. Kim
*Attorney, Agent, or Firm*—Fay, Sharpe, Beall, Fagan, Minnich & McKee

[57] ABSTRACT

In a network management system in which a management application performs management operations on respective managed objects in a communication network, a template management portion stores a processing sequence described by the user into a database, and when a start request is given from a management application, a processing sequence execution portion issues a table generating request to an internal table generating portion. The internal table generating portion generates tables and then delivers an end report and the generated tables to the processing sequence execution portion, so that the processing sequence execution portion executes management operations for managed objects on the basis of the set of tables. The aforementioned processing is repeated whenever a start-up request arises from the management application. Thus, a user not only can describe behavior of management services without consciousness of a program language but also can execute management operations by describing the behavior.

8 Claims, 54 Drawing Sheets

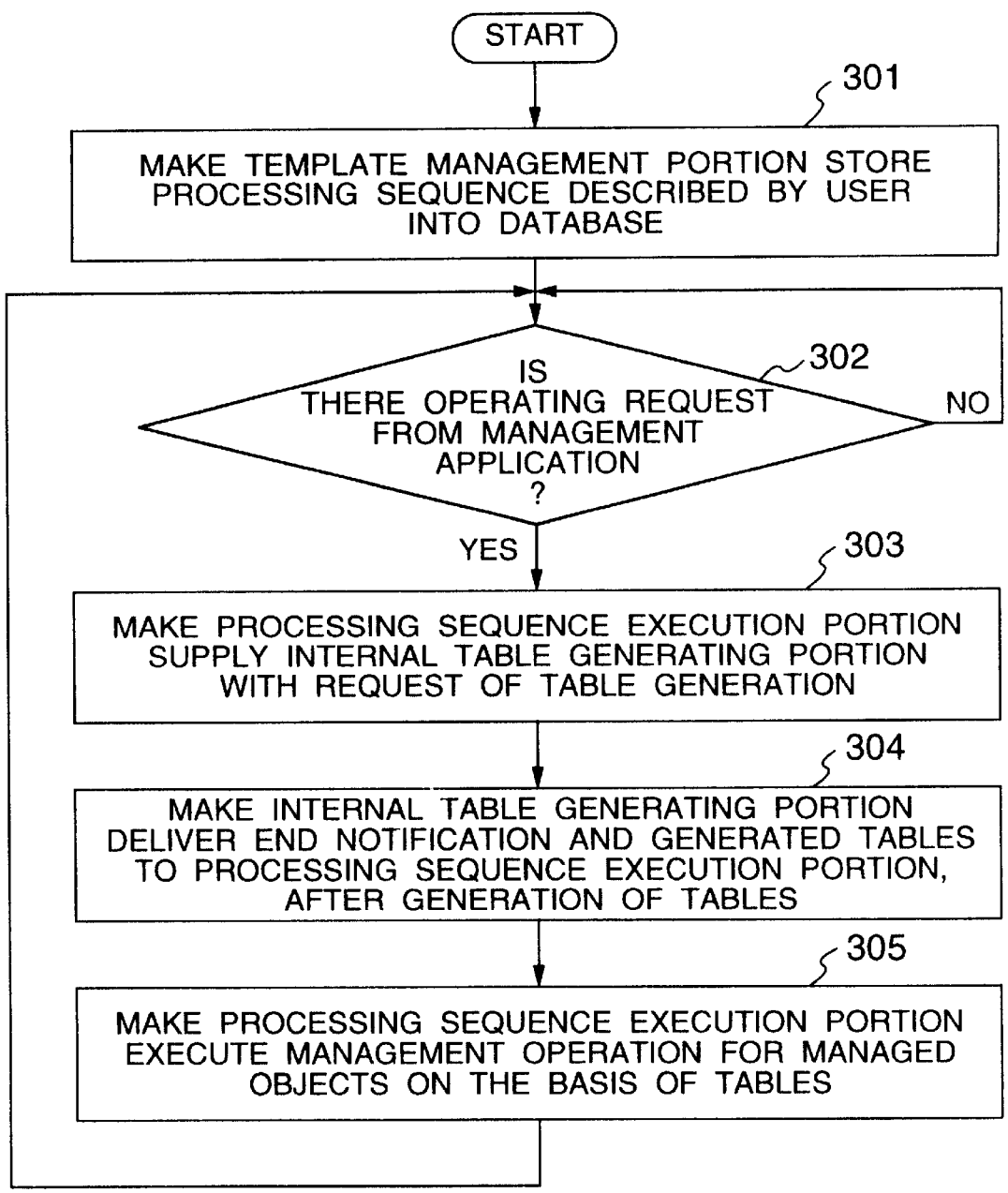

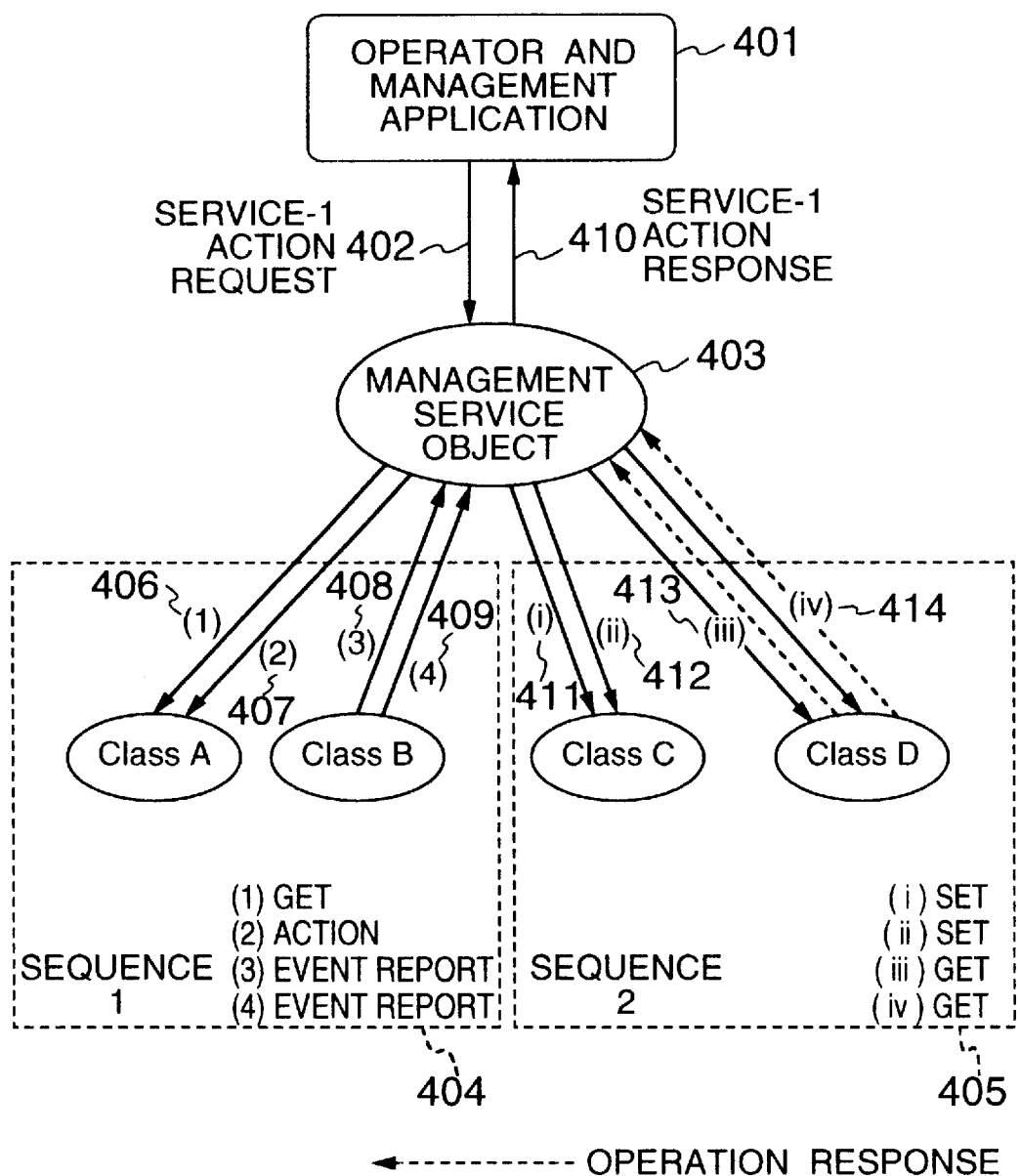

FIG. 5

```
seviceAnb NAME BINDING
  SUBORDINATE OBJECT CLASS serviceObj  ~502
  NAMED BY
  SUPERIOR OBJECT CLASS pr_seq;  ~503        } 501
  WITH ATTRIBUTE procOnjld;      ~504
  REGISTERD AS { } serviceObj MANAGED OBJECT CLASS
  DERIVED FROM pr_sequence;      ~506        } 505
  CHARACTERIZED BY service_pkg;  ~507
  REGISTERD AS { } service_pkg PACKAGE
  ACTIONS servieA;   ~509                    } 508
  REGISTERD AS { } serviceA ACTION
  BEHAVIOUR seviceA_Behav        ~513
  MODE CONFIRMED                             } 510
  WITH INFORMATION SYNTAX service_inf;  ~511
  WITH REPLY SYNTAX service_reply;      ~512
  REGISTERD AS { }

ASN. 1
sevice_inf ::= SEQUENCE {
  object1      [0] OBJECT IDENTIFIER,
  class        [1] OBJECT IDENTIFIER,
  para1        [2] INTEGER,
  para2        [3] PRINTABLE STRING
}                                            } 514 service_reply ::= SEQUENCE {
  para3  OBJECT IDENTIFIER;
  para4  PRINTABLE STRING;
}
```

FIG. 6

```
         serviceA_Behav BEHAVIOUR
           DEFINE AS
602 ─┐   ! OP_SEQUENCE; ─── 603
           CASE IND.class classA; ── 604
             IND.object1,classA : GET;              ┐
               attr 1;;                             ├ 606
             IND.object1,classA : ACTION ;          ┐
             ACTIONTYPE action1;                    │
               syntax1 IND.para1;                   ├ 607
               syntax2 IND.para2;                   │
608 ──── RETURN RSP.para3 syntax3;;                 ┘
           SCHEDULE : ── 609   ── 610
             IND.object2,classB : EVENT ;           ┐
             EVENTTYPE event1 ;                     │
             RETURN RSP.para3 event1.Notification ;;├ 611
           RESPONSE;; ── 612
           SCHEDULE_END : CYCLE 10 COUNT 2 ;;

CASE IND.class classC;
             IND.object1,classC : SET;
               attr2 TO value1;
               attr3 TO value2;;
             IND.object1,classC : SET;
               attr4 TO value3;;
           SCHEDULE :
             IND.object2,classD : GET;
               attr5;
               attr6;                              ├ 613
             RETURN RSP.para3 attr5;
             RETURN RSP.para4 attr6;
           RESPONSE ;;
602 ─┐   SCHEDULE_END : CYCLE 10 COUNT 2 ;;
     !
```

FIG. 7

OPERATION TYPE → KINDS OF OPERATION PARAMETERS

GET → "ATTRIBUTE" ⟵701

SET → "ATTRIBUTE"⟵701 FROM "ATTRIBUTE VALUE⟵702 BEFORE CHANGE"⟵703
TO "ATTRIBUTE VALUE AFTER CHANGE" ;
　　　　　704　　　　　　705

CREATE → "ATTRIBUTE"⟵701 "ATTRIBUTE VALUE"⟵706

DELETE → DELETE_RULE ;⟵707
　　　　KIND OF DELETE RULE ; ONLY_IF_NOCONTAINED-OBJECT
　　　　　　　　　　　　　　　　　　DELETE-CONTAINED-OBJECT

ACTION → ACTIONTYPE⟵708 "ACTION TYPE"⟵709 ;
"ACTION PARAMETER" "PARAMETER VALUE" ;
　　　710　　　　　　　　711

EVENT → "EVENT TYPE"⟵712

FIG. 8

```
asn1Syn1 ::= SEQUENCE {
    para1 INTEGER,
    para2 asn1Syn2  ~802
}
```
⎫ 801

```
asn1Syn2 ::= SEQUENCE {
    para3 PrintableString,      ~804
    para4 OBJECT IDENTIFER ~804
}
```
⎫ 803

FIG. 12

| 1202 | OPERATION ID | op_tbl1 |
|---|---|---|
| 1203 | OPERATION TYPE | GET |
| 1204 | OPERATED OBJECT INSTANCE | object1 |
| 1205 | OPERATED OBJECT CLASS | 1.4.4.1.1 |

| | ATTRIBUTE | |
|---|---|---|
| 1206 OPERATION INFORMATION | 1.4.4.1.2 | |
| | : | |

| | 1208 RETURN ATTRIBUTE | 1209 RESPONSE ATTRIBUTE |
|---|---|---|
| 1207 RESPONSE INFORMATION | RSP.attr5 | 1.4.4.1.2 |
| | : | : |

| | USE ATTRIBUTE | USE TABLE ID | REFERENCE NUMBER |
|---|---|---|---|
| 1210 REFERENCE INFORMATION | 1.4.4.1.2 | op_tbl10 | 10 |
| | : | : | : |

| | | |
|---|---|---|
| 1302 | CONTROL TABLE ID | seq_ctl_tbl10 |
| 1303 | CONTROL TYPE | NOCONTROL |
| 1304 | CONTROL INFORMATION | op_info1 |
| 1305 | OPERATION TABLE ID | op_tbl10 |
| 1306 | NEXT CONTROL TABLE | seq_ctl_tbl11 |

| CONTROL WORD | CORRESPONDENCE CONTROL TABLE ID |
|---|---|
| SCHEDULE | ctl_tbl5 |
| IF | ctl_tbl10 |
| : | : |

```
SCHEDULE;
  objectName1 . Class1 : GET;
    attr1;;
  objectName2 . Class3 : GET;
    attr2;;
SCHEDULEEND : TIME 10, CYCLE 3;
```

1901 { 1902, 1903 }

1904

| CONTROL TABLE ID | | cnt_tbl1 |
|---|---|---|
| CONTROL TYPE | | SCHEDULE |
| CONTROL INFORMATION | SCHEDULE ID | SCHEDULE1 |
| | CYCLE | 10 |
| | NUMBER OF TIME | 3 |
| OPERATION | | op_tbl1 |
| NEXT CONTROL TABLE ID | | cnt_tbl2 |

1906 — SCHEDULE1
1907 — 10
1908 — 3 op_tbl1

1905

| CONTROL TABLE ID | | cnt_tbl2 |
|---|---|---|
| CONTROL TYPE | | SCHEDULEEND |
| CONTROL INFORMATION | SCHEDULE ID | SCHEDULE1 |
| | START TABLE | cnt_tbl1 |
| | NUMBER OF TIME | 3 |
| OPERATION | | op_tbl2 |
| NEXT CONTROL TABLE ID | | cnt_tbl3 |

1909 — SCHEDULE1
1910 — cnt_tbl1
1911 — 3 op_tbl2

FIG. 28 attr5 ATTRIBUTE
  WITH ATTRIBUTE SYNTAX asn.asnSyn;
REGISTERD AS {1 2 3 4 5 2} — 2811
               2814 attr6 ATTRIBUTE
  WITH ATTRIBUTE SYNTAX asn.asnSyn;
REGISTERD AS {1 2 3 4 5 3} — 2812
               2815 classA  MANAGED OBJECT CLASS
DERIVED FROM
CHARACTERIZED BY pkg1
REGISTERD AS {1 2 3 4 5 1} — 2813
               2816

| | | |
|---|---|---|
| OPERATION TABLE ID | op_tbl10 | 2802 |
| OPERATED OBJECT INSTANCE | service_inf.object1 | 2803 |
| OPERATED OBJECT CLASS | 1 2 3 4 5 1 | 2804 |
| OPERATION INFORMATION — OPERATION ATTRIBUTE | 1 2 3 4 5 2 | 2805 |
| | 1 2 3 4 5 3 | 2806 |
| RESPONSE INFORMATION — RESPONSE ATTRIBUTE | CORRESPONDENCE ATTRIBUTE | |
| RSP.para3 | 1 2 3 4 5 2 | 2809 |
| RSP.para4 | 1 2 3 4 5 3 | 2810 |

| | | |
|---|---|---|
| SEQUENCE TABLE ID | seq_tbl1 | 3502 |
| OPERATION ID | 1 0 0 0 | 3503 |
| INVOKE ID | 2 0 0 0 | 3504 |
| USE CONTROL TABLE | ctl_tbl1 | 3505 |
| NEXT USE CONTROL TABLE | ctl_tbl2 | 3506 |
| EVENT CONTROL TABLE | NOTHING | 3507 |
| OPERATION PARAMETER | service_inf | 3508 |
| RESPONSE PARAMETER | service_reply | 3509 |
| OTHER INFORMATION | SCHEDULEID | 3510 |
| | COUNT | 3511 |

3501

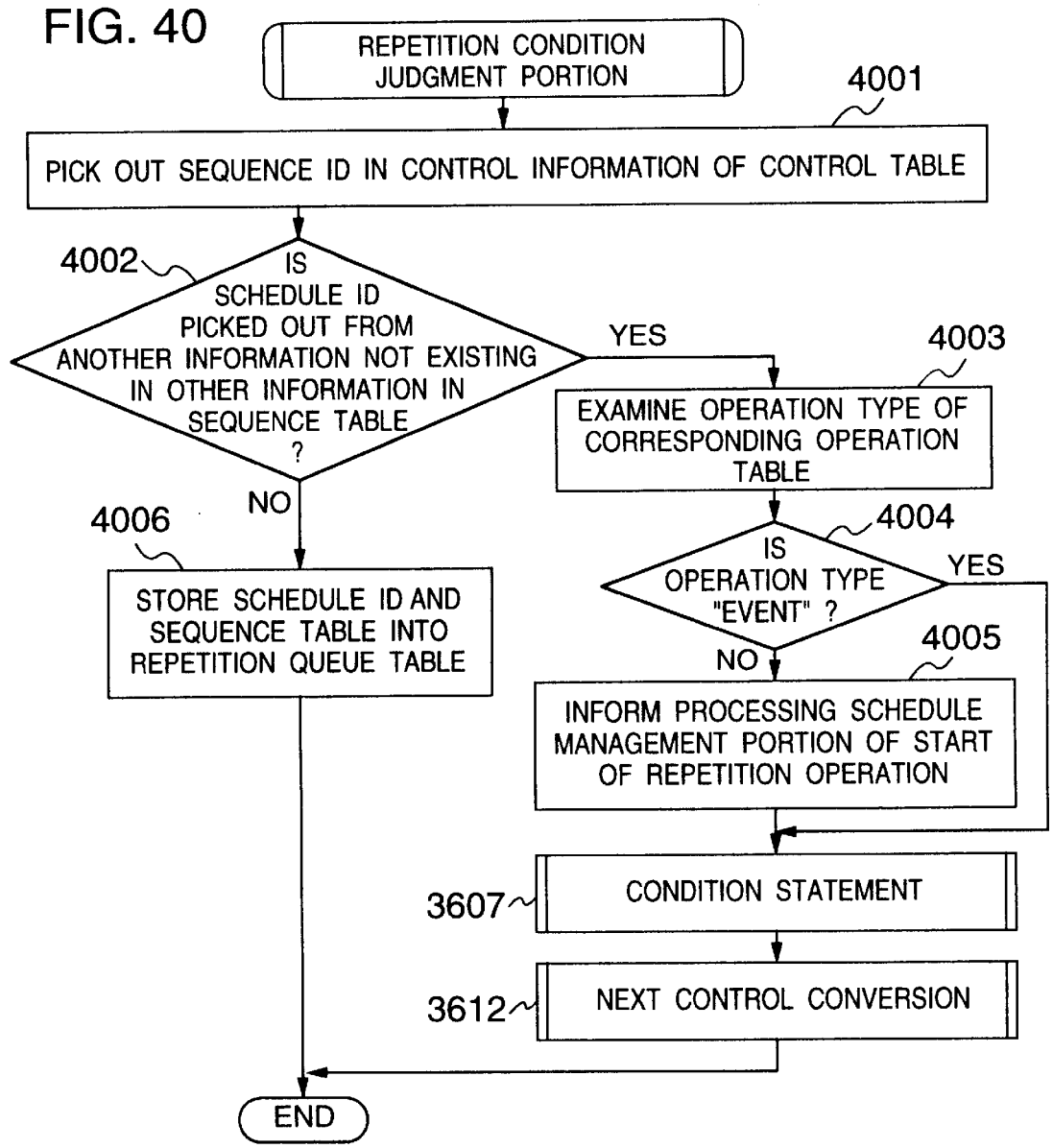

FIG. 48

| SEQUENCE ID | NUMBER OF TIMES | VALUE |
|---|---|---|
| seq_1 | 10 | 3 |
| seq_2 | 5 | 1 |
| ⋮ | ⋮ | ⋮ |

FIG. 49

| | 4901 | |
|---|---|---|
| 4902 | OBJECT CLASS | 1.2.1.2 |
| 4903 | ACTION TYPE | 1.2.2.1 |
| 4904 | RESPONSE PARAMETER | request_mem |
| 4905 | CONDITIONAL OBJECT CLASS STORAGE POSITION | IND.seq |
| 4906 | CONDITIONAL JUDGMENT CLASS | PROCESSING SEQUENCE  4907 |
| | 1.2.1.3 | ctl_tbl1 |
| | 1.2.1.3 | ctl_tbl5 |
| | OTHERS | ctl_tbl9 |
| | ⋮ | ⋮ |

| SEQUENCE TABLE ID | PROCESSING SEQUENCE START TABLE |
|---|---|
| seq_tbl1 | ctl_tbl1 |
| ⋮ | ⋮ |

FIG. 56

```
#define   GET   0x01
#define   SET   0x02                          } 5601
              ⋮
```

```
/*ACTION CORRESPONDENCE TABLE*/
struct act_tble {
    char         *objectClass,
    char         *actionType,
    struct data  *response,                    } 5602
    struct data  *position,
    struct cond  *condition
}
```

```
/*OPERATION TABLE*/
struct ope_tbl {
    int            op_tbl,
    int            operationType,
    char           *char,
    struct opInfo  *op_info,                   } 5603
    struct rspInfo *rsp_info,
    struct refInfo *ref_info
}
```

```
/*CONTROL TABLE*/
struct cont_tbl {
    int             ctl_tbl,
    int             controlType,
    struct ctlInfo  *clt_info,                 } 5604
    struct ope_tbl  *op_tbl_id,
    struct cont_tbl *next
}
```

```
/*SEQUENCE TABLE*/
struct seqc_tbl {
    int              seq_tbl,
    int              operation_id,
    int              invoke_id,
    int              use_ctl_tbl,
    int              use_next_tbl,             } 5605
    struct eventCnd  *event_cnd,
    struct opPara    *op_para,
    struct rspInfo   *rsp_info,
    struct otherInfo *other_info
}
```
    ⋮

FIG. 59

| OBJECT CLASS | PROGRAM NAME |
|---|---|
| seqenceA | MSERV1 |
| ⋮ | ⋮ |

METHOD OF CREATING INFORMATION FOR EXECUTING NETWORK MANAGEMENT OPERATIONS FROM A SIMPLIFIED DEFINITION OF AN OPERATION SEQUENCE AND PROVIDING A NETWORK MANAGEMENT OPERATION SEQUENCE, USED IN THE INFORMATION

BACKGROUND OF THE INVENTION

1. Field of the Invention

The present invention relates to a method of providing management service objects in a network management system and particularly relates to a method of providing management service objects in a network management system according to OSI (Open Systems Interconnection) management standardization in which management services are provided so that a plurality of management application programs can be used in common.

2. Description of the Related Art

A management application program for a network management system (hereinafter simply referred to as "management application") generates contents of processing on the basis of description of the behavior of managed objects such as GDMO (Guidelines for the Definition of Managed Objects) described in "Rec X.772, Guidelines for the definition of managed objects", CCITT/ISO, 1992. With respect to the behavior of managed objects defined in the GDMO, relations, or the like, for management between a plurality of managed objects are not described though managed objects are described individually. Therefore, developers must examine procedures and contents for operating managed objects in order to generate management applications. Further, management applications do not always require all response results of operation to managed objects and must make processing for selecting necessary information from response of operation to managed objects. The aforementioned processing makes developers' generation of management applications complex. Such management applications, however, include a series of management operations which can be used in common to a plurality of management applications. Accordingly, if such a series of management operations are collected in advance as management services so that only necessary information can be informed to management applications, it becomes necessary for each management application to generate only the processing peculiar to the management application. Thus, the management applications can be formed effectively. Such a method in which generation of a management application is aided in a manner so that a source program is automatically generated by describing management services as managed objects according to the GDMO, describing the behavior thereof in C++ program language in behavior templates of the managed objects and putting the program thereof as a function of management operation into the whole processing, has been described in "Information Network", IN93-63, Technical Report of Institute of Electronics, Information and Communication engineers of Japan, pp.109–114, 1993.

SUMMARY OF THE INVENTION

In the above-mentioned art, however, the behavior to generate a source file must be described in the form of a program, so that the assembly of operating information of managed objects, the type of the operating information, or the like, need be written as a program. It is further necessary that the developers know the program language. Because the source file is generated, it is further necessary that an execution file is changed when the behavior of objects is changed. It is therefore difficult to change objects efficiently. It is particularly difficult to change management services provided in a management system which need be always being operated.

An object of the present invention is to provide a function capable of describing the behavior of management services in a network management system without consciousness of the program language to thereby facilitate the change of processing contents of management services.

The foregoing object of the present invention is achieved by a system comprising: processing means for executing management operations by setting portions, as a parameter, peculiar to respective management operations constituting a series of management operations; means for generating tables listing management operations described by a user and constituted by parameters set peculiarly to the respective management operations on the basis of information defining the characteristic of managed objects such as GDMO; and means for executing a series of management operations by delivering the parameters in the tables to the processing means.

Describing more in detail, as a constitutional feature, there is provided means by which the change of behavior can be reflected soon only by changing the parameters in the tables without changing the whole processing contents even in the case where the behavior described by a list of management operations is changed.

According to the present invention, the behavior of management services can be expressed simply by generating a set of management operations for managed objects existing in an agent. Further, developers can define management services easily without consciousness of a program language by generating, as a parameter, operation information and a processing sequence necessary for the series of management operations. Further, management operations can be achieved only by generating tables corresponding to processing peculiar to the series of management operations, so that the dynamic change/addition of management services can be made easily.

BRIEF DESCRIPTION OF THE DRAWINGS

FIG. 3 is a schematic flow chart of a method for providing management service objects;

FIG. 4 is a diagram of an example of a series of management operations executed by management service objects;

FIG. 5 is a view of an example of management service object definition according to GDMO;

FIG. 6 is a view of an example of the method of describing management operations through behavior templates defined by the GDMO;

FIG. 7 is a view showing the structure of operation parameters in the description of management operations;

FIG. 8 is a view showing an example of ASN.1 syntax;

FIG. 12 is an operation table showing the details of management operations for managed objects;

FIG. 13 is a control table showing the operation transition of a series of management operations for managed objects;

FIG. 17 is a table showing the correspondence between a control word and a control table concerning the control word;

FIG. 19 is a table showing the relation between a repetition operation described in the behavior template and a control table corresponding to the description thereof;

FIG. 28 is a table showing the correspondence between the management operation and the operation table;

FIG. 35 is a sequence table necessary for execution of a processing sequence;

FIG. 40 is a flow chart of repetition conditional judgment portion which is a part of the processing sequence execution portion;

FIG. 41 is a repetition operation queue table showing the correspondence between schedule ID and sequence table ID;

FIG. 48 is a cycle table showing the correspondence among the sequence ID used in the processing schedule management portion, the number of times expressing the cycle of the repetition operation and the actual value thereof;

FIG. 49 is an action correspondence table showing the correspondence between the action reported from a management application, or the like, and a series of management operations;

FIG. 56 is a view showing an example of C language definition of various tables necessary for achieving management service objects;

FIG. 59 is a management service object execution table showing the correspondence between the object class and the program name.

DESCRIPTION OF THE PREFERRED EMBODIMENTS

Embodiment 1

An embodiment of the present invention will be described below.

Figure 1:
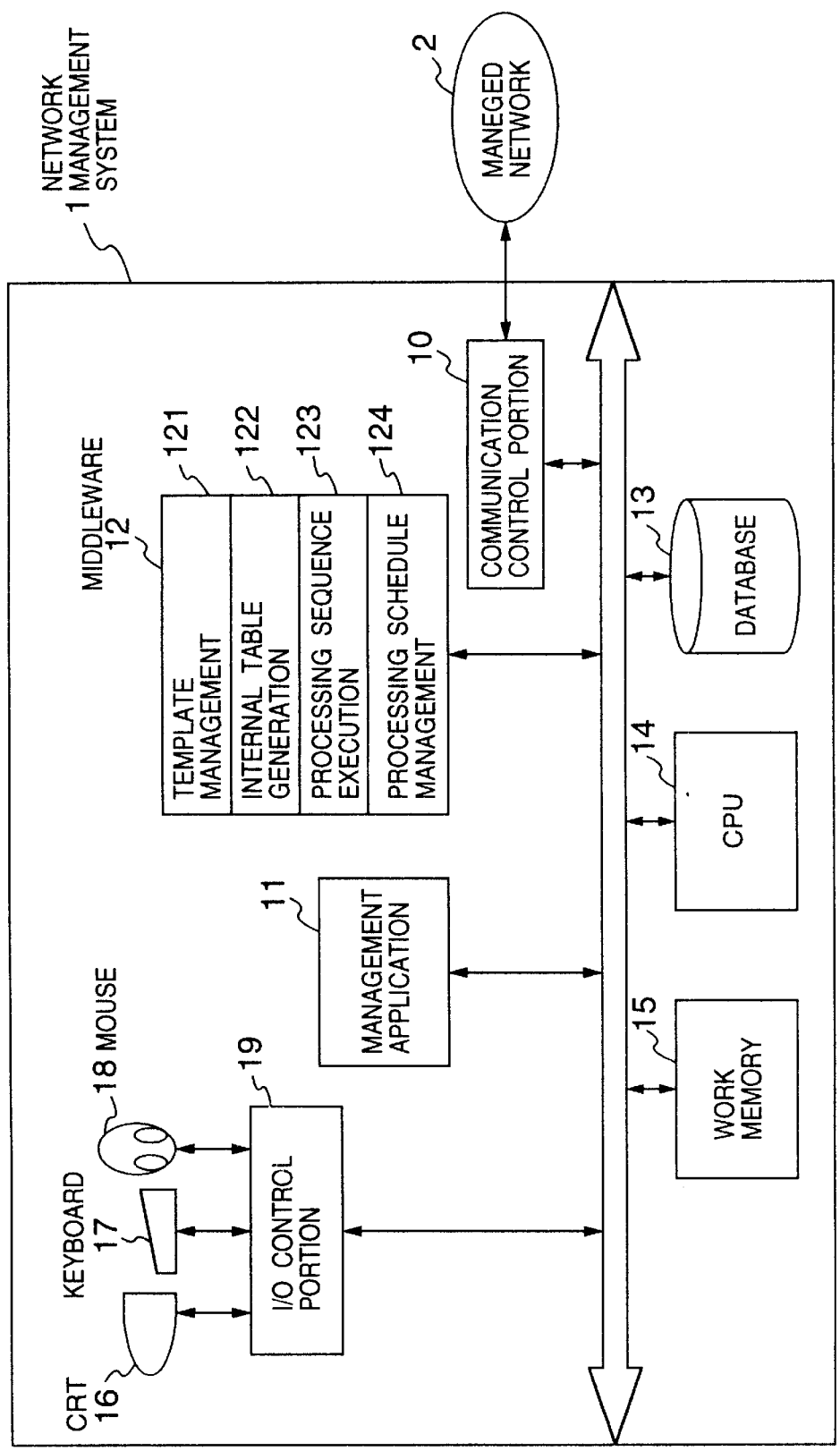
FIG. 1 is a configuration diagram of an embodiment of a network management system for providing management service objects.

FIG. 1 is a configuration diagram of a network management system according to the present invention. The network management system 1 comprises: a communication control portion 10 for controlling communication with a managed network 2; management applications 11 for performing individual processing to manage the network; a middleware 12 having interfaces with the management applications 11 to thereby provide an operation used for the managed network 2 common to a plurality of management application programs; a database 13 for storing template information; a central processing unit (CPU) 14 for executing management applications 11 and programs in the middleware 12; a work memory 15 for storing intermediate results generated in the processing in the CPU 14; a display unit (CRT) 16 for displaying the state of the managed network 2; a keyboard 17 and a mouse 18 through which an operator inputs information such as commands, or the like; and an input-output (I/O) control portion 19 for controlling screen display information, keyboard input, or the like. The middleware 12 includes: a template management portion 121 making the database 13 store template information delivered through the I/O control portion 19; an internal table generating portion 122 for collecting data which describes commonly used processing from the database 13 and for generating a table necessary for processing; a processing sequence execution portion 123 for executing processing by using the table generated by the internal table generating portion 122; a processing schedule management portion 124 for informing the processing sequence execution portion 123 of the timing of starting periodic processing to thereby achieve a periodic repetition operation; and so on.

Referring next to FIGS. 2 through 48, the form of description of a series of management operations (hereinafter referred to as processing sequence) with respect to the managed network 2 and the operation of reading the description and carrying out actual processing will be described.

Figure 2:
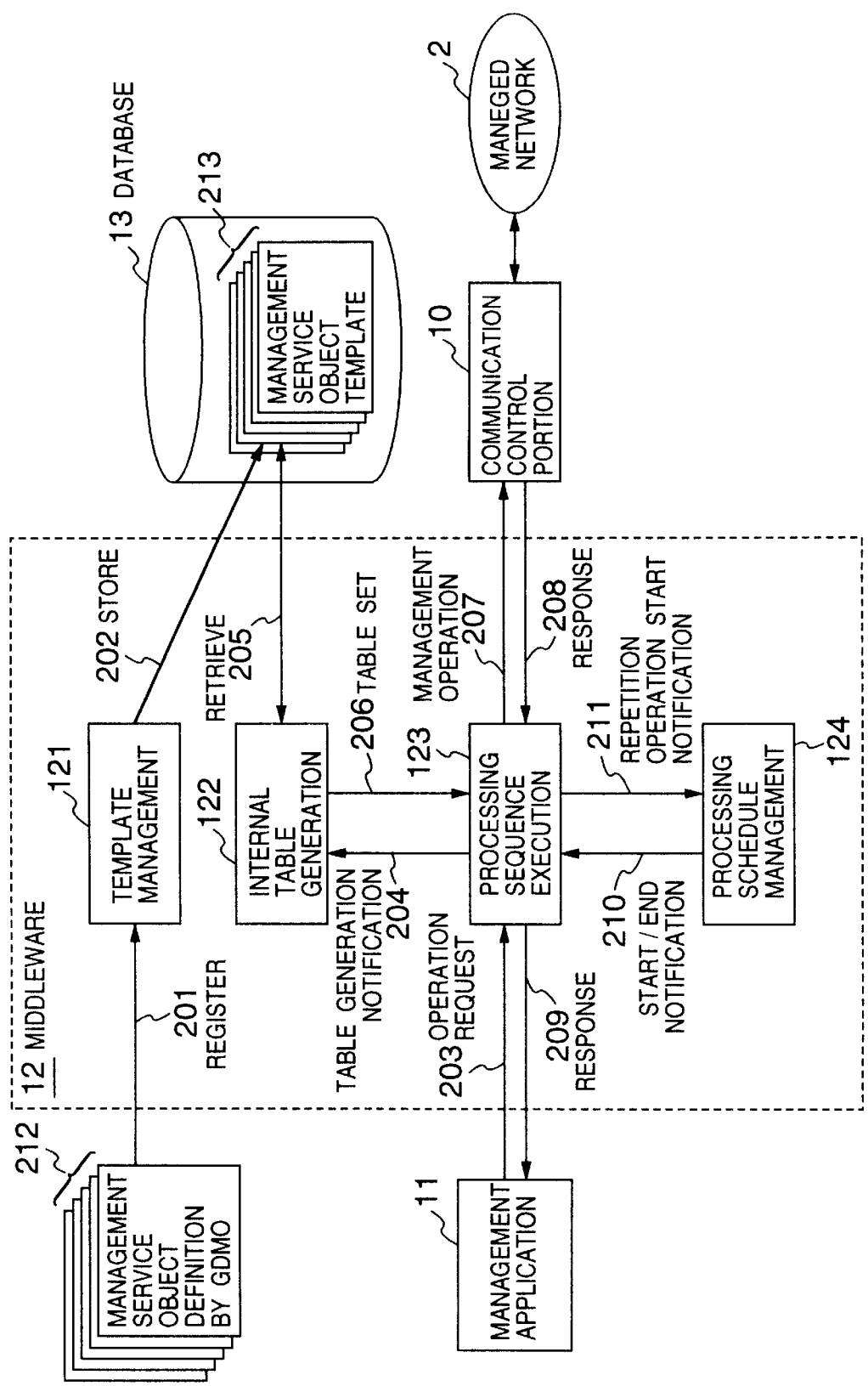
FIG. 2 is a diagram of relations between middleware modules in a network management system.
Figure 9:
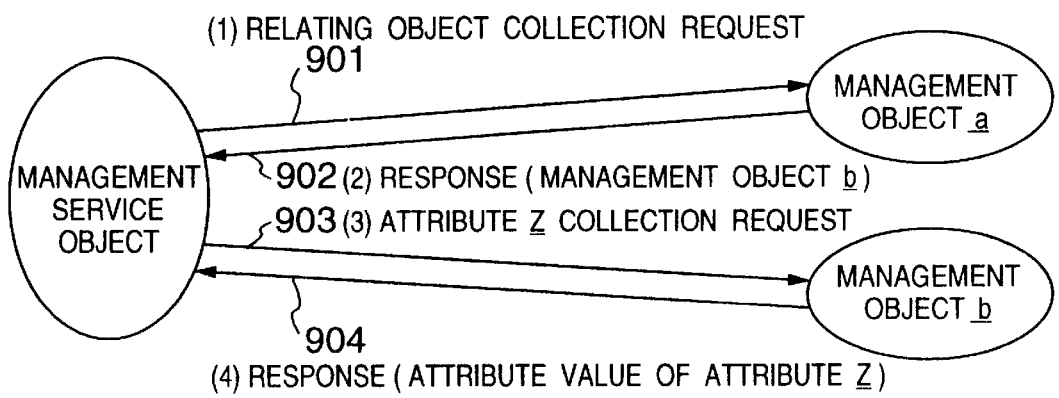
FIG. 9 is a diagram showing an example of management service objects containing management operations using the result of the previous management operation.
Figure 10:
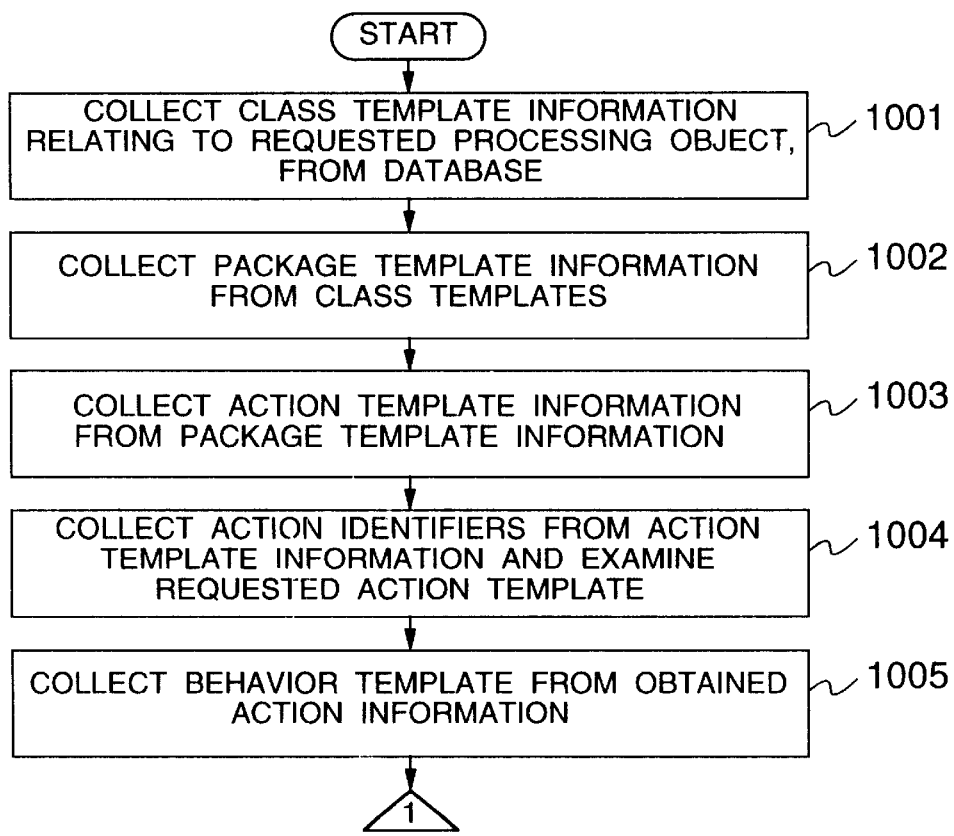
FIG. 10 is a flow chart showing the first half of a process for generating tables necessary for execution of management operations.
Figure 11:
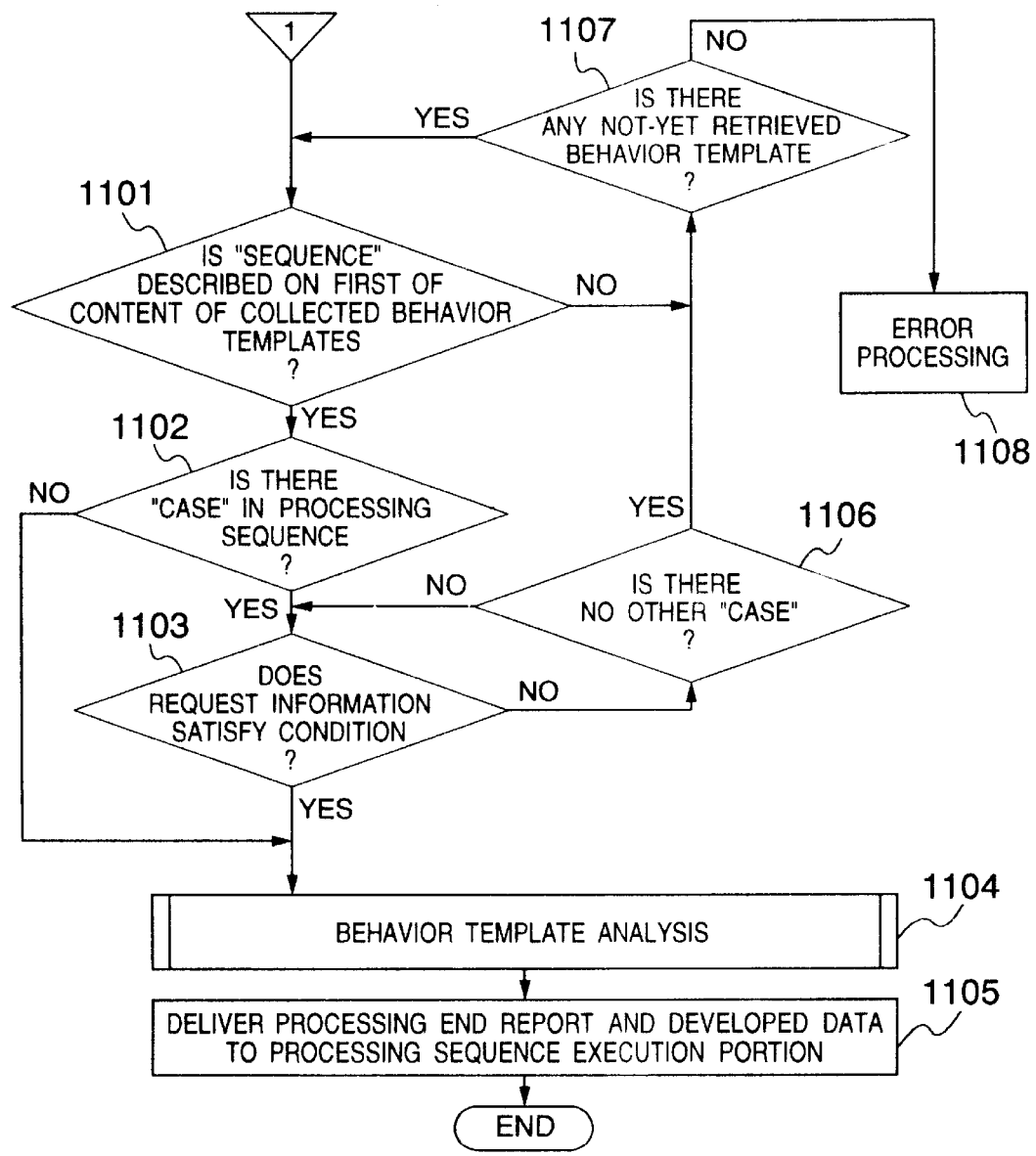
FIG. 11 is a flow chart showing the second half of the process for generating tables necessary for execution of management operations.
Figure 14:
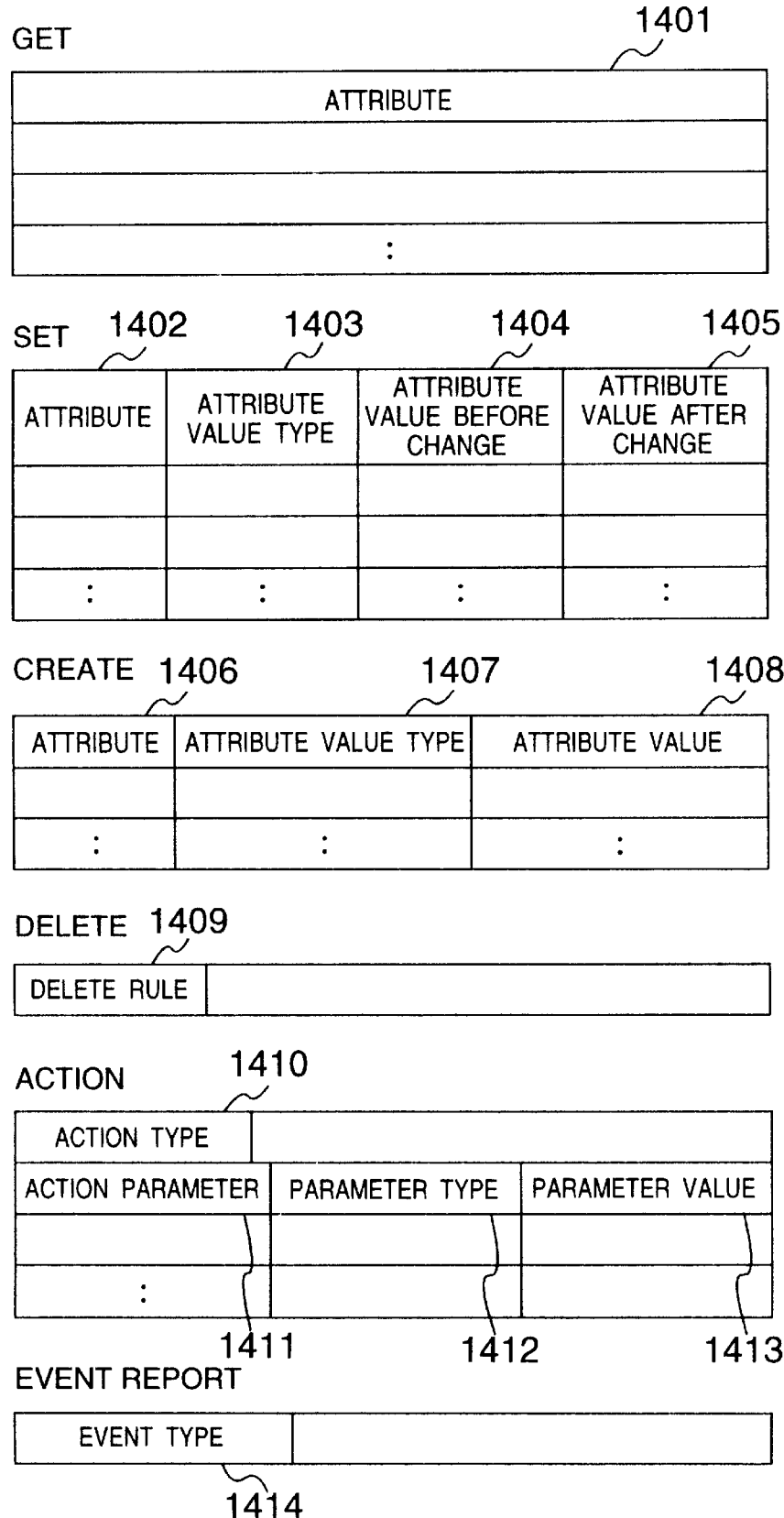
FIG. 14 is a table showing operation information which is a constituent member of the operation table.

FIG. 2 shows the module configuration of the network management system. User's processing sequence information is registered (201) as management service object definition 212 according to GDMO in the template management portion 121. The processing sequences thus registered are stored (202) as management service object templates 213 into the database 13. When the processing sequence execution portion 123 then receives an operating request invoked by a management application 11, the processing sequence execution portion 123 supplies a table generation notification (204) to the internal table generating portion 122. The internal table generating portion 122 retrieves and collects (205) necessary data from the processing sequence information stored in the database 13 and generates a plurality of internal tables necessary for execution of processing sequences. The internal table generating portion 122 generates a table set 206 by combining the plurality of internal tables thus generated and delivers the table set 206 to the processing sequence execution portion 123. The processing sequence execution portion 123 executes a management operation 207 for managed objects on the managed network 2 through the communication control portion 10 on the basis of the table set 206 given from the internal table generating portion 122, and receives response 208 from the managed objects. The processing sequence is executed by repeating the aforementioned processing. In this occasion, if necessary, the response 209 is returned to the management application 11 requesting this processing. Further, in the case where a repetition operation is executed as a processing sequence, the processing sequence execution portion 123 delivers start/end notification 210 to the processing schedule management portion 124 to inform the processing schedule management portion 124 of the repetition operation. The processing schedule management portion 124 periodically delivers repetition operation start notification 211 to the processing sequence execution portion 123 to inform the processing sequence execution portion 123 of the timing of starting the repetition operation.

FIG. 3 is a flow chart of processing sequence execution. When the template management portion 121 first receives a request to register user's processing sequence information, the processing sequence described by the user is stored into the database 13 (301). When an operation request is then invoked by a management application 11 (302), the processing sequence execution portion 123 issues a request to the internal table generating portion 122 to generate tables necessary for execution of processing (303). After generating the required internal tables, the internal table generating portion 122 delivers end notification and the generated tables to the processing sequence execution portion 123 (304). The processing sequence execution portion 123 executes a management operation for managed objects on the basis of the table set given from the internal table generating portion 122 (305). A processing sequence which is requested whenever an operation request is received from a management application 11 is executed by repeating the aforementioned processes 302 to 305.

The form of processing sequence description will be explained below. In an OSI (Open Systems Interconnection) management system as an international standard, network management is achieved by carrying out management operations for managed objects while regarding the managed network as the managed objects. As a method of expression of such managed objects, there are defined GDMO (Guidelines for the Definition of Managed Objects) in which management information is expressed by predetermined templates, respectively. In this embodiment, a series of processing for the managed objects is defined as a management service object by using the GDMO. The description of a management service object will be explained below by taking the description of processing sequences as an example.

FIG. 4 shows the outline of an example of processing sequences. Upon reception of a service 1 action request 402 from an operator and management application 401, the management service object 403 executes processing sequences corresponding to the action. In this embodiment, it is assumed that there are two processing sequences 1 (404) and 2 (405) corresponding to the requested service 1 action. The processing sequences are cut and divided on the basis of the object classes of managed objects which are designated in request parameters of the action to be subjected to operations. If the designated object class is class A, GET operation 406 is carried out upon the object and then ACTION operation 407 is carried out upon the same object. Then, two EVENT REPORT notifications 408 and 409 are carried out upon an object which belongs to class B in relation to the class A. At the time of respective reception, the management application 401 is informed of event information and part of response of the second ACTION operation 407 as service 1 action response 410. If the object class designated in request parameters in the action is class C, SET operation 411 is first carried out upon the object and then SET operation 412 for another attribute is carried out upon the same object. Then, two GET operations 413 and 414 are periodically carried out upon an object of class D. The management application 401 is informed of results of the operations as service 1 action response 410.

FIG. 5 shows the description of object definition for the aforementioned processing sequences. The NAME BIND- ING template 501 is composed of a corresponding object class 502, description 503 of containment between instances which are substances of managed objects, and designation 504 of attributes which are names for designating instances. The class template 505 is composed of inheritance 506 between object classes, and a package template set 507 for expressing the characteristics of the managed objects. The package template 508 expresses characteristics such actions, attributes, and so on. In the package template 508 which expresses a processing sequence as an object, only actions 509 for providing management services are set. The action template 510 contains parameters 511 at the time of requesting actions, and parameters 512 delivered at the time of response actions. The parameters 511 and 512 are described in ASN.1 (Abstract Syntax Notation One) syntax 514.

In the GDMO, the behavior template 513 can be designated so that characteristic and behavior to be designated in the templates except the class template are described. Processing to be executed by a certain action is described in the behavior template related to the action template for the action.

FIG. 6 shows the description of the behavior template designated in the action template 510 in FIG. 5. A portion 601 enclosed by two exclamation marks "!" 602 is a portion indicating a processing sequence. In the portion 601, "SEQUENCE" 603 as a preengagement word is described in the first line of the content in order to distinguish from natural sentences which are generally described in the behavior template. Then, "CASE" (604) indicating classification is described because processing content varies corresponding to the object class of the managed object. Thereafter, a processing sequence (605) is stated correspondingly to the "CASE".

A management operation is generally stated as follows:

"managed object instance","managed object class":

"operation type";

"operation content";

The first line of the aforementioned expression shows the kind of the managed object to be operated and the kind of the management operation. The first line is sectioned by "," between the object instance and the object class and sectioned by ":" between the object class and the operation type. The operation type is selected from six types GET, SET, CREATE, DELETE, ACTION and EVENT REPORT defined in the OSI management. Here, EVENT REPORT is abbreviated to EVENT. Operation contents necessary for management operation are stated in the second line et seq. of the aforementioned statement of the management operation.

The method of describing the operation contents varies correspondingly to the operation type as shown in FIG. 7. If the operation type is GET, attribute 701 is described. If the operation type is SET, attribute 701 is described and then respective attribute values 703 and 705 before and after the change are described with "FROM" 702 and "TO" 704 as shown in FIG. 7. If the operation type is CREATE and an attribute is to be set at the time of generating the managed object, attribute 701 and attribute value 706 are described. If the operation type is DELETE, the type of DELETE_RULE 707 defined by the OSI management is designated to delete the managed object. If the operation type is ACTION, action type 709 is designated after the description of "ACTION-TYPE" 708. After the action type 709, an action parameter 710 required at the time of requesting action and the value 711 of the action parameter 710 are described. If the operation type is EVENT, event type 712 is described. As each of the aforementioned operation contents, a plurality of contents may be described. Accordingly, ";" further described after the description of the last operation content indicates a collected set of operation description.

Further, in the description of operation contents, the label name or object identifier of the attribute template described according to the GDMO is designated as the attribute. In the case of object identifier, the attribute is enclosed in "( )" to indicate a collected set. Further, a parameter designated like a description of action operation refers to elements of ASN.1 syntax. With respect to the ASN.1 syntax which is referred to, one element 802 of one ASN.1 syntax 801 may refer to another ASN.1 syntax 803 as shown in FIG. 8. Accordingly, in order to express the description of an element 804 of the syntax which is referred to, the sentence is sectioned by "." like "element of ASN.1 syntax". "element of ASN.1 syntax referred to". Similarly, an operation may be carried out by using the result of the previous operation. In an example of FIG. 9, the management service object invokes an object collection request 901 relating to the managed object a and then invokes an attribute z collection request 903 to the thus collected managed object b (902) to collect the attribute value 904 of the attribute z. In this case, reference to operation results is indicated, also in an attribute value, by the following description: "operated object"."label of attribute template"

To use information delivered as action results, action type is added and enclosed in "( )" as follows:

("operated object"."action type")."action response parameter"

In the case of event information, description is made as follows:

("reported object"."event type")."parameter in event information"

Further, the description of attribute values is designated while reading ASN.1 syntax in the same manner as described above but values delivered from the management application may be used. In this case, "IND" indicating parameter received from the application is set and then the parameter designated by ASN.1 is sectioned by "." in the same manner as in the case of attribute.

As an example of such description, there is description 606 of from the fifth line to the sixth line in FIG. 6. This description shows GET operation with respect to attrl which is the attribute of object1 which is set in the management application. The description 607 of from the seventh line to the eleventh line shows ACTION operation with respect to object1. Here, "RETURN" 608 is first described in the eleventh line so as to indicate that the operator refers to information in response to the management application, "RSP" 609 is subsequently described to indicate response and then "para3" 609 is described as a response parameter thereof. The following "syntax3" 610 indicates that the value of "para3" 609 is an element of an ASN.1 syntax referred to as response of this action.

Further, repetition statements and conditional statements can be described in order to improve describing efficiency for repetition operations. If repetition operations are to be described without use of these statements, the description of the same operation must be repeated frequently. In this embodiment, repetition statements "SCHEDULE" and "SCHEDULEEND" can be described to facilitate the description of such a repetition operation. The statement "SCHEDULE" is described before the operation which starts periodic processing. The statement "SCHEDU-LEEND" is described after the final operation of the periodic processing and designates the interval of the periodic operations and the repetition times of the periodic operations. The description 611 in the lines 12 to 17 in FIG. 6 shows a repeated operation. Further, the conditional statements serve to change the description of an operation, and express a partial operation difference caused by a difference in response results and reception parameters. In this embodiment, the conditional statement "IF" can be described. Processing in the case where the conditional statement is true is described after "IF" and processing in the case where the conditional statement is false is described after "ELSE". Further, "ENDIF" is described in the last description of processing concerning the conditional statement.

As another description, "RESPONSE;;" as represented by the description 612 in the 16th line in FIG. 6 is provided. This serves to describe the timing of reporting response to the operator or management application. The description 612 expresses that response is returned to the operator or management application just after reception of an event. As described above, management operations can be listed in behavior templates.

The templates described as described above and the ASN.1 syntax referred to by the templates are one-by-one stored into the database 13 by the template management portion 121.

A method of generating a table set 206 to achieve processing on the basis of template information 213 stored in the database 13 will be explained below. This processing is performed by the internal table generating portion 122 after the processing sequence execution portion 123 receives a processing sequence operating request 203 from the management application 11. Upon the reception of the table generation report 204 from the processing sequence execution portion 123, the internal table generating portion 122 generates a table set 206 required for execution of the processing sequence on the basis of the processing shown in FIGS. 10 and 11. First, the internal table generating portion 122 collects class templates on the basis of the managed object class requested to be operated (1001). Package templates are collected from the database 13 on the basis of information of the collected class templates (1002), so that all action templates are collected (1003). An action template related to the action type required is obtained on the basis of object identifiers corresponding to all the action templates (1004). Further, behavior templates related to the action of the template are collected on the basis of the action template (1005). Thereafter, the first line of description in each of the collected behavior templates is examined to judge whether "SEQUENCE" is described or not (1101). If "SEQUENCE" is described, the second line of the template is examined (1102). If there is no "CASE" statement in the second line, behavior template analysis 1104 is performed to generate an internal table. After the internal table is generated, processing end report and developed data are delivered to the processing sequence execution portion 123 (1105). If there is "CASE" statement in the second line, information in requested parameters is extracted from managed object class storage position information described after the "CASE" statement and comparison is made as to whether object identifiers are coincident with each other or not (1103). If the object identifiers are coincident with each other, behavior template analysis 1104 is performed to generate an internal table. After the internal table is generated, processing end report and developed data are delivered to the processing sequence execution portion 123 (1105). If the object identifiers are not coincident with each other, the next position where "CASE" statement is described is examined to check whether the conditions are coincident or not (1106). If there is nothing coincident in condition, the operation is repeated upon other behavior templates (1107). If there is then no processing sequence coincident in condition in all behavior templates, error processing 1108 is carried out to inform the user and management application 11 of the error through the processing sequence execution portion 123.

If a processing sequence coincident in condition is identified, an operation table 1201 indicating the setting of parameters in respective management operations as shown in FIG. 12 and a control table 1301 indicating the sequence of respective management operations as shown in FIG. 13 are generated.

The operation table in FIG. 12 expresses the respective structures of the described management operations. Of these, operation ID 1202 is an identifier for univocally identifying the operation table 1201. Further, the operation type 1203 sets the type of management operation to be carried out. The operated object instance 1204 expresses an object instance of the managed object to be operated. The operated object class 1205 expresses an object class of the managed object to be operated. The operation information 1206 designates a parameter set relating to an operation. This varies in accordance with the operation type and has a data structure shown in FIG. 14. If the operation type is GET, an attribute set 1401 is stored. If the operation type is SET, data each having a combination of an attribute 1402, an attribute value type 1403 indicating the type of the attribute value thereof, an attribute value 1404 before changing and an attribute value 1405 after changing are stored. If the operation type is CREATE, data each having a combination of the attribute 1406 of a generated object, the attribute value type 1407 thereof and the attribute value thereof are stored. If the operation type is DELETE, a DELETE_RULE 1409 defined in Common Management Information Services (CMIS) is stored. If the operation type is ACTION, data each having a combination of an action parameter 1411 required at the time of request, the type 1412 of the parameter 1411 and the value 1413 of the parameter 1411 are stored together with an action type 1410. If the operation type is EVENT REPORT, an event type 1414 to be received is stored into the operation information 1206 because the event is not to be reported but to be received. With respect to the attribute values and parameters, the type and value of syntax described in the operation table are set in the operation information 1206 by referring to the ASN.1 syntax on the basis of the attribute templates of the attributes. The response attribute 1208 which is a parameter for informing the management application 11 or operator as the response 209 of the management operation, and the corresponding attribute 1209 which is the value of the response attribute 1208, are stored as a pair of data into the response information 1207. The reference information 1210 is information for referring to the response of the management operation in other management operations. Use attribute 1211 which is the position where information in the response is stored, use table ID 1212 which is the operation ID of the operation table of the reference source management operation, and the reference number 1213 thereof are stored into the reference information 1210.

FIG. 13 shows an example of the control table. The control table 1301 is used for analyzing preengagement words such as "SCHEDULE", "IF" and "RESPONSE" to determine the transition of the operation in a processing sequence. The control table ID 1302 is an identifier for univocally identifying the control table 1301. The control type 1303 is a command word for determining the processing sequence transition process. Generally, "NOCONTROL" is set if there is no preengagement word which is set before the description of the management operation. Information necessary for controlling the transition of the processing sequence is stored into the control information 1304. The operation ID of the operation table necessary for executing the real operation is set in the operation table ID 1305. The control table ID concerning the next management operation is set in the next control table 1306.

Figure 15:
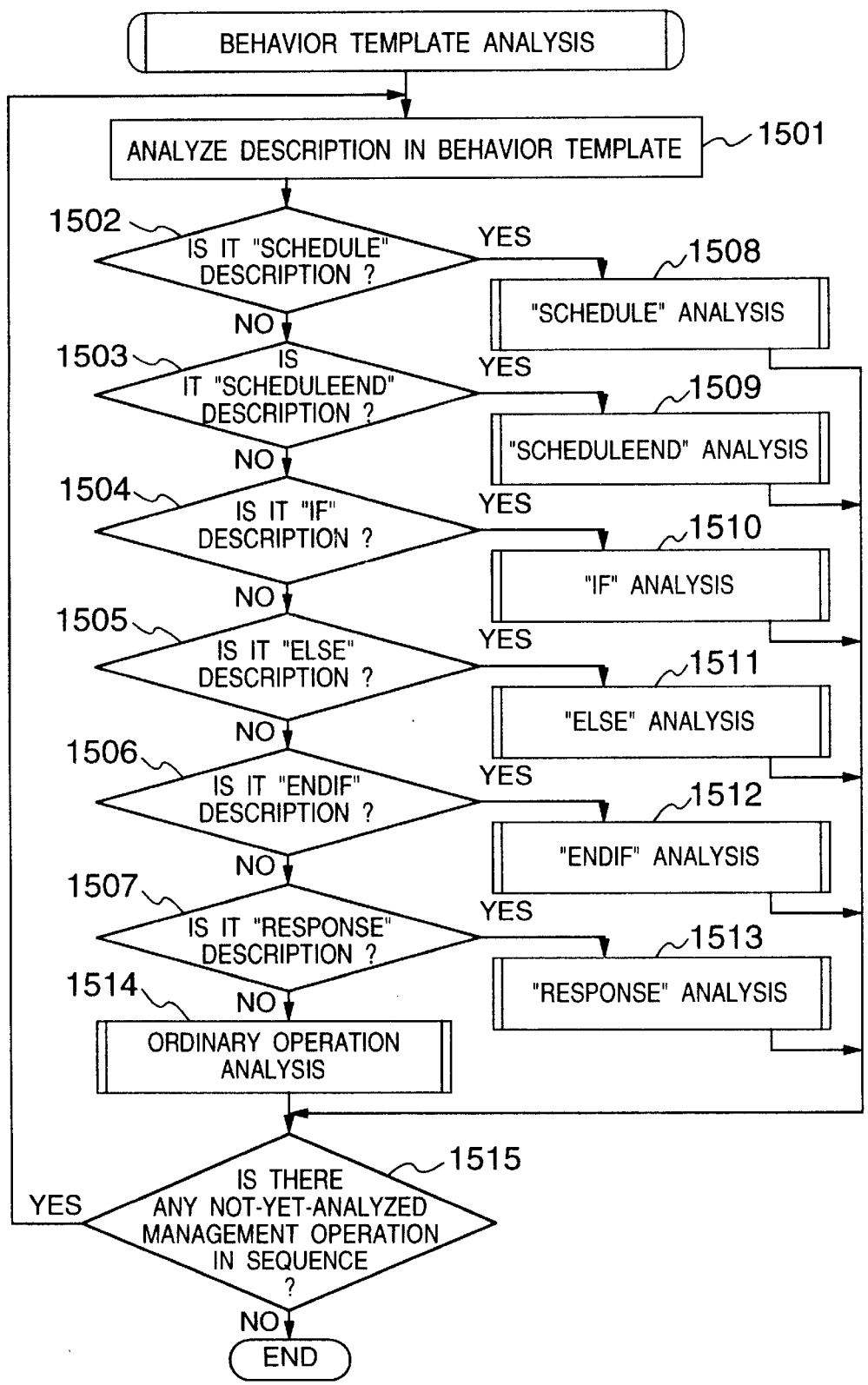
FIG. 15 is a flow chart of behavior template analysis for generating tables necessary for execution of management operations.

The aforementioned two kinds of tables are generated simultaneously by behavior template analysis 1104 in the internal table generating portion 122. FIG. 15 shows the details of the behavior template analysis 1104. First, description in the behavior template is analyzed (1501). Because characters which can be read are preengagement words such as "SCHEDULE", "SCHEDULEEND", "IF", "ELSE", "ENDIF" and "RESPONSE" or object instance names of management operations, what is the read-out information is examined (1502–1507) and analysis is executed correspondingly to the information (1508–1514). The analysis is repeated so that all the management operations in the processing sequence are analyzed (1515). Processing for respective preengagement words will be described below.

Figure 16:
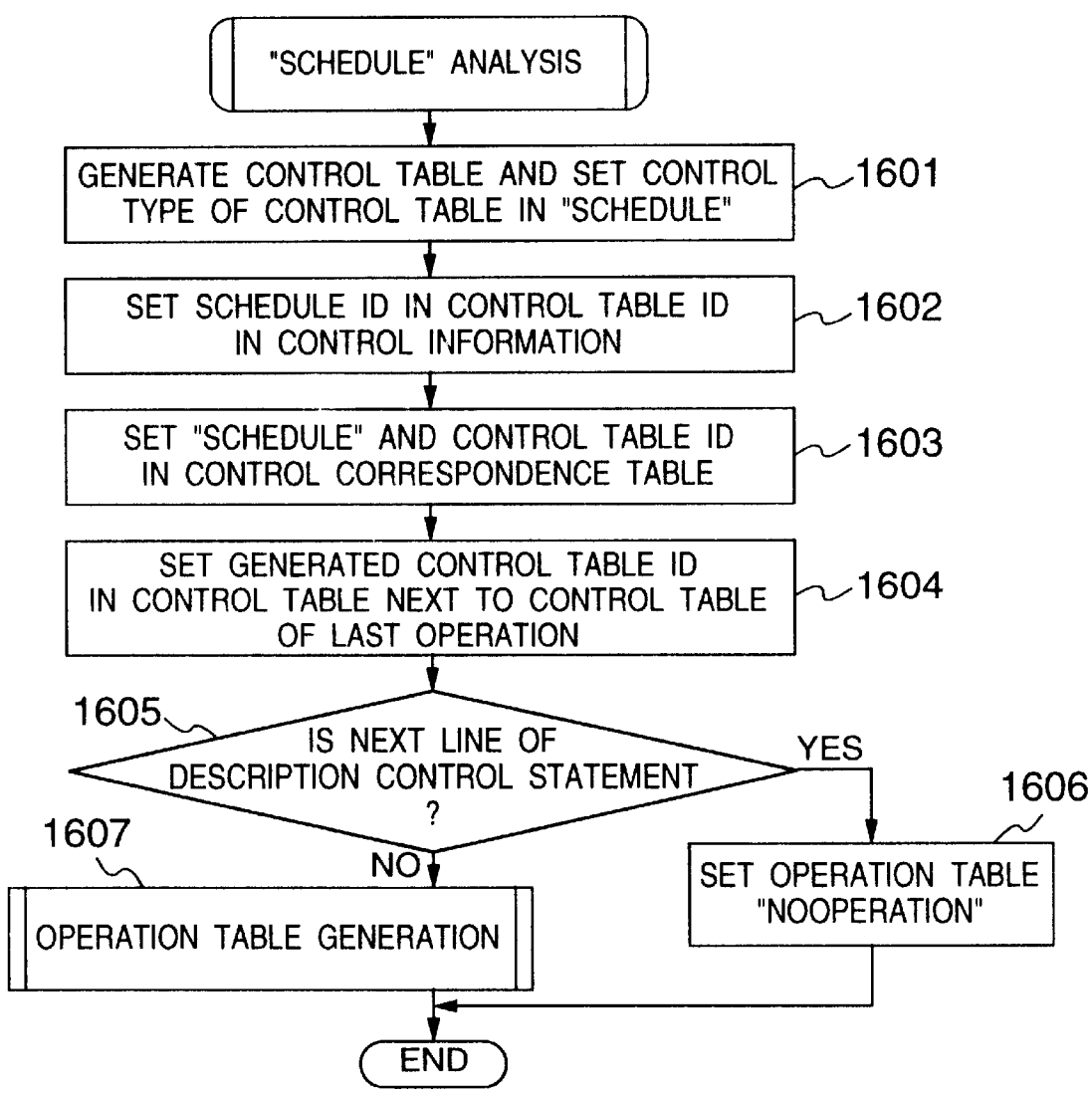
FIG. 16 is a flow chart of analysis in the case where SCHEDULE is described in the behavior template.

FIG. 16 is a flow chart of SCHEDULE analysis 1508 which is processing in the case where the read-out description is "SCHEDULE". First, the control table 1301 is generated and the control type 1303 thereof is set in SCHEDULE (1601). Then, schedule ID is set as the control information 1304 (1602). Then, the control word "SCHEDULE" and the control table ID 1302 of the generated control table 1301 are set in the last column of the correspondence table 1701 of preengagement word as shown in FIG. 17 (1603). The correspondence table 1701 of preengagement word is contained in the work memory and indicates the correspondence between preengagement word and a control table by a combination of the control word 1702 indicating the preengagement word and the correspondence table ID 1703 of preengagement word. Then, the control table ID 1302 of the control table thus generated is set in the control table 1306 next to the control table 1301 of the last operation (1604) and the next description in the behavior templates is read. If the read-out description is a preengagement word (1605), "NOOPERATION" is set in the operation table ID 1305 of the control table 1301 (1606). If there is the description of a management operation, an operation table for analyzing the management operation is generated (1607). The operation table generating process 1607 will be described later in detail.

Figure 18:
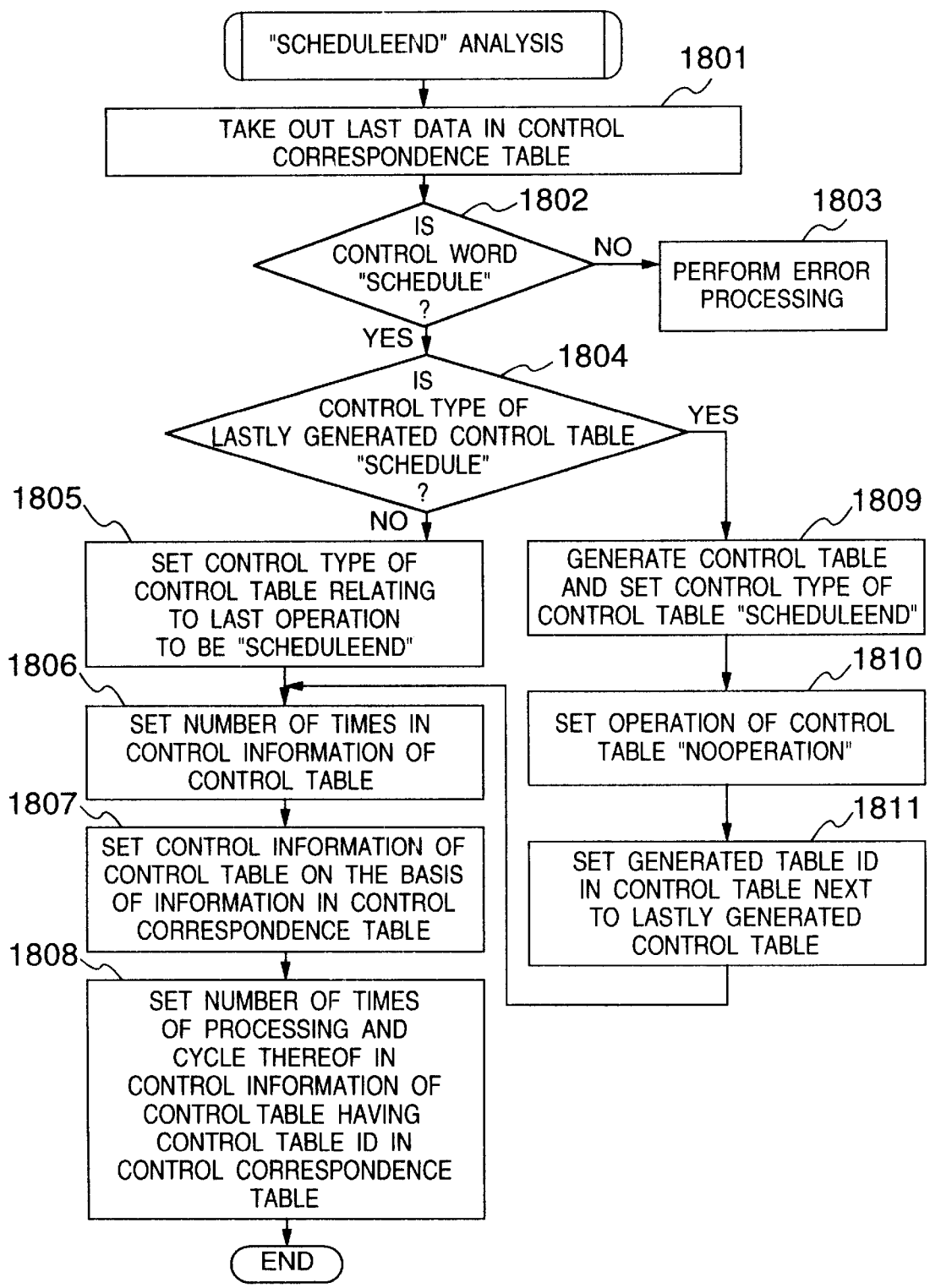
FIG. 18 is a flow chart of analysis in the case where SCHEDULEEND is described in the behavior template.

FIG. 18 is a flow chart of SCHEDULEEND analysis 1509 which is a process in the case where the read-out description is "SCHEDULEEND". First, the last data in the correspondence table 1703 of preengagement word is taken out (1801) and a judgment is made as to whether the control word is "SCHEDULE" or not (1802). If the control word is not "SCHEDULE", the analysis is terminated to inform the processing sequence execution portion 123 of the error (1803) because there is no correspondence between "SCHEDULEEND" and "SCHEDULE". If the control word is "SCHEDULE", the control type 1303 of the lastly generated control table 1301 is examined (1804). If the control type is not "SCHEDULE", the control type is regarded as "SCHEDULEEND" (1805) and the number of repetition times is set as the control information 1304 (1806). Further, the control table ID 1302 of the control table 1301 picked out from the correspondence table 1701 of preengagement word is stored as the start control table into the control information 1304 and the schedule ID described in the control information 1304 in the control table 1301 is set into the control table 1304 of the generated control table 1301 (1807). Then, the number of repetition times and the cycle thereof are set in the control information 1304 of the control table 1301 designated by the correspondence table 1701 of preengagement word and the correspondence is deleted from the correspondence table 1701 of preengagement word (1808). If the control type 1303 of the lastly generated control table 1301 is "SCHEDULE", a new control table 1301 is generated and the control type 1303 is set as "SCHEDULEEND" (1809) because the control information 1304 has been already present. Then, the operation table ID 1305 of the control table 1301 is set as "NOOPERATION" (1810) and the control table ID 1302 of the currently generated control table 1301 is set in the next control table 1306 of the lastly generated control table 1301 (1811). Then, the control information 1304 is set (1806–1808).

FIG. 19 shows an example of analysis concerning such a repeated operation. The description 1901 expresses that the collection 1902 of the attribute values of the attributes attr1 of object instances of ObjectName1 and the collection 1903 of the attribute values of the attributes attr2 of object instances of ObjectName2 are repeated three times at intervals of 10 sec. In the control table 1904 for the management operation 1902 upon ObjectName1, schedule ID 1906, cycle 1907 and the number 1908 of repetition times are set as control information. In the control table 1905 for the management operation 1903 upon ObjectName2, schedule ID 1909, repeated operation start control table 1910 and the number 1911 of repetition times are set as control information.

Figure 20:
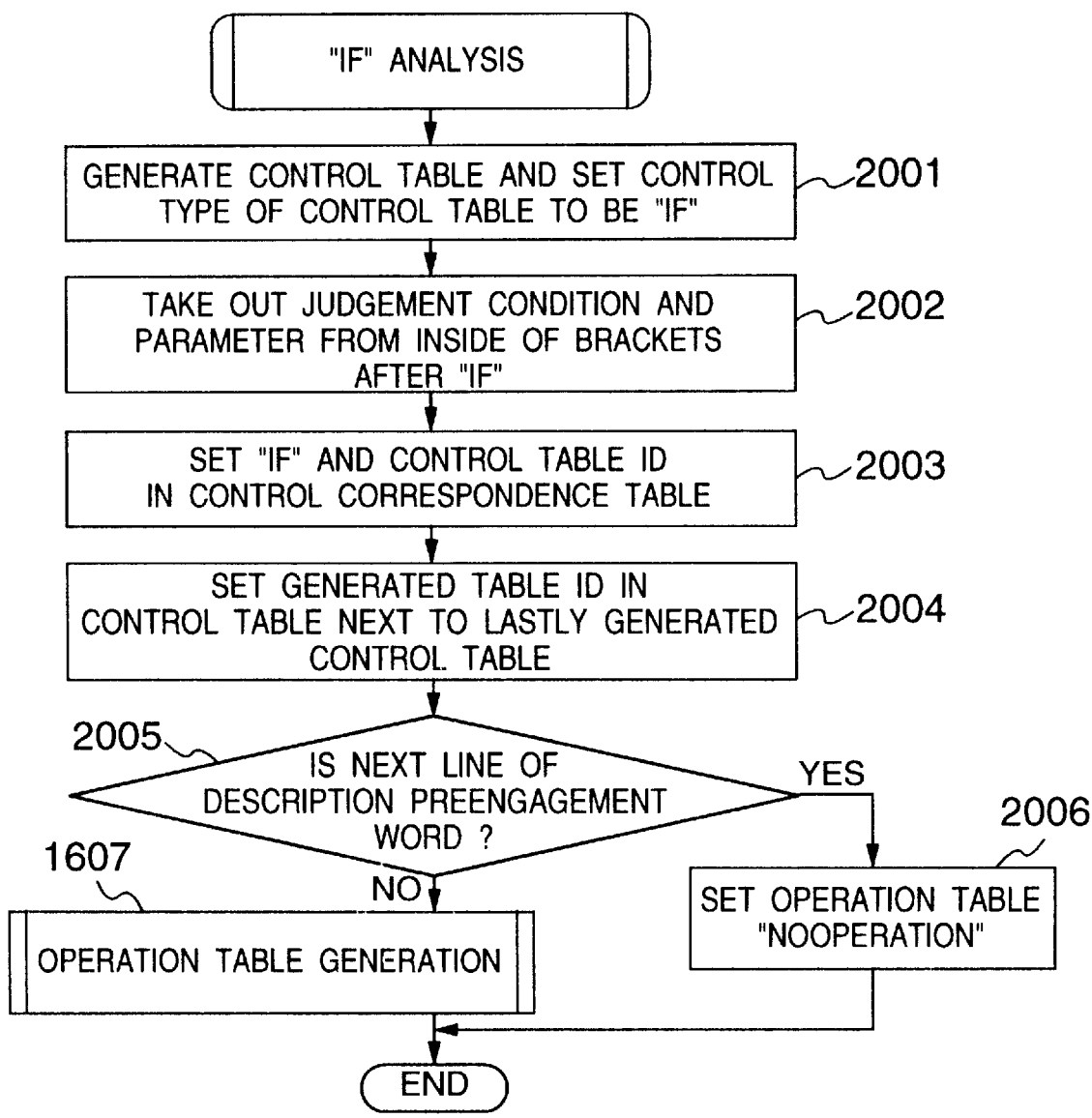
FIG. 20 is a flow chart of analysis in the case where IF is described in the behavior template.

FIG. 20 is a flow chart of IF analysis 1510 which is a process in the case where the read-out preengagement word is "IF". First, a control table 1301 is generated and the control type 1303 thereof is set as "IF" (2001). The position where conditional judgment information is stored is obtained as control information 1304 on the basis of the ASN.1 syntax in the database 13, so that the value and type thereof are set and the value of the conditional judgment statement and the conditional judgment symbol (any one of ==, =>and <=) are further set (2002). Then, the control word "IF" and the control table ID 1302 of the generated control table 1301 are set in the last column of the correspondence table 1701 of preengagement word contained in the work memory (2003). Further, the control table ID 1302 of the generated control table 1301 is set in the control table 1306 next to the lastly generated control table 1301 (2004) and the next description in the behavior templates is examined (2005). If the description thus read-out is a preengagement word, "NOOPERATION" is set in the operation table ID 1305 of the control table 1301 (2006). If there is the description of management operation, an operation table is generated (1607).

Figure 21:
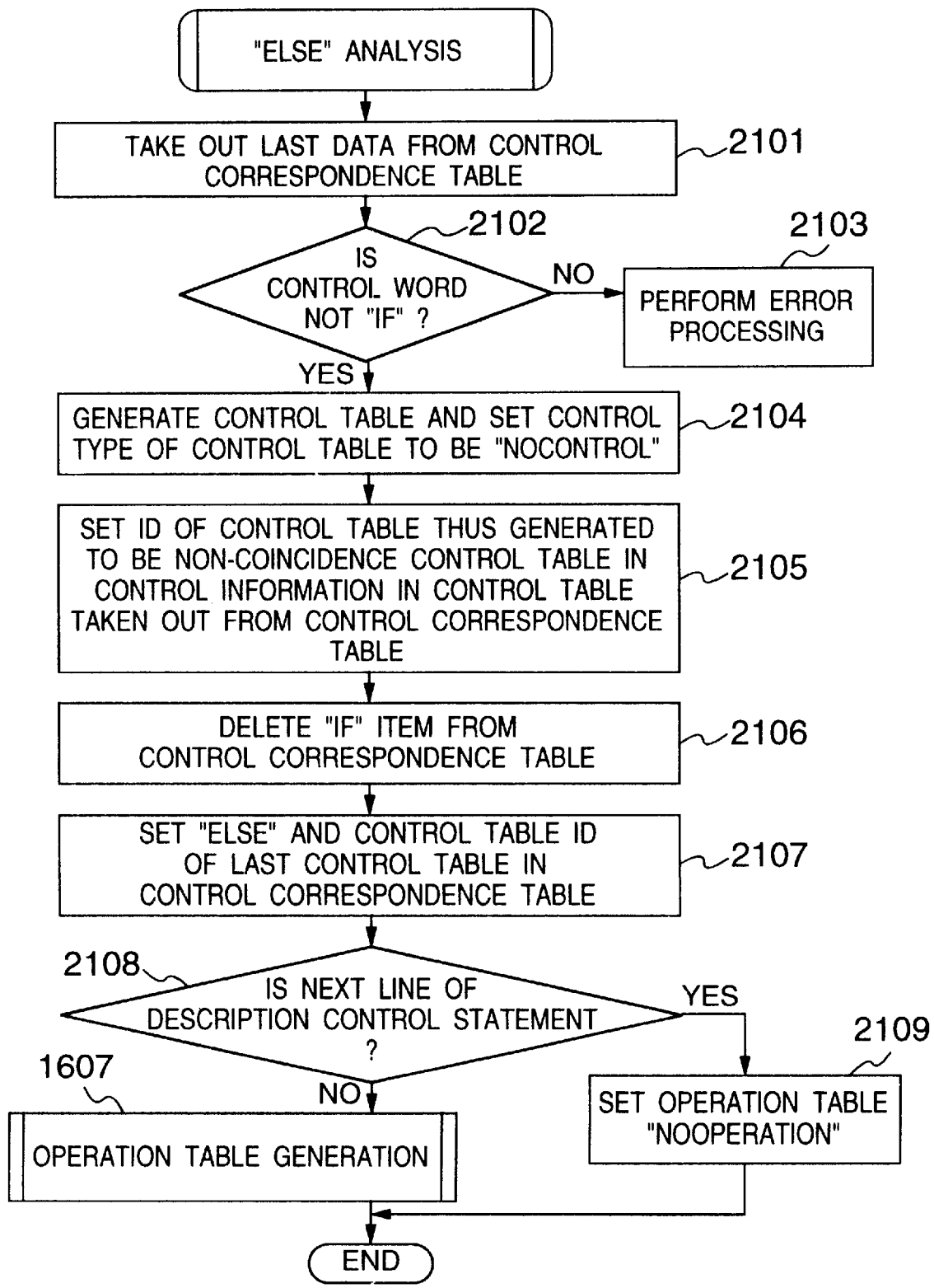
FIG. 21 is a flow chart of analysis in the case where ELSE is described in the behavior template.

FIG. 21 is a flow chart of ELSE analysis 1511 which is a process in the case where the read-out preengagement word is "ELSE". First, the last data is taken out from the correspondence table of preengagement word (2101) and a judgment is made as to whether the data is a control word "IF" or not (2102). If the data is not "IF", the process is terminated as an error (2103). If the data is "IF", a control table 1301 is generated and "NOCONTROL" is set as the control type 1303 thereof (2104). Then, the control table ID 1302 of the control table 1301 thus generated is set as a not-coincidence control table in the control information 1304 of the control table 1301 picked out from the correspondence table 1701 of preengagement word (2105).

Further, the last item is deleted from the correspondence table 1701 of preengagement word (2106), and then the control word "ELSE" and the control table ID 1302 of the lastly generated control table 1301 is set in the correspondence table 1701 of preengagement word (2107). Then, the next description in the behavior templates is read (2108). If the read-out description is a control statement, "NOOPERATION" is set in the operation table ID 1305 of the control table 1301 (2109). If it is not a control statement but a management operation, an operation table for the management operation is generated (1607).

Figure 22:
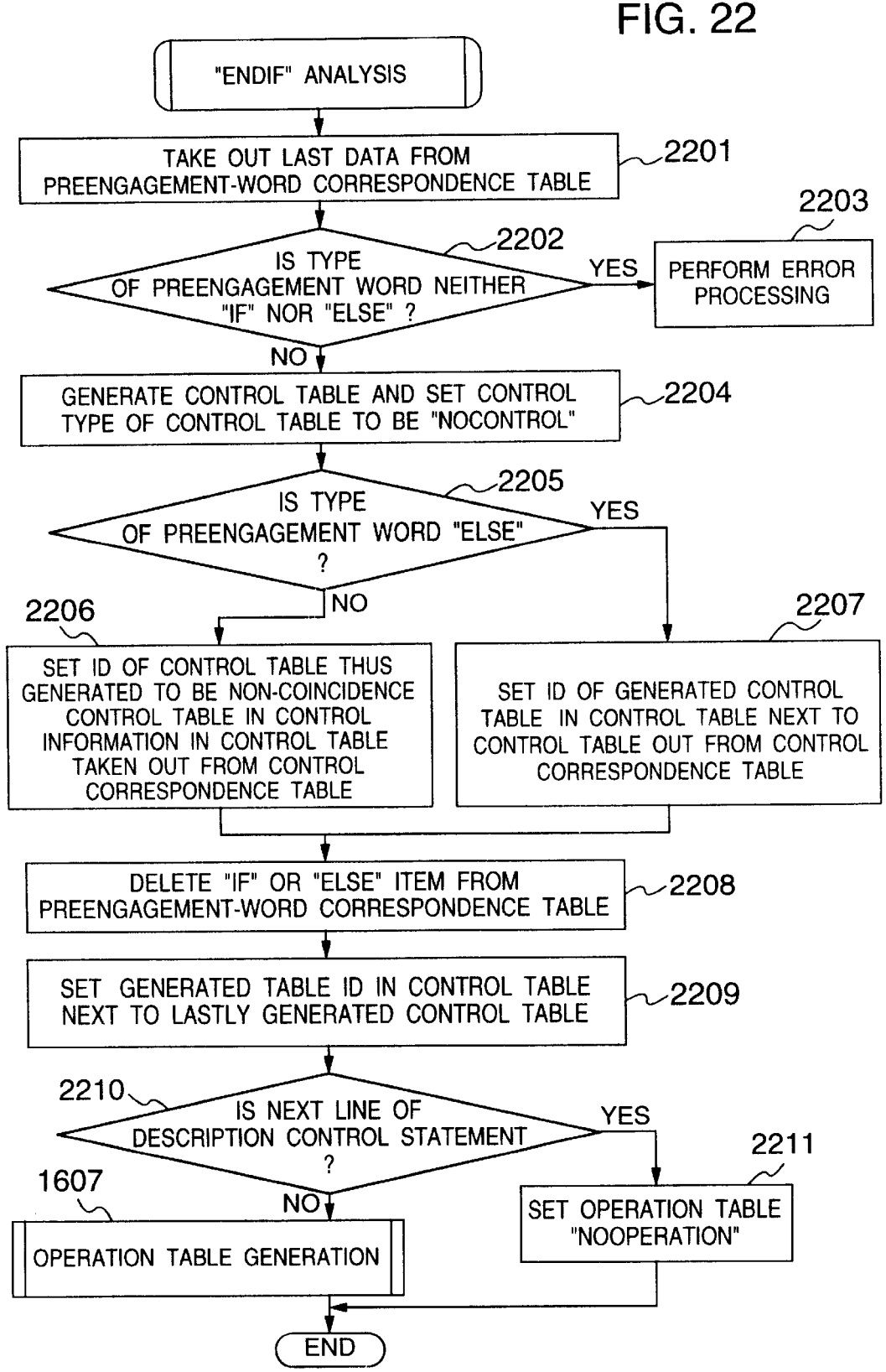
FIG. 22 is a flow chart of analysis in the case here ENDIF is described in the behavior template.

FIG. 22 is a flow chart of ENDIF analysis 1512 in the case where the preengagement word thus read out is "ENDIF". First, the last data in the correspondence table of preengagement word is taken out (2201) and a judgment is made as to whether the data is "IF" or "ELSE" (2202). If the data is neither "IF" nor "ELSE", the analysis is terminated as an error (2203). If the data is either "IF" or "ELSE", the control table 1301 is generated and the control type 1303 thereof is set as NONCONTROL (2204). Then, a judgement is made as to whether the data taken out from the correspondence table 1701 of preengagement word is "ELSE" or not (2205). If the data is "IF", the control table ID 1302 of the generated control table 1301 is set as a non-coincidence control table in the control information 1304 of the corresponding control table 1301 (2206). If the data taken out from the correspondence table 1701 of preengagement word is "ELSE", the control table ID 1302 of the currently generated control table 1301 is set in the control table 1306 next to the corresponding control table 1301 (2207). Then, the last item is deleted from the correspondence table 1701 of preengagement word (2208). Further, the control table ID 1302 of the currently generated control table 1301 is set in the control table 1306 next to the lastly generated control table 1301 (2009) and the next description in the behavior templates is read (2210). If the description thus read out is a preengagement word, "NOOPERATION" is set in the operation table ID 1305 of the control table 1301 (2211). If there is the description of management operation, an operation table for the management operation is generated (1607).

Figure 23:
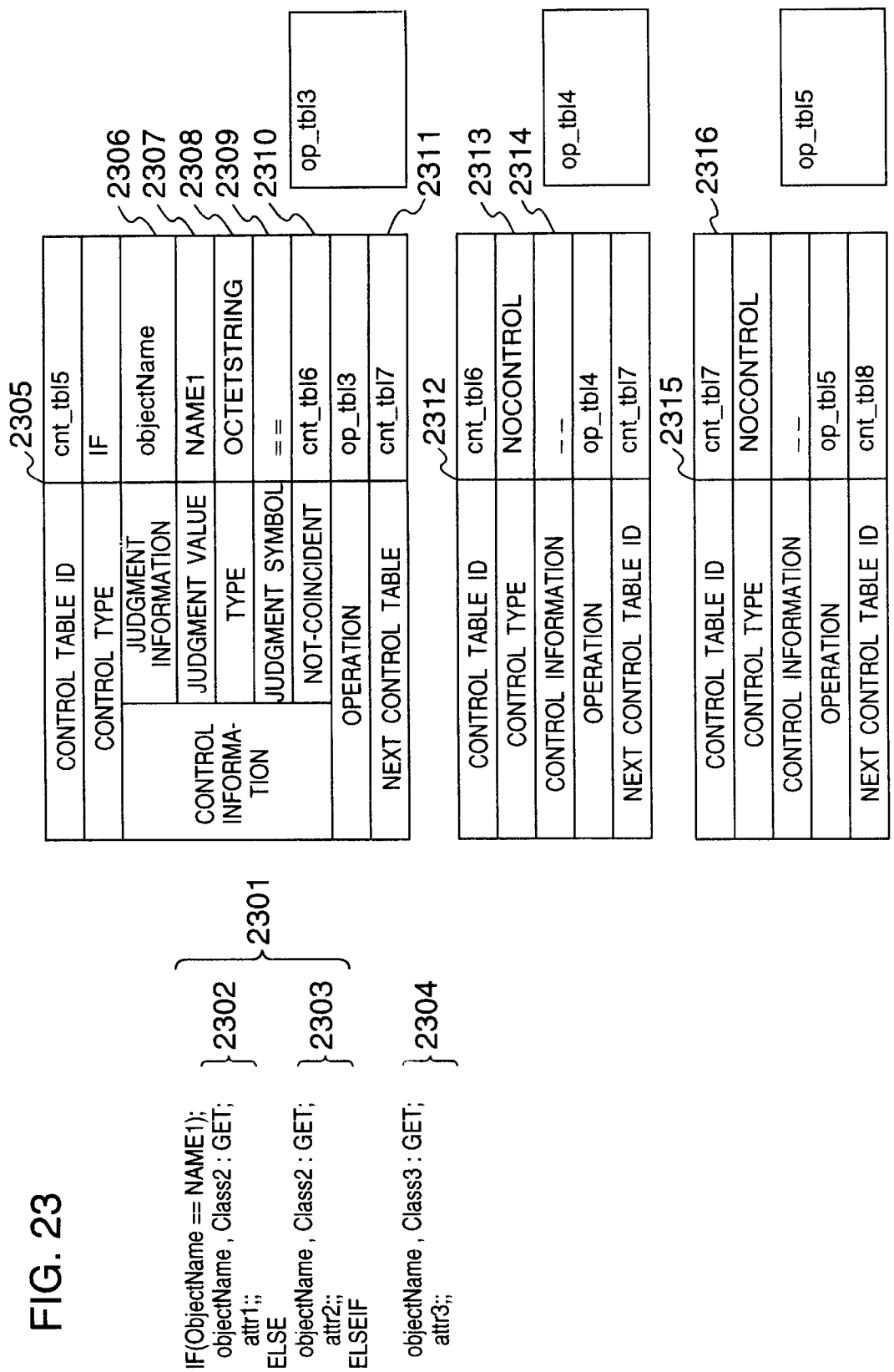
FIG. 23 is a table showing the relation between conditional operation described in the behavior template and a control table corresponding to the description thereof.

FIG. 23 shows an example of analysis concerning this conditional judgment. The description 2301 expresses that, if ObjectName designated by the request of action is "NAME1", the attribute values of the attributes attr1 of object instances are collected (2302) and that, if not, the attribute values of the attributes attr2 of object instances are collected (2303). Judgment information 2306 indicating the position where information for conditional judgment is stored, the value 2307 of the conditional judgment, the type 2308 of the information for the conditional judgment, the symbol 2309 for the conditional judgment and the control table ID 2310 for changing the operation at the time of not-coincidence are stored as control information into a control table 2305 corresponding to the operation 2302 of collecting the attribute values of the attributes attr1. In this example, the control table ID 2316 of a control table 2315 corresponding to the operation 2304 described after "ENDIF" is set in the next control table 2311 because only one operation is set at the time of coincidence of the condition. Because the control type 2313 of a control table 2312 corresponding to the operation 2303 of collecting the attribute values of the attributes attr2 is NOCONTROL, there is nothing stored in the control information 2314.

Figure 24:
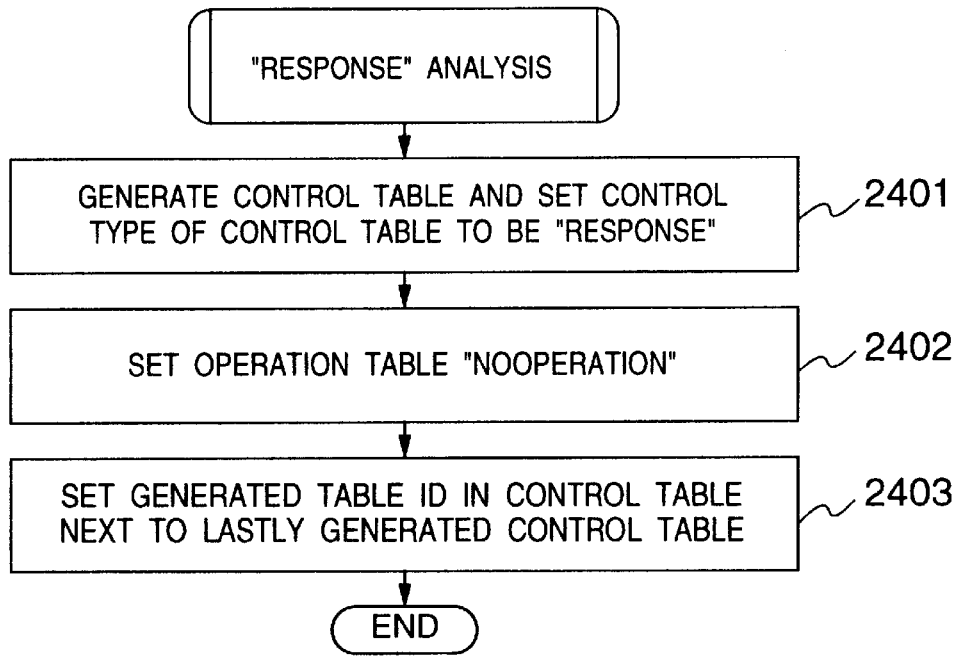
FIG. 24 is a flow chart of analysis in the case where RESPONSE is described in the behavior template.

FIG. 24 is a flow chart of RESPONSE analysis 1513 in the case where the preengagement word is "RESPONSE". In this case, because there is no operation table, a control table 1301 is first generated and the control type 1303 thereof is set to "NOCONTROL" (2401). Then, the operation table ID 1305 is set to "NOOPERATION" (2402). Further, the control table ID 1302 of the currently generated control table 1301 is set in the control table 1306 next to the lastly generated control table 1301 (2403).

Figure 25:
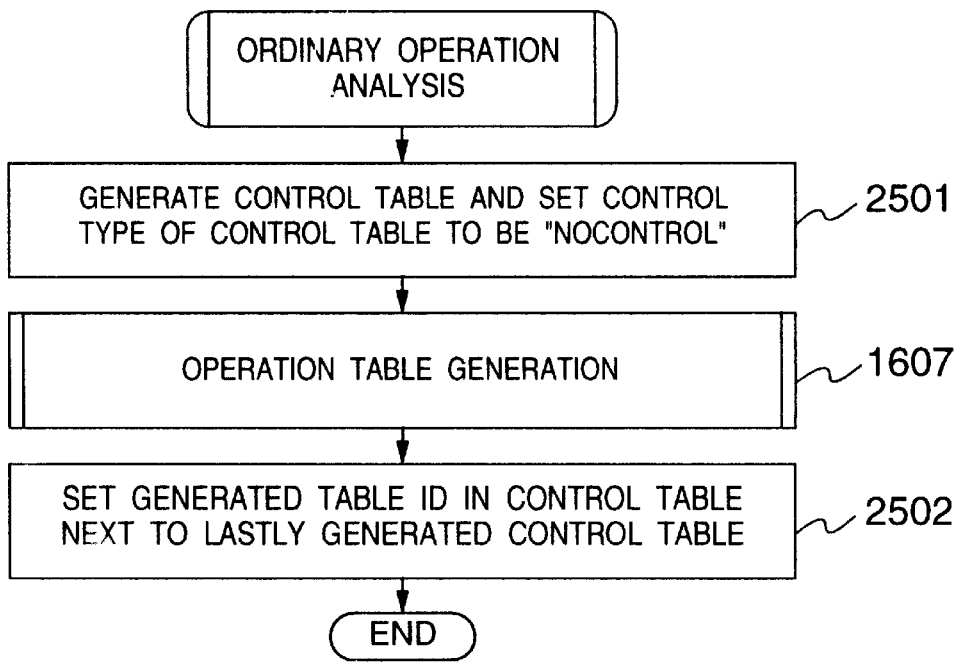
FIG. 25 is a flow chart of analysis in the case where a management operation is described in the behavior template.
Figure 26:
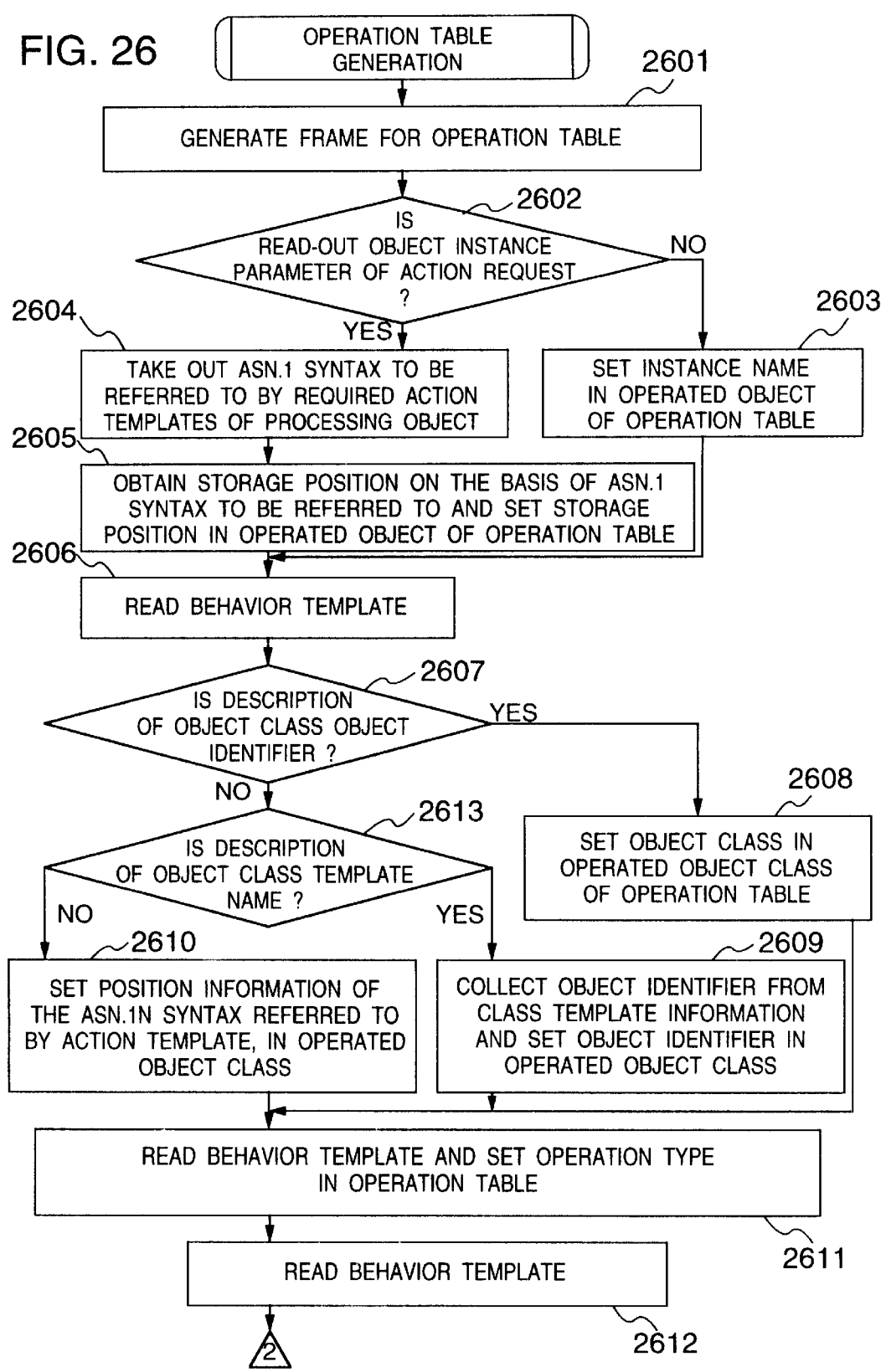
FIG. 26 is a flow chart showing the first portion of a process for generating the operation table.
Figure 27:
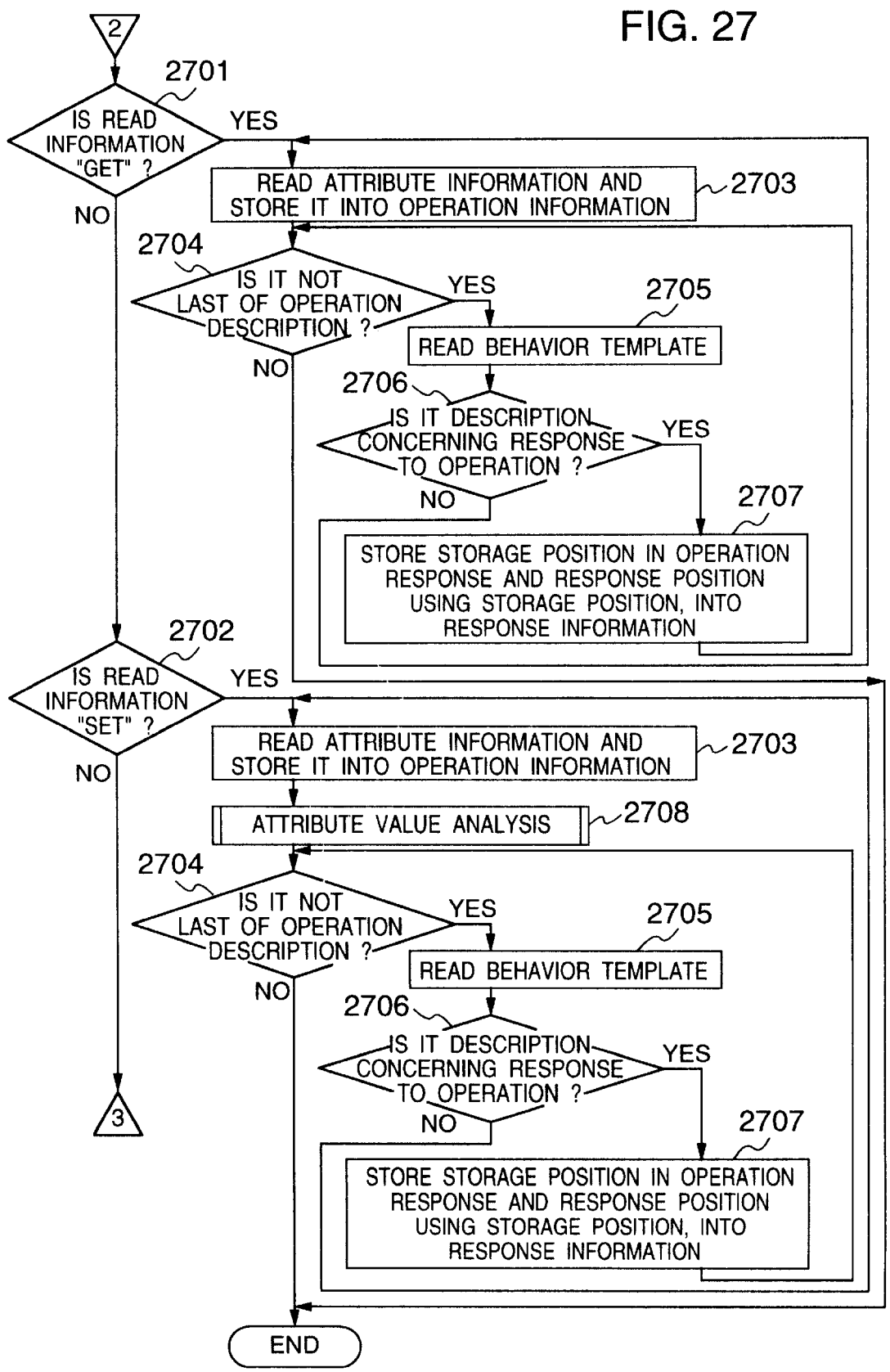
FIG. 27 is a flow chart showing the second portion of the process for generating the operation table.

FIG. 25 is a flow chart of ordinary operation processing 1514 which is a process in the case where the read-out description is different from the preengagement words such as "SCHEDULE", "SCHEDULEEND", "IF", "ELSE", "ENDIF" and "RESPONSE". First, a control table 1301 is generated and the control type 1303 thereof is set to "NOCONTROL" (2501). Further, an operation table is generated by the operation table generating process 1607 and then the control table ID 1302 of the currently generated control table 1301 is set in the control table 1306 next to a control table 1301 corresponding to the last operation (2502).

The control table 1301 is generated by the aforementioned process. The operation table generating process 1607 which is part of the aforementioned process will be explained below. FIGS. 26 to 32 show flow charts of this process.

If the description read from the behavior templates is other than the preengagement words, this description is regarded as an operated object for management operation. First, a frame for an operation table 1201 is generated (2601). Then, a judgment is made as to whether the instance name thus read out is directly designated or reported as an action parameter (2602). If the instance name is directly designated, the instance name is directly set in the operated object instance 1204 of the operation table 1201 (2603). If the instance name is reported as an action parameter from a management application, the ASN.1 syntax referred to by the action templates is taken out from the database 13 (2604) and the position where the action parameter is stored is obtained on the basis of the ASN.1 syntax thus taken out and set in the operated object instance 1204 of the operation table 1201 (2605). Then, a behavior template is read out (2606) and a judgment is made as to whether the description of the object class obtained from the read-out behavior template is the identifier of an object, the name of a class template or an action parameter (2607, 2613). If the object class described is an object identifier, this object class is set in the operated object class 1205 of the operation table 1201 (2608). If the object class described is the name of a class template, a corresponding object identifier is retrieved from class template information in the database 13 and set in the operated object class 1205 of the operation table 1201 (2609). If the object class described is an action parameter reported from the management application 11, the storage position is obtained from the database 13 on the basis of the ASN.1 syntax referred to by the action template and the storage position is set in the operated object class 1205 of the operation table 1201 (2610). Then, the operation type is read from the behavior template and set in the operation type 1203 of the operation table 1201 (2611).

When the behavior template is further read out (2612), the operation type is picked out and the kind of his operation type is examined (2701, 2702, 3101, 3102, 3201, 3202).

If the information thus read out is GET, examination is made upon the description of the attribute 1401 which is set to be collected as an operation parameter. If the attribute 1401 described is an object identifier, the object identifier is set in the operation information 1206 of the operation table 1201. If the attribute described is the attribute template label of an operated object, a corresponding object identifier is picked out from the template information in the database 13 and set (2703). If the operation description thus processed is not the last operation description (2704), the behavior template is further read out (2705). If description concerning response to the management application is located when the information read-out is examined (2706), information after "RSP" in this information and the response information storage position which is obtained on the basis of the ASN.1 syntax referred to at the time of response by the action template required by the management application 11 is stored into the response information 1207 of the operation table 1201. Further, on the basis of information read from the behavior template, information indicating the response of the management operation which is to be referred to as response to the management application is set (2707). This process is carried out till the last of the operation description (2703, 2704). For example, assuming now that attr5, attr6 and classA in the GET operation 613 starting from the 25th line in FIG. 6 are defined by templates 2811 to 2813 shown in FIG. 28, then the storage position of the ASN.1 syntax for the action request is set in the operated object instance 2803 of the operation table 2801. Further, the object identifier 2816 collected from the class template 2813 of classA is set in the operated object class 2804. Further, the object identifier 2814 indicated by the attribute template 2811 of attr5 is set in the operation attribute 2805. Further, the object identifier 2815 indicated by the attribute template 2812 of attr6 is set in the operation attribute 2806. Further, the storage positions of response parameters are stored as response information into the response attributes 2807 and 2808. The respective object identifiers 2814 and 2815 of attr5 and attr6 are stored into the correspondence attributes 2809 and 2810 respectively.

Figure 29:
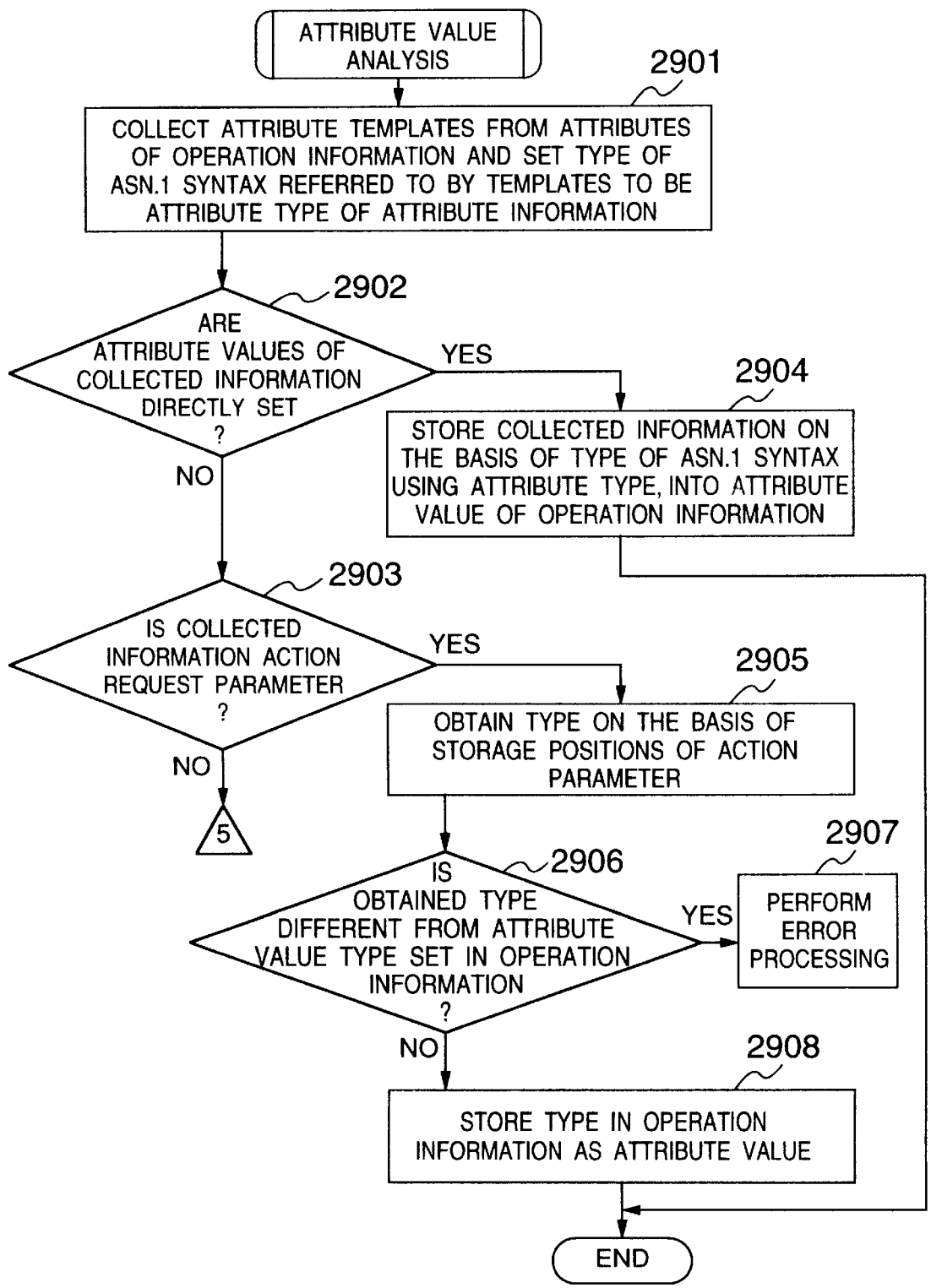
FIG. 29 is a flow chart showing the first half of a process for analyzing attribute values in the behavior template.
Figure 30:
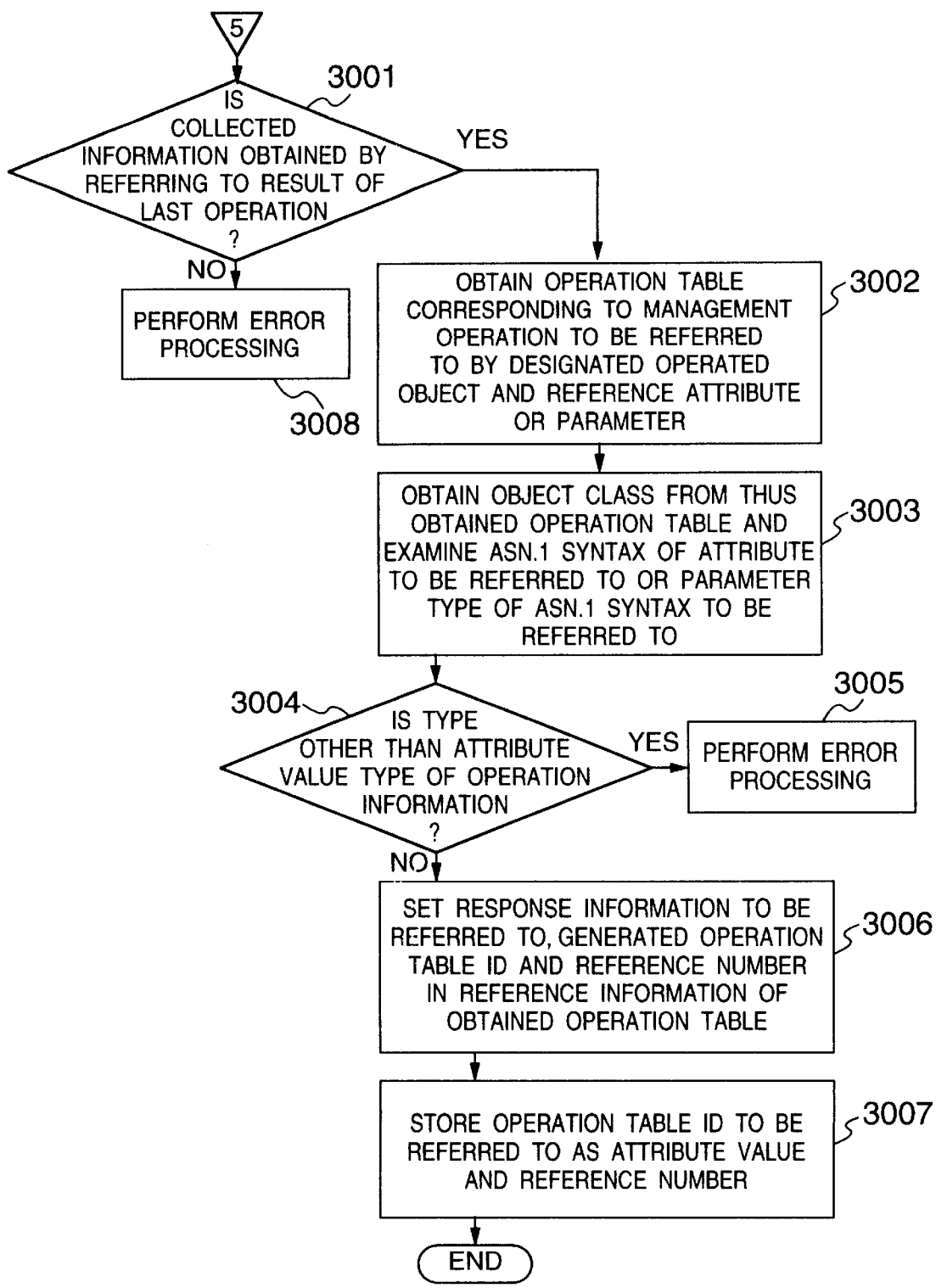
FIG. 30 is a flow chart showing the second half of the process for analyzing attribute values in the behavior template.
Figure 31:
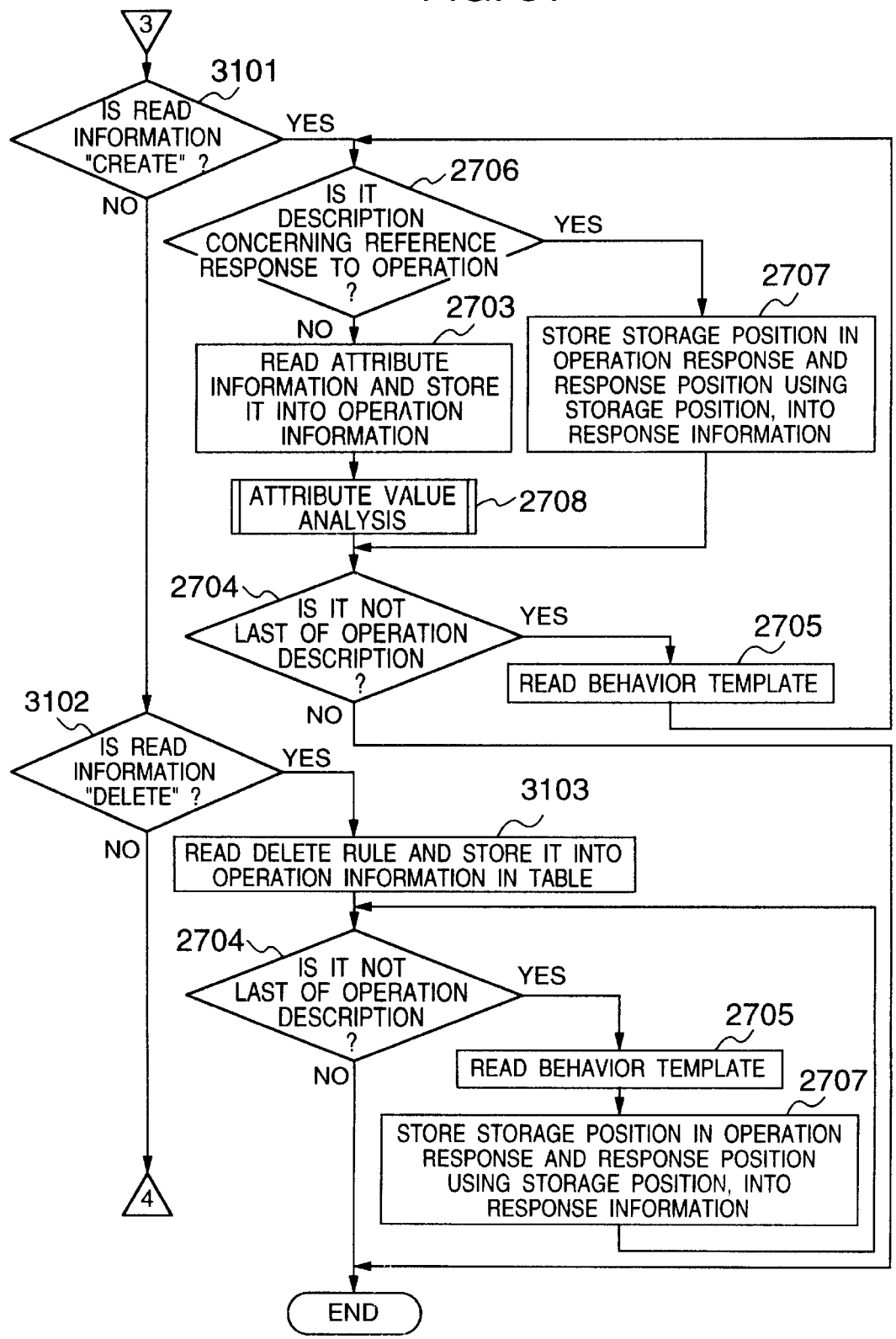
FIG. 31 is a flow chart showing the third portion of the process for generating the operation table.
Figure 32:
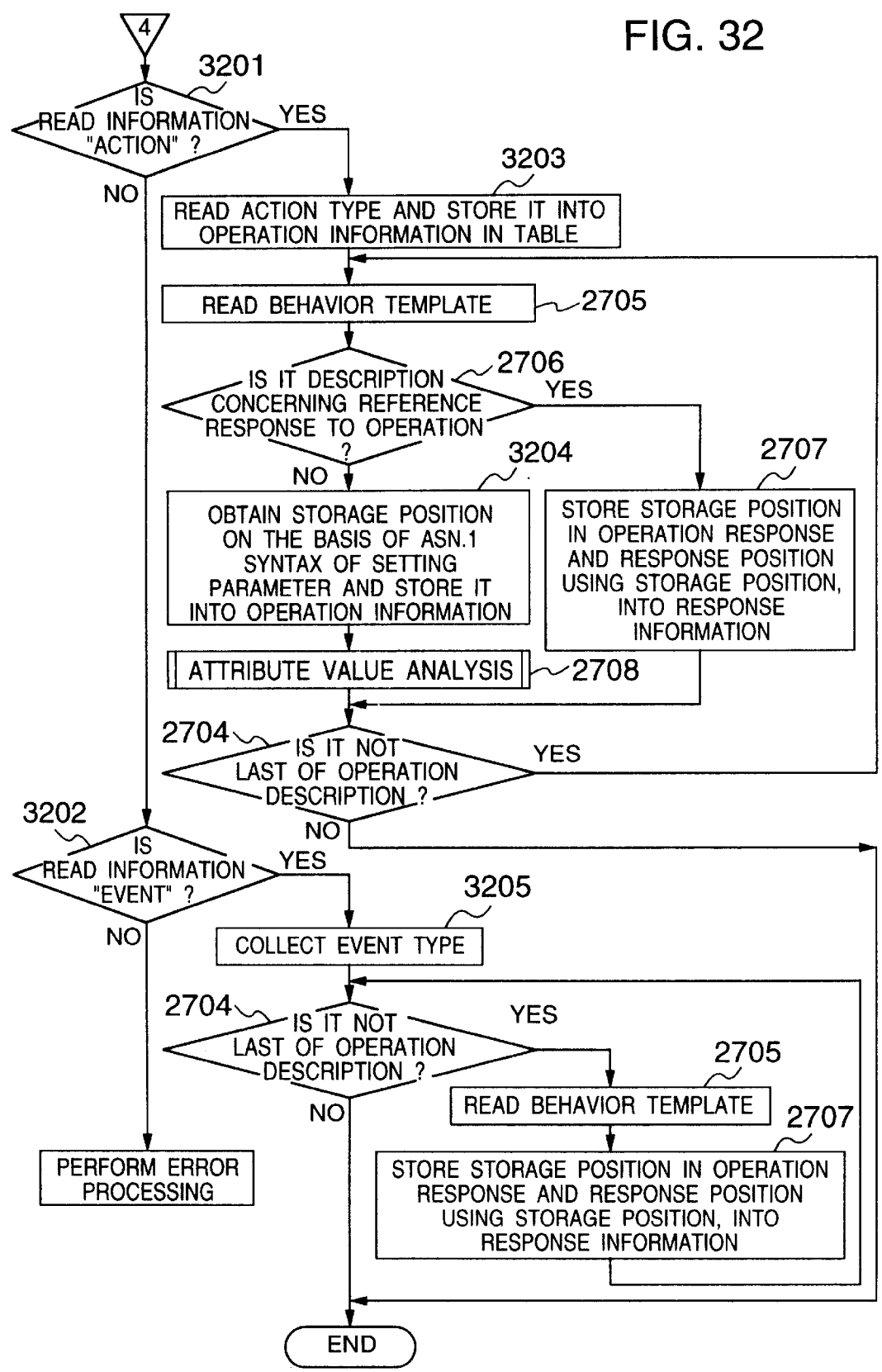
FIG. 32 is a flow chart showing the fourth portion (the last portion) of the process for generating the operation table.

If the information read-out is SET, attribute collection 2703 and attribute value analysis 2708 for attribute values 1404 and 1405 before and after changing, respectively, are performed. The attribute collection 2703 is a process for setting the attribute of operation information 1206 of the operation table 1201, that is, this process is the same process as that explained above for GET operation (2703). The attribute value analysis 2708 is a process for obtaining the attribute value type 1403 and attribute value of the operation information 1206 in the operation table 1201. FIGS. 29 and 30 are flow charts of these processes.

First, attribute templates corresponding to attributes 1402 existing in the operation information 1206 are obtained and ASN.1 syntax referred to by the templates are collected from the database to thereby set the attribute types thereof (2901). Then, the attribute values are analyzed (2902, 2903, 3001). The value described as an attribute value is described in accordance with the real ASN.1 syntax or reported as an action parameter or as a result of another operation. In the case of real description, the value is set to the attribute value of operation information in the operation table (2904). Further, in the case where the value reported as an action parameter is designated, ASN.1 syntax to be referred to are collected from action templates corresponding to the required action and examined to thereby obtain the storage positions of the attribute values (2905). Then, the type of the attribute value is compared with the attribute value type 1403 set in the operation information 1206 of the operation table 1201 (2906). If the two types are different from each other, the process is terminated as an error (2907). If the two types are the same, the storage position of the parameter of action request containing the attribute value is set in the attribute value (2908). Further, in the case where the result of the previous management operation is used, an operation parameter corresponding to the management operation to be referred to is obtained on the basis of the operated object and operation parameter designated (3002). The object class is obtained from the thus obtained operation table 1201, so that the ASN.1 syntax type of the attribute (or parameter) to be referred to is examined while retracing the template on the basis of the object class (3003). Then, the type is compared with the first obtained attribute value type 1403 (3004). If the two types are different from each other as a result, the process is terminated as an error (3005). If the two types are the same, the use attribute 1211, use table ID 1202 and reference number 1213 of the reference information 1210 in the operation table 1210 to be referred to are set (3006). Further, the reference number is set in the attribute value of the generated table (3007). If there is no fitted attribute value in the collected attribute values, the process is terminated as an error (3008). As described above, operation information in the case of SET operation is obtained. If the operation description is not the last (2704), the behavior template is read (2705). If there is no description concerning response information to the management application, the same process is repeated. If there is description concerning response information, the setting of response information of the operation template is performed in the same manner as explained above in the GET operation (2706, 2707).

If the read-out information is CREATE, a judgment is first made as to whether the description of the information thus read concerns response information to the management application or not (2706). If the information concerns response information, the setting of response information of the operation template is performed in the same manner as explained above in the GET operation (2707). If the information does not concern response information, attribute collection (2703) and attribute value analysis (2708) are carried out in order to set the attribute value of an object to be generated. The attribute collection (2703) is the same process as that explained above in the GET operation. The attribute value analysis (2708) is the same process as that explained above in the SET operation. If this processing is not the last operation content of the management operation, the behavior template is read to repeat the aforementioned processing (2705).

If the read-out information is DELETE, a DELETE_RULE 1409 is read and set as operation information 1206 in the operation table 1201 (3103). If the information is not the last operation content, information concerning response with respect to the management application 11 is regarded as being described so that the behavior template is read (2705) and the same process as that explained above in the GET operation is executed to generate response information of the operation table (2707). This processing is repeated till the last description of the operation content.

If the read-out information is ACTION, the action type is read and stored into the operation information 1206 in the operation table 1201 (3203). Then, the behavior template is read (2705) and a judgment is made as to whether it is an information parameter concerning response to the management application or not. If it is an information parameter, the same process as explained above in the GET operation is executed to generate response information of the operation table (2707). If not, the ASN.1 syntax to be referred to is obtained from the action template on the basis of the collected information. Further, the position of storage of the designated parameter is obtained on the basis of the ASN.1 syntax and set as the parameter of the operation information in the operation table (3204). Thereafter, attribute value analysis with respect to the type and value of the ASN.1 syntax is performed in the same manner as explained above in the SET operation (2708). If this process is not the last operation content (2704), the aforementioned processing is repeated.

Finally, if the operation type is EVENT, the event type is collected and stored into the operation information in the table (3205). If the information is not the last operation content (2704), information concerning response with respect to the management application is regarded as being described so that the behavior template is read (2705) and the same process as that explained above in the GET operation is executed to generate response information of the operation table (2707). This processing is repeated till the last description of the operation content.

After the corresponding operation is expressed in the form of a table as described above, the internal table generating portion 122 informs the processing sequence execution portion 123 of the completion of development into the form of a table and delivers the control table 1301 which is the head of the processing sequence (1106).

Figure 33:
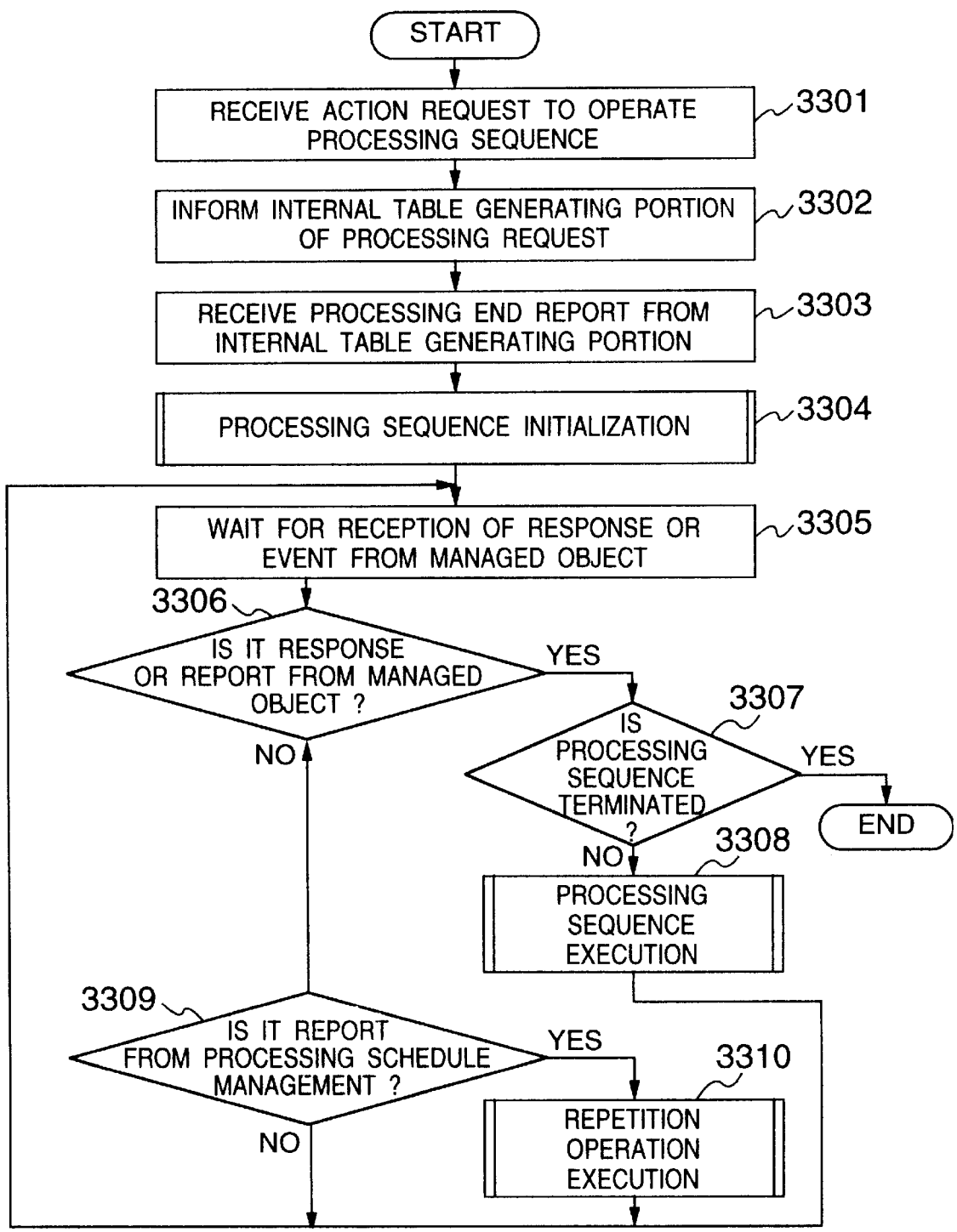
FIG. 33 is a flow chart of a process for providing a processing sequence execution portion.

In the following, the processing sequence execution portion 123 for executing the processing sequence requested to be operated from the management application 11 on the basis of various kinds of tables generated by the internal table generating portion 122 will be explained. FIG. 33 shows the outline of processing in the processing sequence execution portion 123.

Upon reception of an action request from the management application to operate a processing sequence (3301), the processing sequence execution portion 123 informs the internal table generating portion 122 of the processing request (3302). Then, upon reception of a report from the internal table generating portion (3303), the processing sequence execution portion 123 carries out processing sequence initialization (3304). The initialization contains initialization for execution of the processing sequence and execution of the first management operation of the processing sequence. When response is received from a managed object after the processing sequence initialization 3304 is carried out (3305, 3306), processing sequence execution is performed (3308). This is a process for executing a management operation by using the control table 1301 and the operation table 1201. The aforementioned process is repeated and terminated when the processing sequence is executed completely (3307). Further, in the case where the processing sequence contains a repetition operation set (3309), repetition operation execution 3310 at that time is performed at that time because the report to start the operation set periodically is given from the processing schedule management portion 124. In the following, the respective processes described above will be explained in detail.

Figure 34:
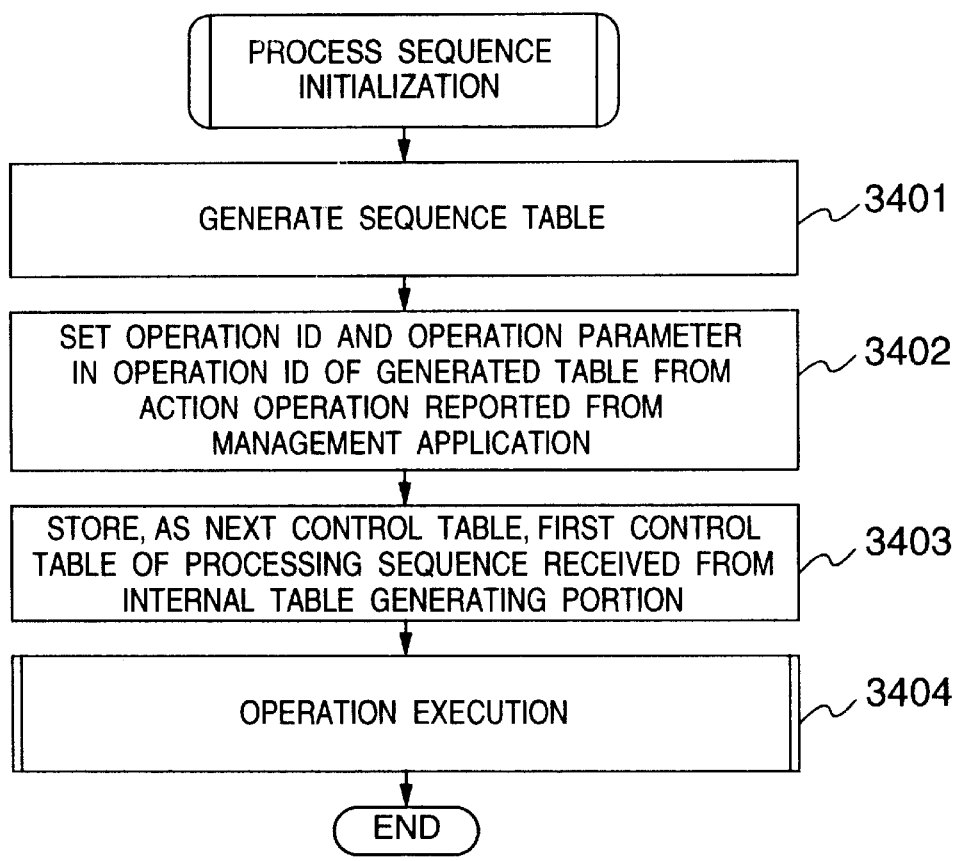
FIG. 34 is a flow chart of processing sequence initialization which is a part of the processing sequence execution portion.

First, the processing sequence initialization 3304 will be explained. FIG. 34 is a flow chart of the processing sequence initialization 3304. The processing sequence execution portion 123 generates a sequence table 3501 for monitoring the progress of the sequence as shown in FIG. 35 (3401). The sequence table ID 3502 in the table is a value for univocally designating the sequence table. An operation ID added to an action operation required by the processing sequence is stored into the operation ID 3503. An operation invoke ID for the managed object which is an object to be managed is set in the invoke ID 3504. The identifier of a control table corresponding to the current operation is set in the use control table 3505 when the operation with respect to the managed object is completed. Further, the next use control table 3506 is an area for storing the identifier of a control table for the next operation. The use control operation and the next use control operation are set simultaneously. The event condition 3507 is an area for storing an object to which an event is delivered and for storing the type of the event. The content of an operation corresponding to the next use control table 3506 is set in this area only in the case of event analysis, whereas this area is released after the completion of the event analysis. The operation parameter 3508 is an area for storing a parameter received from the management application 11, and the response parameter 3509 is an area for designating a memory area for storing a parameter of response to the management application. Other information 3510 and 3511 are areas for storing information, such as the current number of repetition times in repetition processing, necessary for execution of processing.

After the aforementioned table is generated, an operation ID and an operation parameter are set in the operation ID 3503 in the generated table from the action operation reported from the management application 11 (3402). Further, the first control table 1301 of the processing sequence is set in the next use control table 3506 on the basis of the operation table 1201 delivered from the internal table generating portion 122 (3403) and operation execution is performed (3404).

Figure 36:
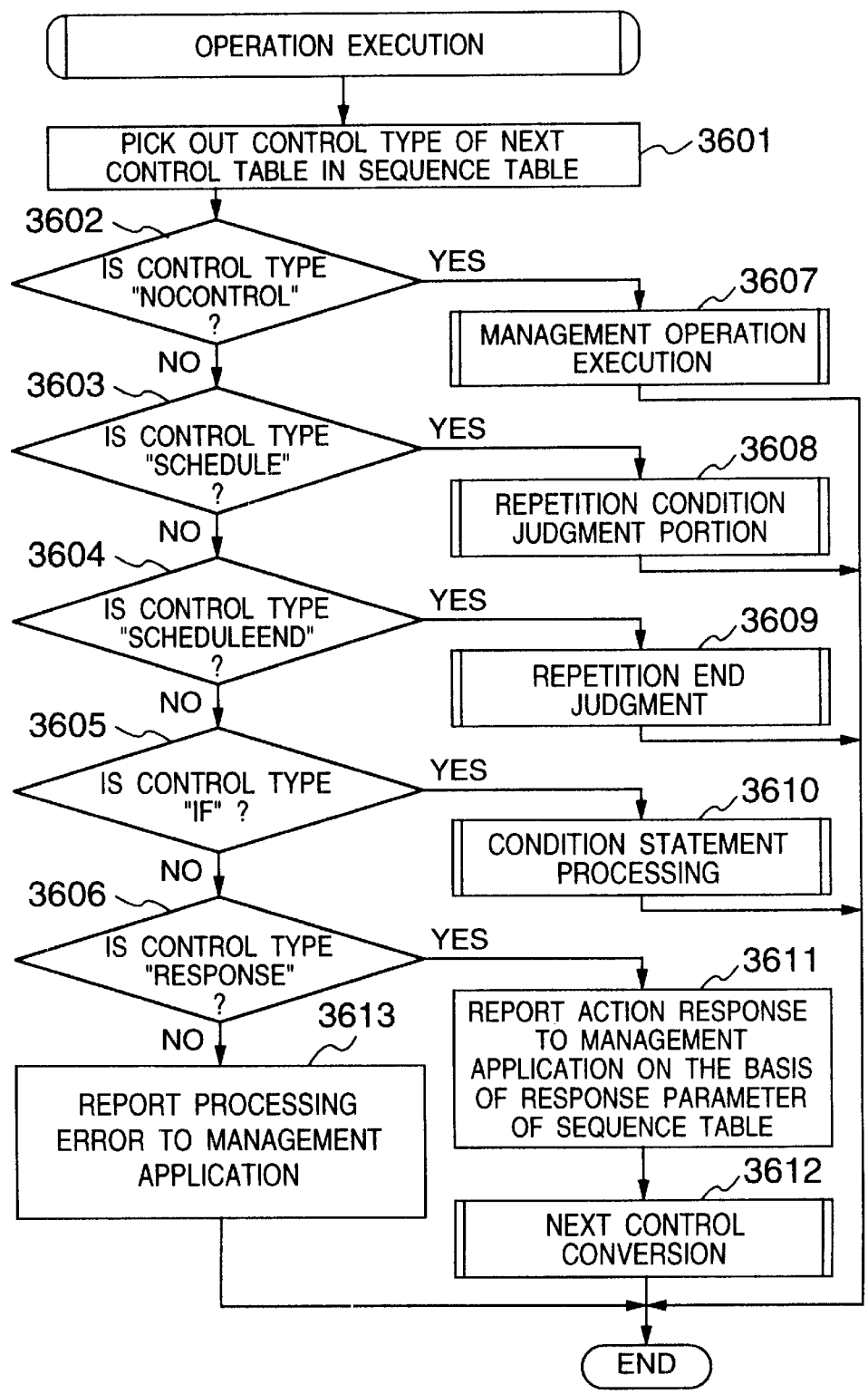
FIG. 36 is a flow chart of operation execution which is a part of the processing sequence execution portion.

The operation execution 3404 is a process for executing a management operation on the basis of the control table 1301. FIG. 36 is a flow chart of the operation execution 3404. In the operation execution 3404, the control type of the next control table is picked out from the sequence table (3601), a judgment is made as to what is the control type in the table (3602–3606), and processing is executed correspondingly to the respective process (3607–3612). If there is no control type to be fitted, the management application 11 is informed of the processing error (3613).

Figure 37:
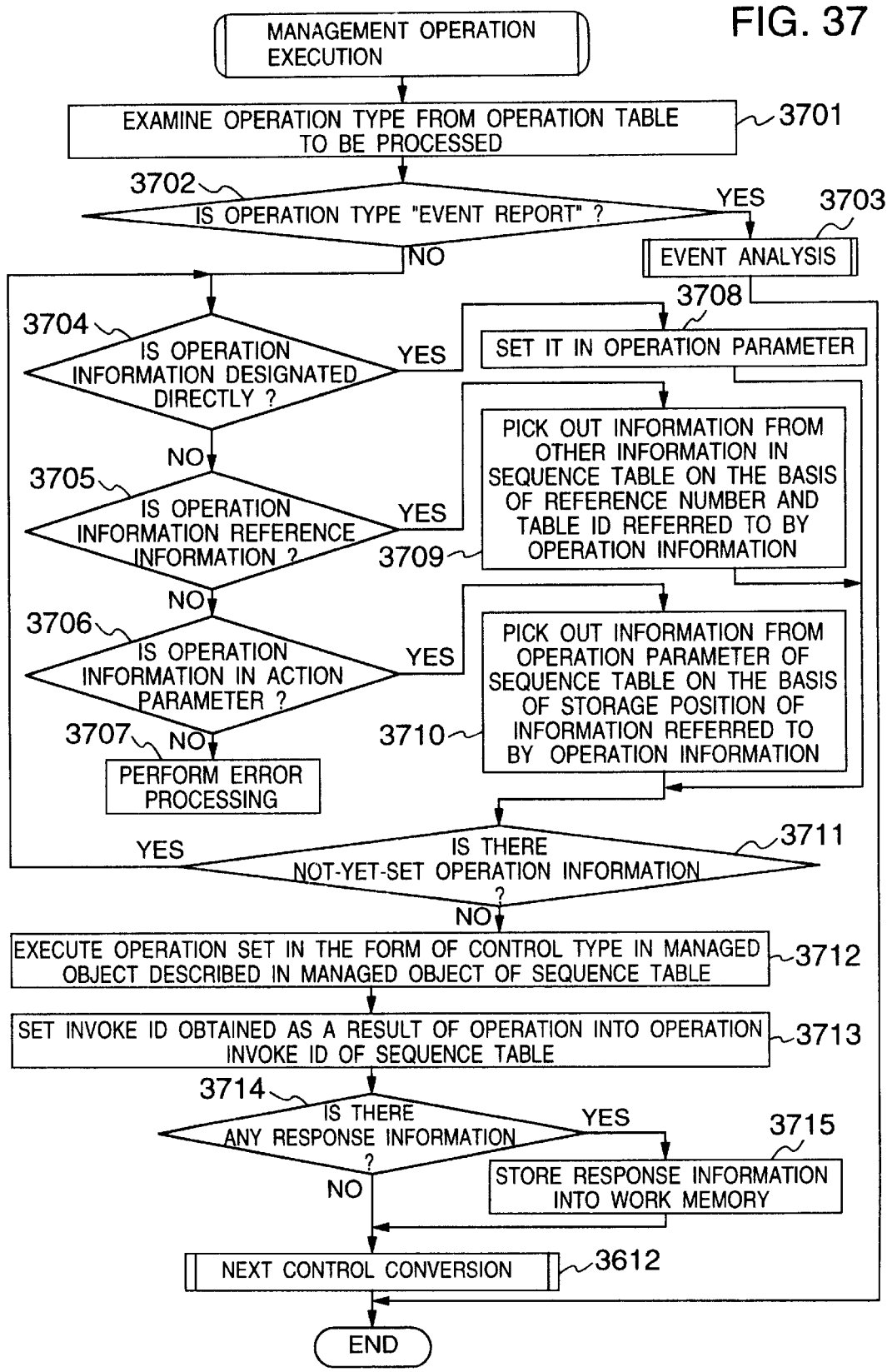
FIG. 37 is a flow chart of management operation execution which is a part of the processing sequence execution portion.

First, a process (3607) in the case where the control type is "NOCONTROL" will be explained. FIG. 37 is a flow chart showing this case. When the control type is "NOCONTROL", an operation of picking out the operation table in the control table is carried out because there is no necessity of special control on the processing sequence.

Figure 38:
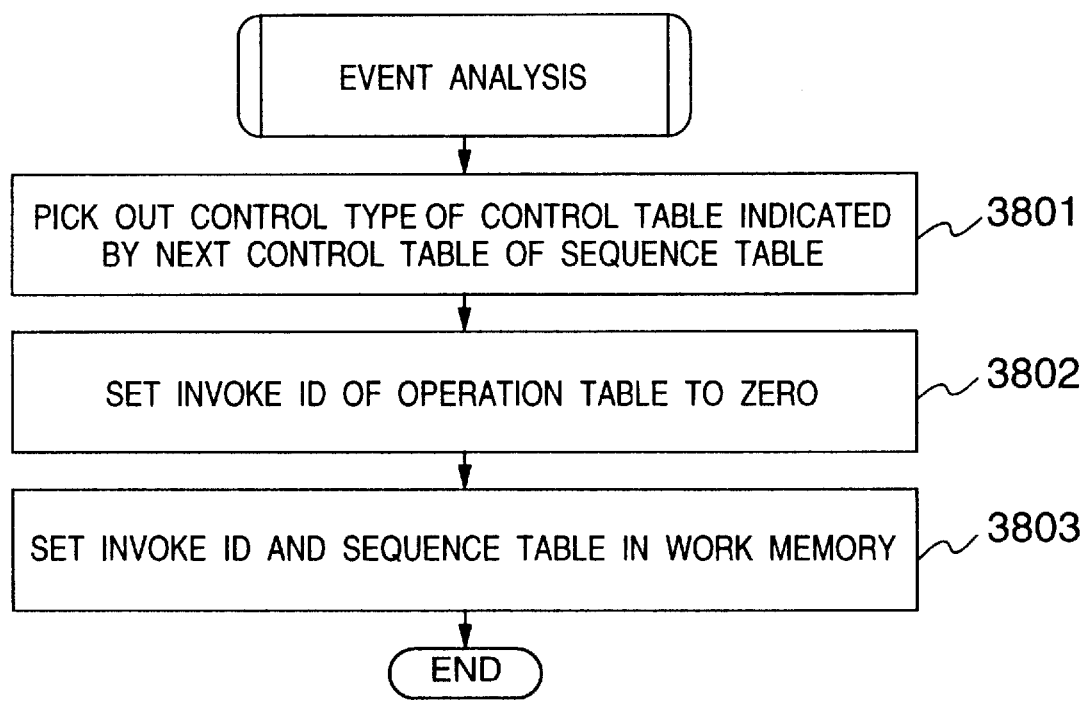
FIG. 38 is a flow chart of event analysis.

First, the operation type in the operation table is examined (3701, 3702). If the operation type is EVENT, event analysis 3703 is performed. The event analysis 3703 is other than the ordinary operation. FIG. 38 is a flow chart of the event analysis. In the event analysis 3703, the control type of the control table indicated by the next control table of the sequence table is picked out (3801), the invoke ID of the operation table is set to zero (3802), and the invoke ID is set in the work memory to thereby complete the event analysis 3703 (3803). If the operation type is not EVENT, operation parameter for management operation is set on the basis of the operation information in the operation table. The operation information may be directly designated or may be reference information as a result of other operation or may be parameter delivered from the management application. The kind of the operation information is examined (3704–3706). If the operation information does not belong to any one of them, the operation information is regarded as an error (3707). First, when the operation attribute is designated, the value thereof is made an operation parameter (3708). When the operation information is reference information, reference information in the work memory is picked out on the basis of the reference number and the operation table ID (3709). In initial definition, there is no process to be carried out because there is no reference table. Finally, when the operation information is a parameter at the time of action request, information is picked out from the operation parameter of the sequence table on the basis of information indicating the position of the information (3710). The aforementioned processing is repeated until all operation parameters are set completely (3711).

Figure 39:
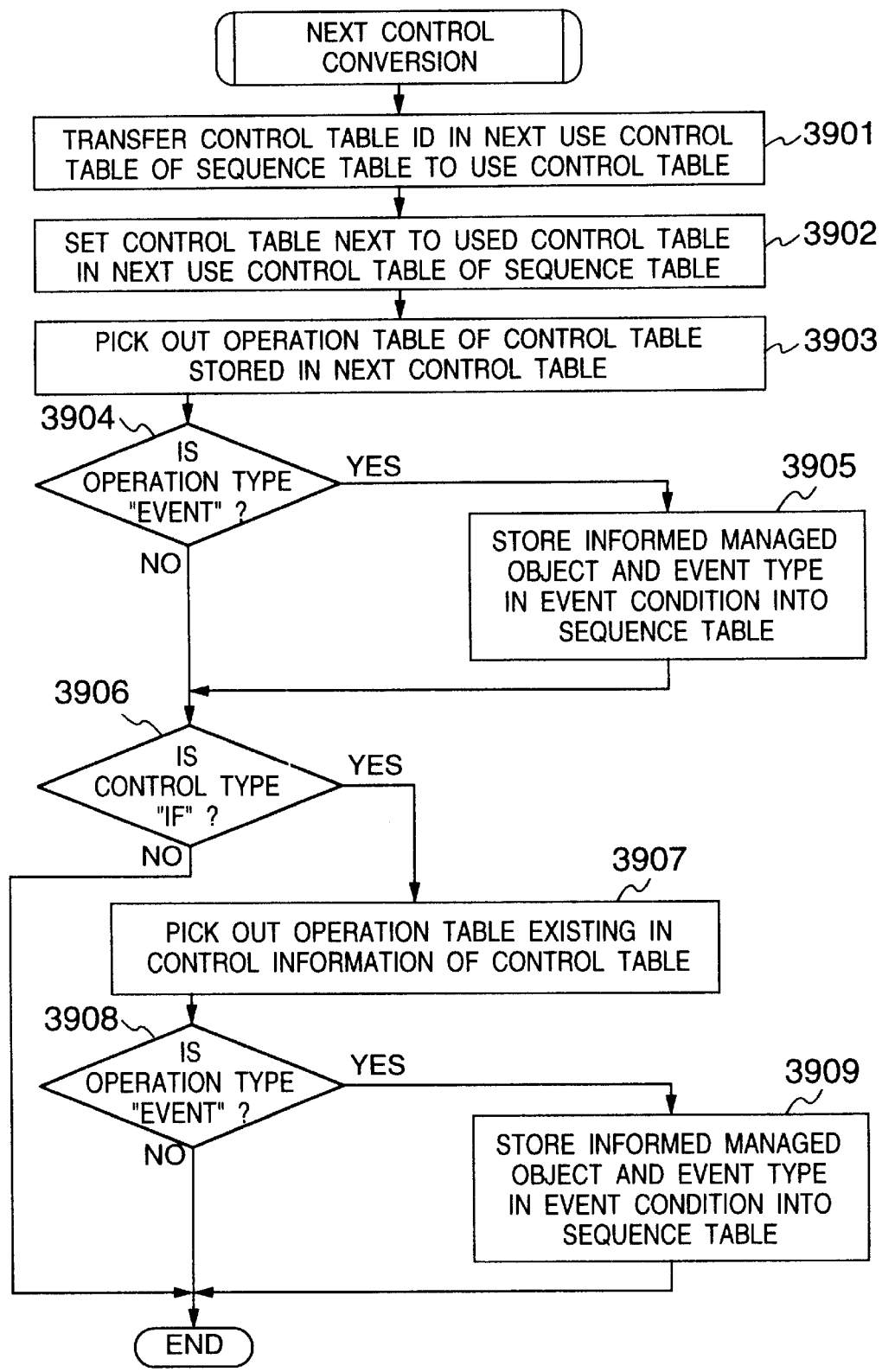
FIG. 39 is a flow chart of next control conversion which is a part of the processing sequence execution portion.

After the operation parameters have been set, the management operation is executed on the basis of the operated object instance, operated object class and operation type in the operation table (3712). The invoke ID obtained as a result is set in the invoke ID of the sequence table (3713). If there is further response information (3714), the response information and the sequence table ID are stored into the work memory (3715). When this process is completed, next control conversion 3612 is performed to set the next use control table of the sequence table. FIG. 39 shows the processing sequence of the next control conversion. First, the next use control table of the sequence table is transferred to the use control table (3901). Further, the control table ID from the next control table in the operation control table is stored into the next use control table of the sequence table (3902). Then, an operation table corresponding to the next control table is picked out (3903) and the operation type in the table is examined (3904). If the operation type is EVENT, the event type contained in the operated object parameter and operation attribute of the operation table is set in the event condition in the sequence table (3905). If the control type of the next control table is "IF" in this occasion, the operation table indicated by the control table is not necessary to be used according to the condition. Accordingly, when the control type of the next use control table is IF, the operation table which is referred to by the control table at the time of ELSE is also examined (3906, 3907). If there is some event in either of operation tables, an identifier for judging whether the condition is valid or invalid is set as supplementary information (3908, 3909). Further, if the value of the operation table to be referred to is "NOOPERATION", a judgment is made by tracing the next control table. When the setting of the event condition is completed, the operation execution is finished.

Next, a process (3608) in the case where the control type is "SCHEDULE" will be explained. FIG. 40 is a flow chart of this case. When the control type is "SCHEDULE", the schedule ID in the control information of the control table is first picked out (4001) and a judgment is made as to whether the schedule ID exists as another information in the sequence table or not (4002). If the schedule ID which is information of the control table does not exist as another information, the operation type in the operation table is examined first (4003, 4004). If the operation type is not EVENT, the processing sequence execution portion 123 judges the repetition processing to be started, informs the processing schedule management portion 124 of the request to execute the schedule, and sets the schedule ID and the number of times to zero as other information in the sequence table (4005). Thereafter, management operation execution (3607) and next control conversion (3612) are carried out. If there is some schedule ID in another information in the sequence table, a repetition queue table (4101) expressing the correspondence between the schedule ID (4102) and the sequence table (4103) as shown in FIG. 41 is generated in the work memory and the respective values are stored into the repetition queue table so that the processing sequence execution portion 123 waits for the repetition operation start report from the processing schedule management portion 124 (4006).

Figure 42:
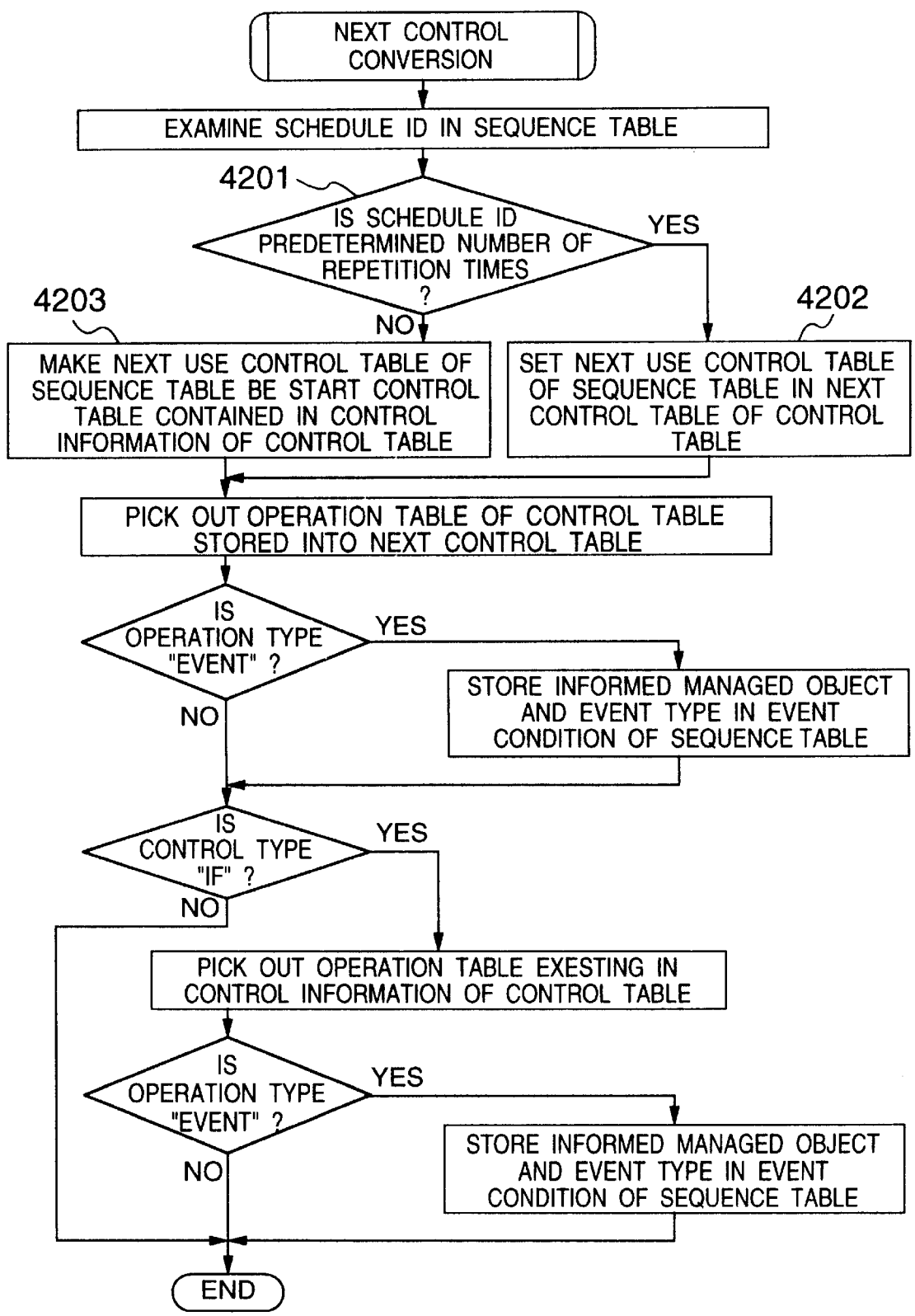
FIG. 42 is a flow chart of next control conversion at the time of repetition conditional judgment.

Next, the case where the control type is "SCHEDULEEND" will be explained. FIG. 42 shows a process in this case. The process in the case where the control type is "SCHEDULEEND" is similar to the operation execution process. When the operation type is "SCHEDULEEND", however, in the setting of the next use control table, the schedule ID in the sequence table is picked out to judge the number of repetition times (4201). If the number of times reaches a predetermined value, the next use control table in the sequence table is set in the next control table in the control table (4202). If not, the next use control table is set in the start control table contained in the control information in the control table (4203).

Figure 43:
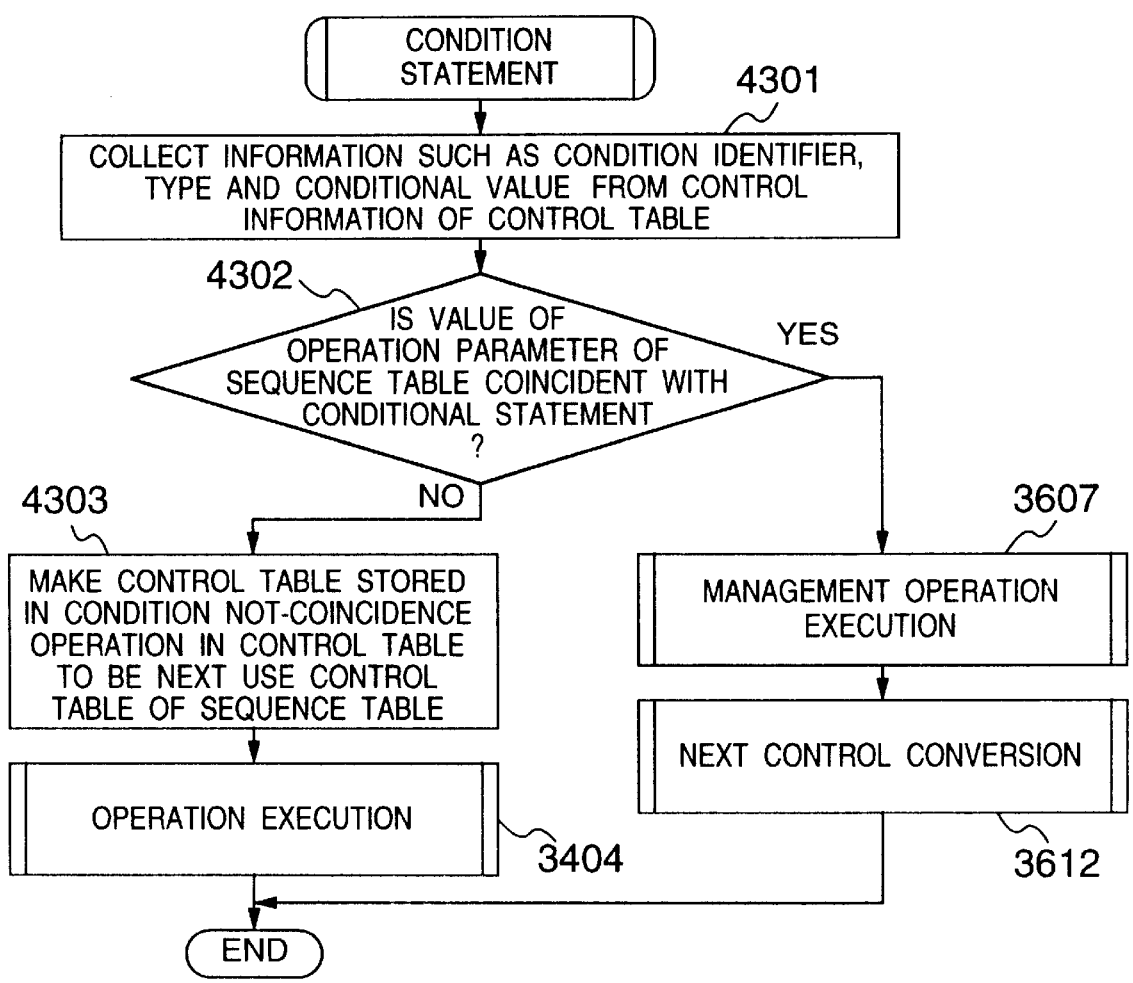
FIG. 43 is a flow chart of conditional statement processing which is a part of the processing sequence execution portion.

Next, a process (3610) in the case where the operation type is "IF" will be explained. FIG. 43 is a flow chart in this case. In this case, condition identifier, type and conditional value and conditional judgment value storage positions which are contained in the control information in the operation control table are picked out (4301) so that a judgment is made as to whether the conditions are coincident with each other or not (4302). If the conditions are coincident with each other, management operation execution is carried out upon the operation table (3607) and then next control conversion is carried out (3612). If the conditions are not coincident, the control table of the condition not-coincidence operation existing in the control information is made the next control table of the sequence table (4303) and operation execution is carried out again (3404).

Finally, a process (3611) in the case where the control type is "RESPONSE" will be explained. In this case, a message of response to the management application is returned as response of the requested action to the management application by using a response parameter in the sequence table. Thereafter, the value in the response parameter is released. Then, a transition process is carried out.

The aforementioned processing is processing sequence initialization.

Figure 44:
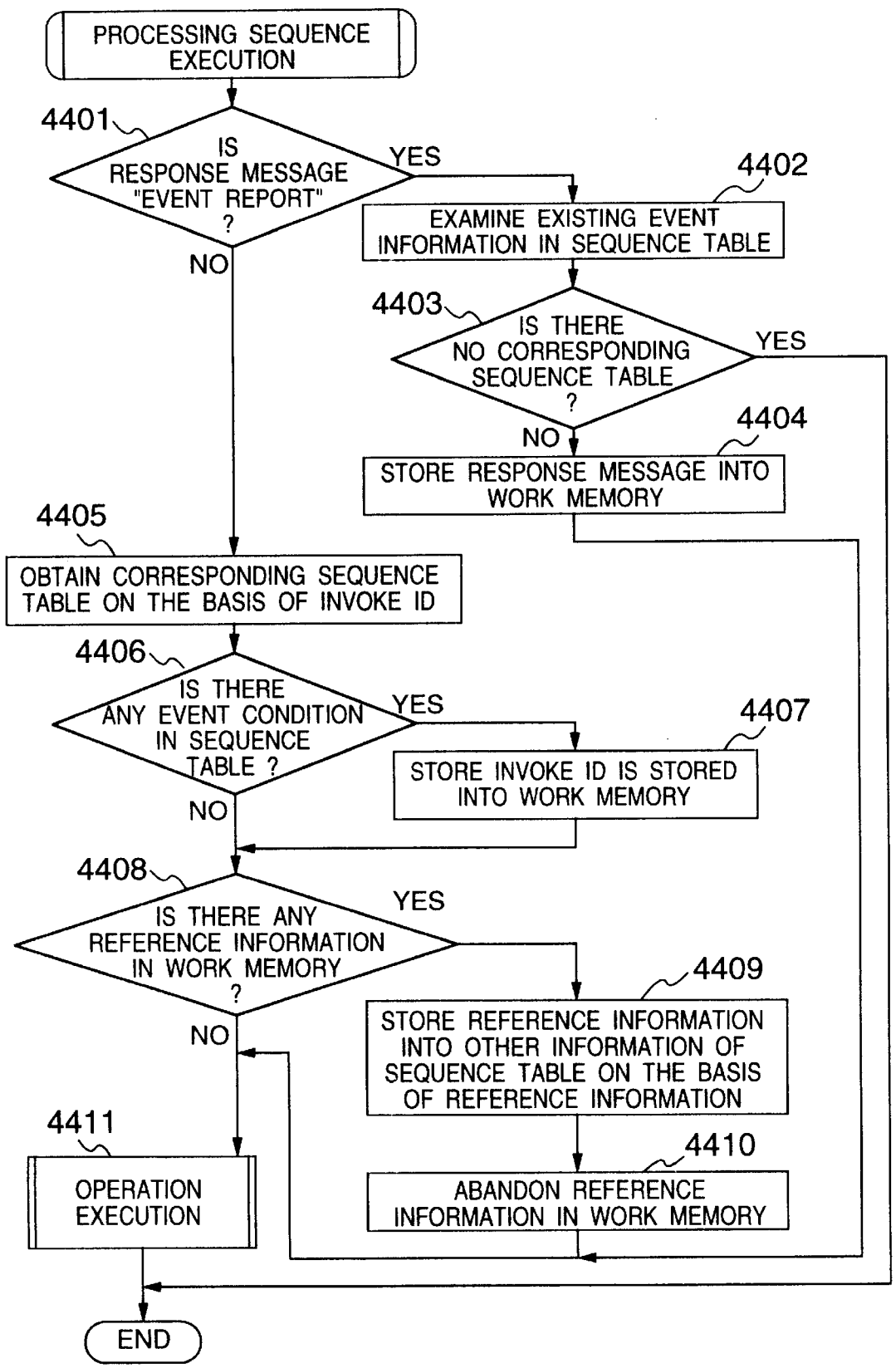
FIG. 44 is a flow chart of processing sequence execution which is a part of the processing sequence execution portion.
Figure 45:
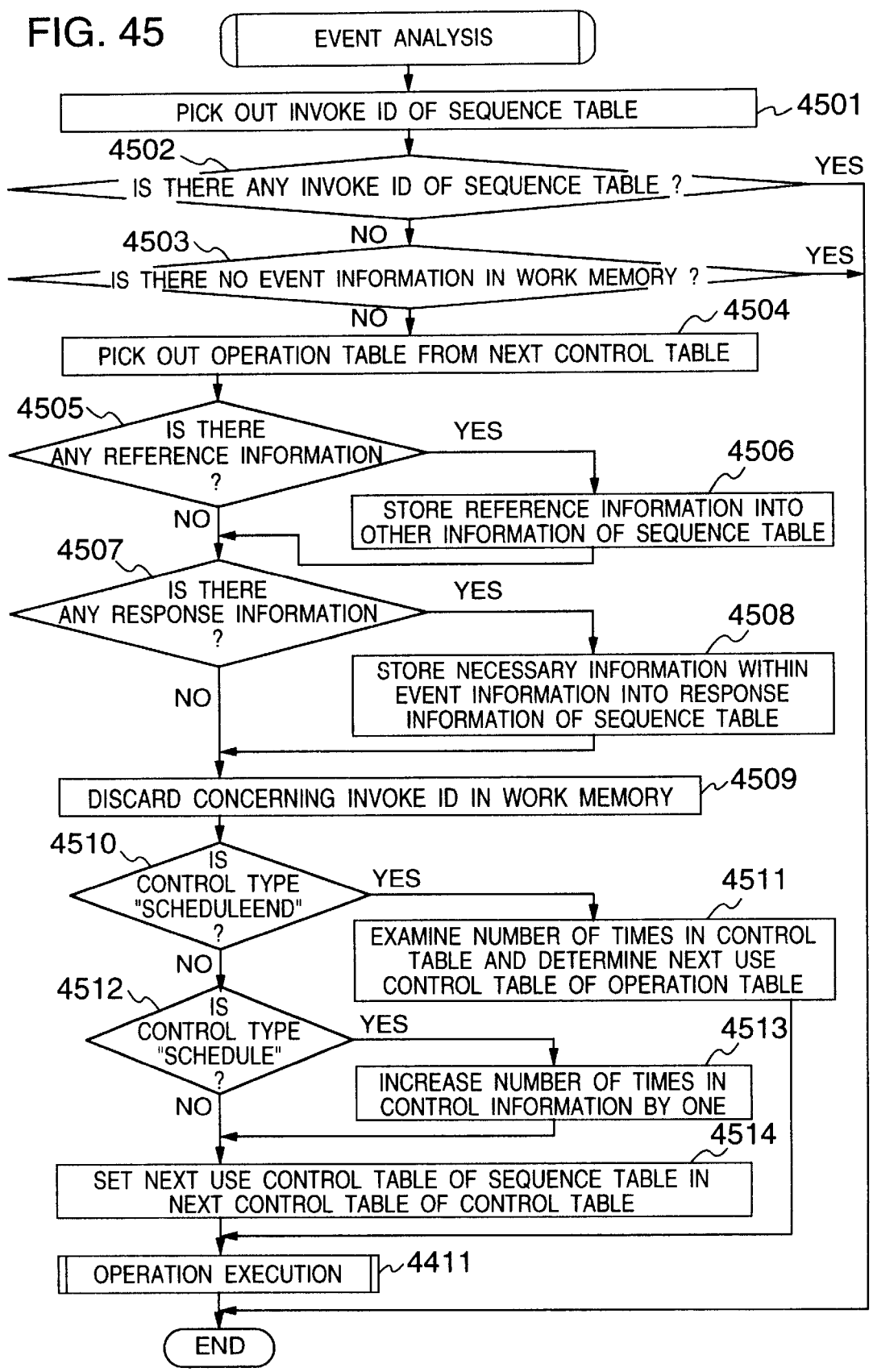
FIG. 45 is a flow chart of event analysis.

Next, processing sequence execution (3308) which is a process with respect to response from the managed object will be explained. FIG. 44 is a flow chart of the processing sequence execution. First, examination is made as to whether the received message is EVENT or not (4401). If the message is EVENT, the event condition stored in the sequence table is collected (4402) and a judgment is made, on the basis of the reported managed object and event type, as to whether the event satisfies the event condition or not (4403). If there is some event satisfying the event condition, the received event information is stored into the work memory (4404) and operation execution is performed for the next use control table of the sequence table. If there is no event satisfying the event condition, the received event is neglected as an unnecessary one. If the received message is not EVENT, a corresponding sequence table is obtained on the basis of the invoke ID (4405). If there is any event condition in the sequence table (4406), the invoke ID is stored into the work memory (4407). Then, a judgement is made as to whether there is any reference information in the work memory or not (4408). If there is some reference information in the work memory, the reference information is stored in other information of the sequence table on the basis of the reference information (4409). Then, the reference information in the work memory is abandoned (4410). Thereafter, operation execution is performed (4411). The operation execution is a process for executing the transition of operation or operation to the real managed object by using the operation table and control table. This process is substantially the same as that explained above in the processing sequence initialization with reference to FIGS. 36 to 43. This process is however different only in the event analysis in the operation execution in FIG. 37. FIG. 45 is a flow chart of the event analysis in the operation execution. This is a process in the case where the operation type of the operation table is EVENT. First, the invoke ID of the sequence table is picked out (4501) and examination is made as to whether the invoke ID is contained in the work memory or not (4502). If there is no invoke ID in the work memory, the process is terminated because response in the previous process has not been come yet. If there is the invoke ID in the work memory, examination is made as to whether there is any event in the work memory or not (4503). If there is no event in the work memory, the process is terminated because event information is not received only response in the previous process is received. If there is any event information in the work memory, the operation table is picked out from the next control table (4504). Here, examination is made as to whether there is any reference information or not (4505). If there is some reference information, the reference information is stored into other information of the sequence table (4506). Further, examination is made as to whether there is any response information or not. If there is some response information, corresponding information in the event is stored into the response information of the sequence table (4508). Then, the referred invoke ID in the work memory is abandoned (4509). Further, a control table corresponding to the operation table is obtained and the operation type thereof is examined (4510). If the control type is SCHEDULEEND, the number of times in the control table is examined to determine the next use control table of the operation table (4511). If the control type is SCHEDULE, the number of times to control other information of the sequence table is increased by one (4512, 4513). Further, the sequence table is set in the next control table of the control table (4514). Thereafter, operation execution is performed (4411).

As described above, processing sequence execution is performed. By repeating this, the processing sequence execution portion 123 can execute an operation in accordance with the processing sequence.

Figure 46:
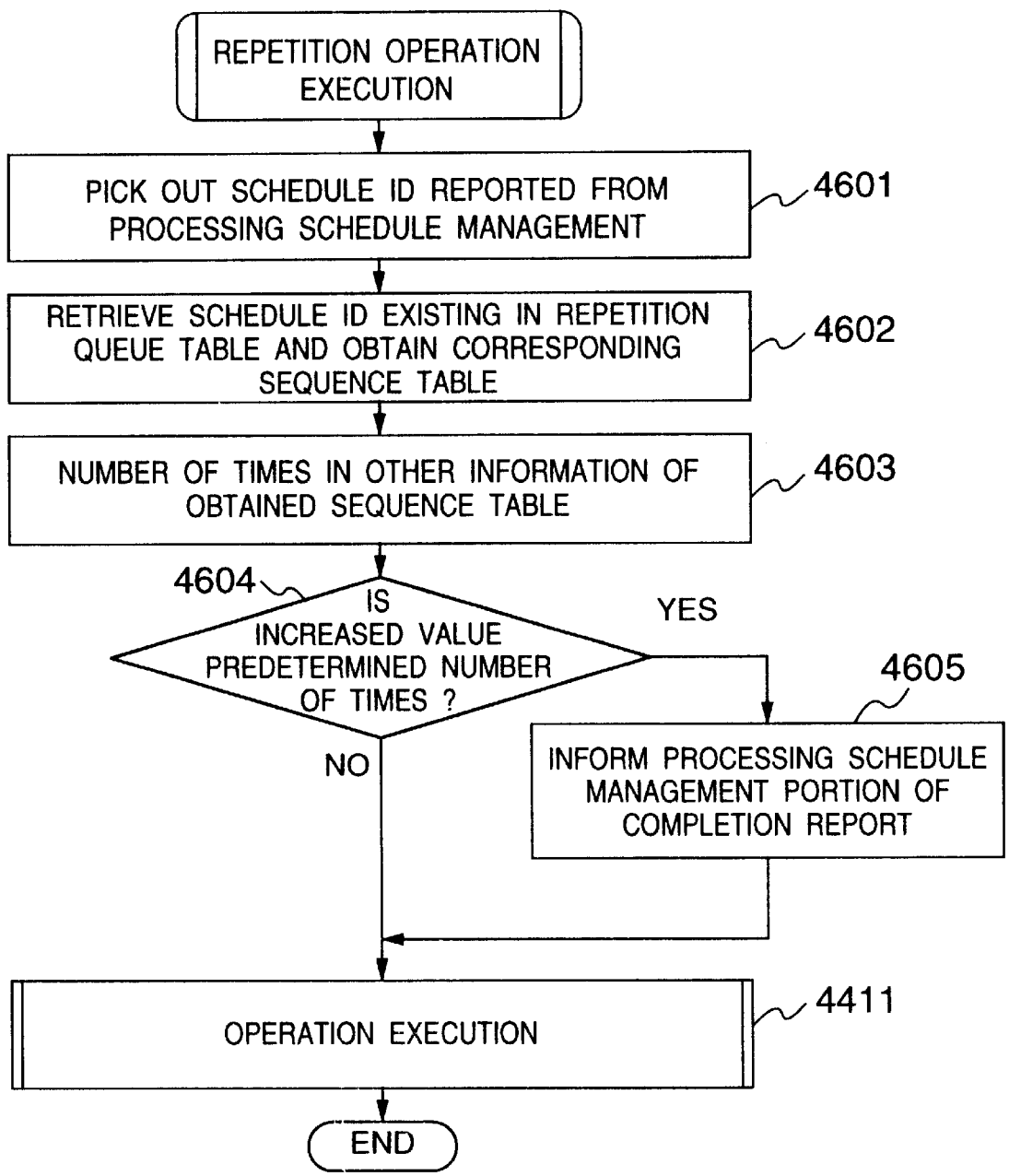
FIG. 46 is a flow chart of repetition operation execution which is carried out by the processing sequence execution portion when a report is received from the processing schedule management portion.

Finally, the repetition operation execution (3310) which is performed on the basis of the report from the processing sequence execution portion 123 will be explained. FIG. 46 is a flow chart of the repetition operation execution. In this case, the schedule ID reported from the processing schedule management portion 124 is picked out (4601). Then, the schedule ID in the repetition queue table is retrieved to obtain the sequence table subjected to the repetition queue (4602). The number of times in other information of the obtained sequence table is increased by one (4603). If the number of times reaches a predetermined value (4604), the processing schedule management portion 124 is informed of the completion of the repetition operation (4605) and operation execution is performed (4411). By the aforementioned processing, the processing sequence execution portion executes a periodic repetition operation correspondingly to the request from the application.

Figure 47:
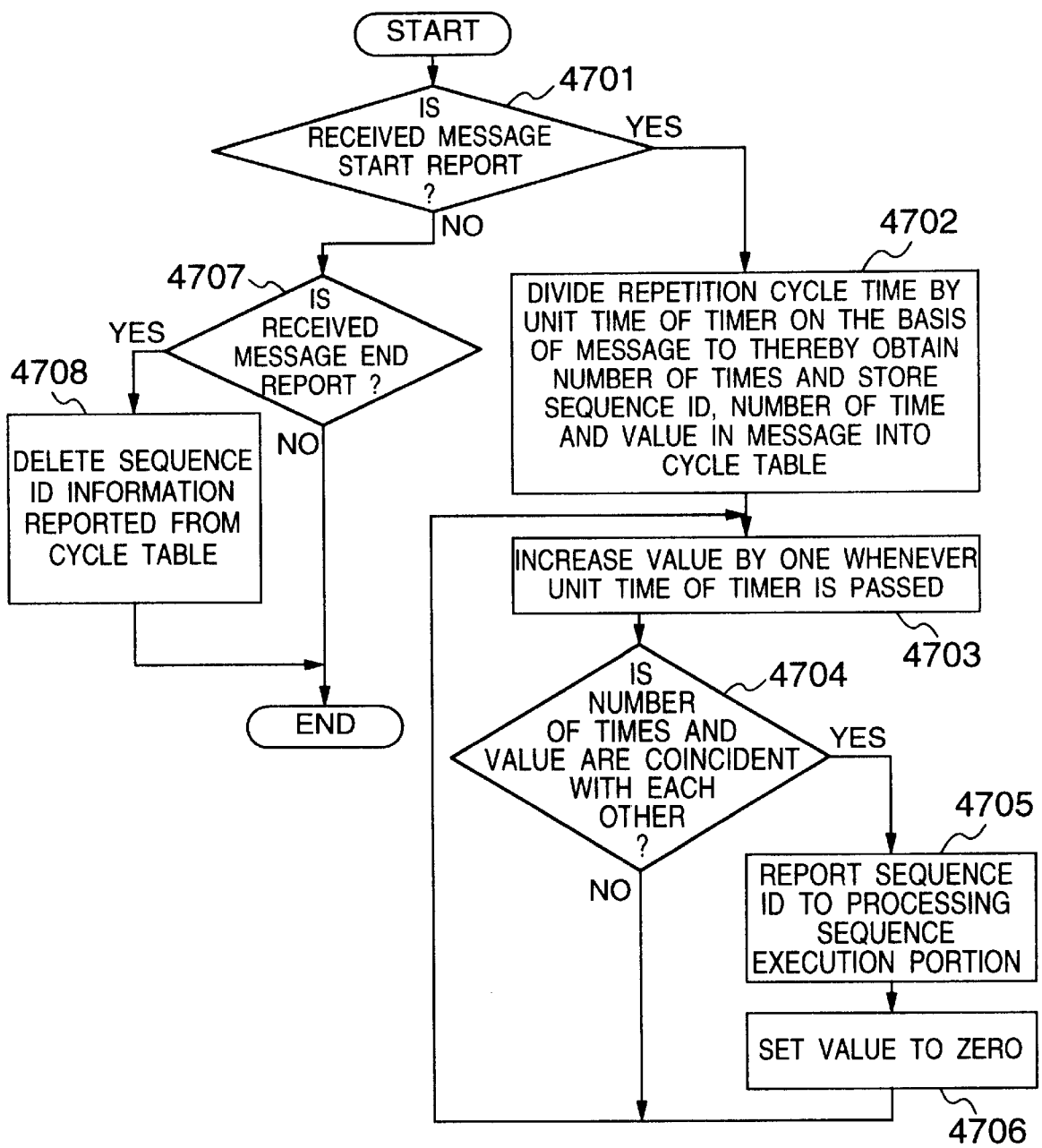
FIG. 47 is a flow chart of a processing schedule management portion.

As the last explanation of this embodiment, the operation of the processing schedule management portion 124 informed of the start and end of the repetition operation from the processing sequence execution portion 123 will be explained with reference to the flow chart of FIG. 47.

When upon reception report from the processing sequence execution portion 123, the processing schedule management portion 124 judges whether the report is a start report or an end report (4701). If it is a start report, the sequence ID, the schedule ID and the number of cycle times in the reported message are set into a cycle table (4801) containing as a list, a sequence ID (4802), a value (4803) of the number of times obtained by dividing the repetition cycle time by a certain unit time and an actual value (4804) of the number of times, as shown in FIG. 48, the actual number of times being set to zero (4702). Further, time is monitored periodically so that the actual number of times is increased by one whenever one unit time is passed (4703). If the number of cycle times is coincident with the actual number of times, the processing schedule management portion reports the schedule ID to the processing sequence execution portion (4704, 4705). Then, the actual number of times is set to zero (4706). On the other hand, if an end report is delivered from the processing sequence execution portion (4707), an item in the cycle table corresponding to the reported schedule ID is deleted (4708). By the aforementioned process, processing can be reported to the processing sequence execution portion 123 periodically.

By the structure and operation explained above, the processing sequence can be described as a list of operations. Further, even in the case where processing is changed, it is possible to change the processing easily without any change of the execution portion because the description is retrieved correspondingly to the request.

Embodiment 2

In the following, an embodiment in which an operation control table or an operation table is developed in advance to thereby increase processing speed at the time of requesting of an operation, will be explained as a second embodiment of the present invention by referring to FIGS. 49 through 54.

Figure 50:
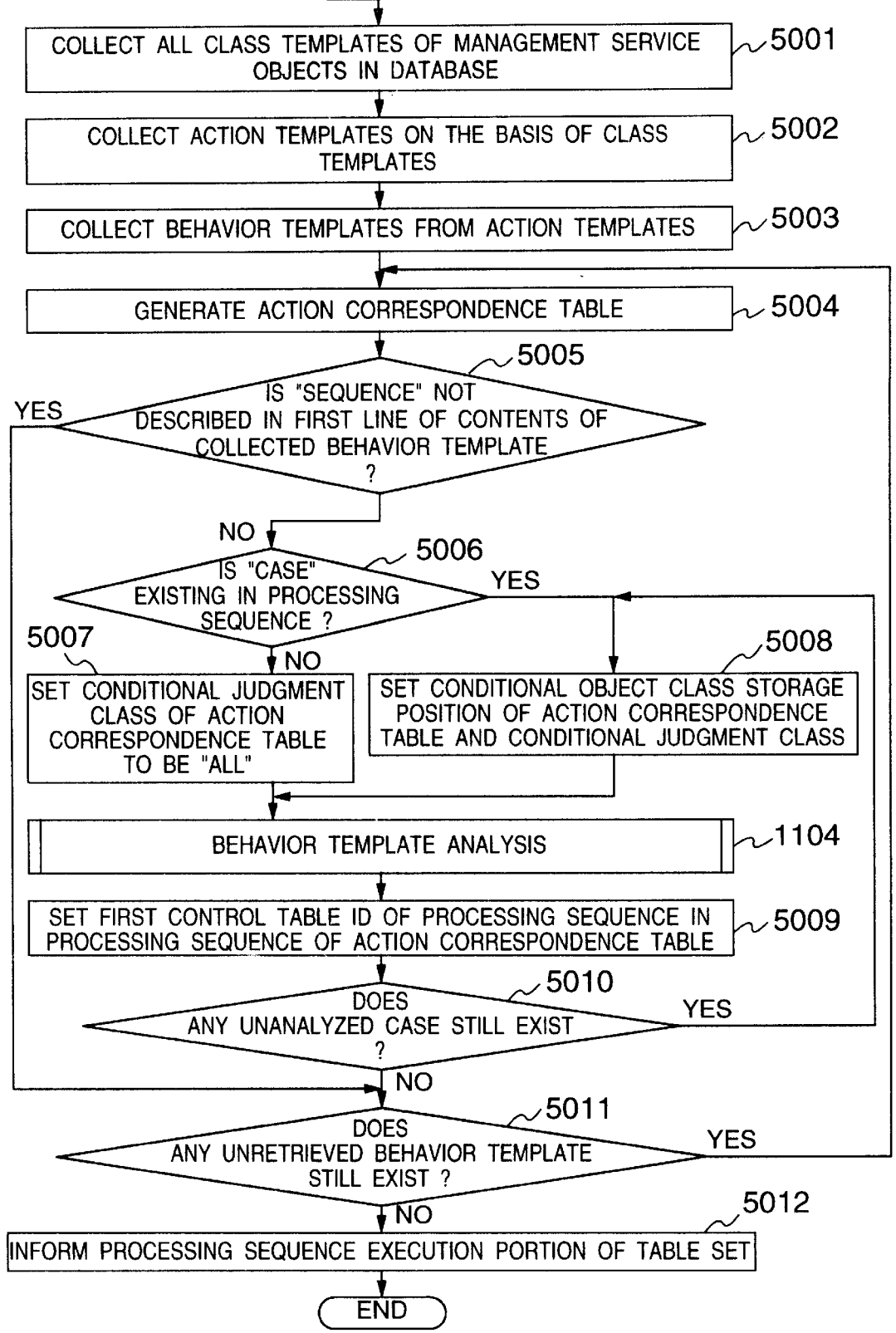
FIG. 50 is a flow chart of a process for generating the action correspondence table.

The system configuration in this embodiment is similar to that in the first embodiment. Further, the method of description in which management services are described as managed objects is similar to that in the first embodiment. With respect to the described object, the internal table generating portion 122 first collects objects concerning the processing sequence from the database 13, generates an action correspondence table necessary for obtaining the correspondence between the action type of the managed object class and the processing sequence as shown in FIG. 49, and generates a control table and an operation table explained above in the first embodiment. Here, the action correspondence table (4901) contains the object class (4902) of management service and the action type (4903). Further, the action correspondence table (4901) also has a parameter structure for response to the management application (4904). Further, the action correspondence table (4901) also contains information for designating necessary conditional object class storage positions to achieve the distribution of the processing sequence by "CASE" (4905). Further, the table (4901) has, as conditional judgment information, the conditional judgment class (4906) and the first control table (4907) of the processing sequence corresponding to the condition. FIG. 50 is a flow chart showing the internal table generating portion 122 for generating such a table.

When the system is first started up, the internal table generating portion 122 is operated. Here, object class templates of management service objects containing a processing sequence are first collected (5001). Then, package templates are collected on the basis of the class templates and action templates described in the package templates are collected (5002). Then, behavior templates designated in respective action templates are obtained (5003). Then, an action correspondence table is generated so that the managed object class name in which action is described and the action type are set. Further, an ASN.1 syntax to be referred to at the time of response from the correspondence action templates is retrieved from the database and stored, as a response parameter, in the action correspondence table (5004). Then, a judgment is made as to whether "SEQUENCE" indicating the description of the processing sequence is described in the first line of the obtained behavior template or not (5005). Then, a judgment is made as to whether "CASE" exists in the behavior template or not (5006). If there is no "CASE" in the behavior template, the process judgment class of the action correspondence table is set to "ALL" (5007). If "CASE" exists in the behavior template, the position of storage of a request parameter from the user application of the object class described after "CASE" for judgment is set to the conditional object class storage position of the action table. Further, class templates are collected from the database on the basis of the class name described in the operation description, and the object identifier of the object class is set to the processing judgment class of the action correspondence table (5008). Here, if there are a plurality of object classes designated, a combination of a processing sequence and a processing judgment class is generated for each of the object classes. Further, if "OTHER" is described after the "CASE" statement, the processing judgment class is set to "OTHER". After the conditional judgment class of the action correspondence table is set, behavior template analysis explained above in the first embodiment is performed to generate an operation table and a control table (1104). The first operation control table ID of the processing sequence obtained as a result is designated to the processing sequence in the action correspondence table (5009). Further, a judgment is made as to whether unanalyzed CASE still exists in the behavior template which is being currently analyzed on the basis of CASE or not (5010). If YES, the aforementioned process is repeated. The aforementioned process is repeated upon all management service objects in which management services are described as managed objects (5011). When the process for all management service objects is completed, the internal table generating portion 122 delivers an end report and a generated table set to the processing sequence execution portion 123 (5012).

Figure 51:
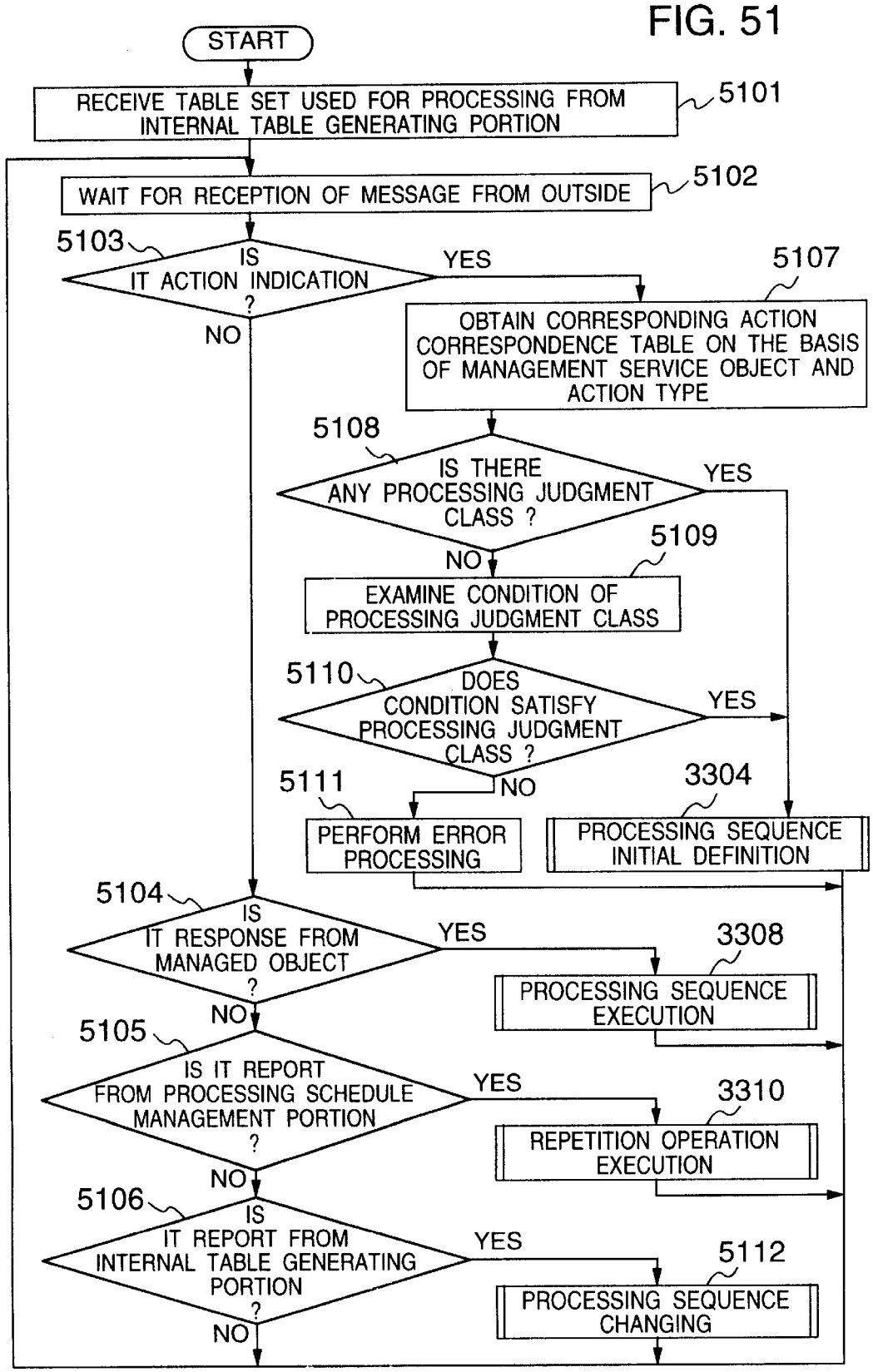
FIG. 51 is a flow chart of processing sequence execution using the action correspondence table.

Next, the execution of the processing sequence by the management application or user operation will be explained below. FIG. 51 is a flow chart of the execution of the processing sequence.

First, the processing sequence execution portion 123 receives all tables from the internal table generating portion 122 (5101) and then waits for reception of a massage from the outside (5102). Upon reception of a message, the processing sequence execution portion 123 judges where the message came from (5103–5106) and performs processing corresponding to the transmission source.

First, processing in the case of an action request from the management application will be explained. In this case, the processing sequence execution portion 123 obtains a corresponding action correspondence table on the basis of the requested processing object class and the action type (5107). Then, examination is made as to whether there is any conditional judgment class information of the processing sequence in the obtained action correspondence table or not (5108). If YES, the position where the judgment class in an action parameter is stored is identified (5109) and the class information in the position is compared with the judgment information (5110). If there is nothing coincident, the process is terminated as an error (5111). If there is something coincident, a processing sequence corresponding to the condition is obtained so that the first control table can be identified. Thereafter, processing sequence initialization explained above in the first embodiment is performed (3304). A process (3308) for a response message thereafter from a managed object and a process (3310) for a report from the processing schedule management portion 124 are similar to that explained in the first embodiment. If there is a report from the internal table generating portion 122 to change the processing sequence or add a processing sequence (5106), a processing sequence changing process is carried out (5112).

Figure 52A:
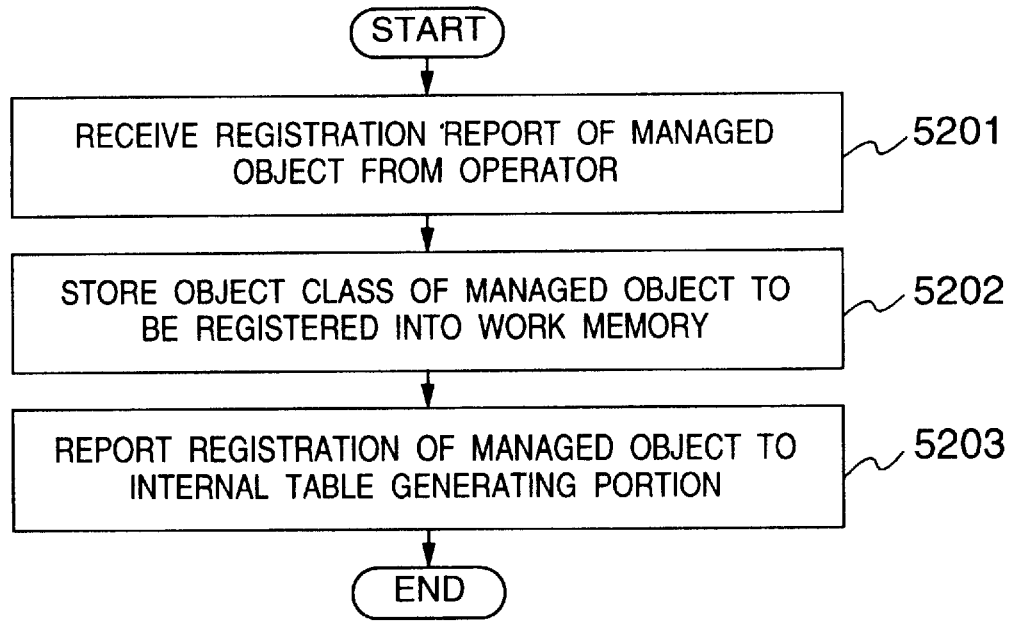
FIGS. 52A and 52B are flow charts of a processing sequence changing process in the template management portion and the internal table generating portion.
Figure 52B:
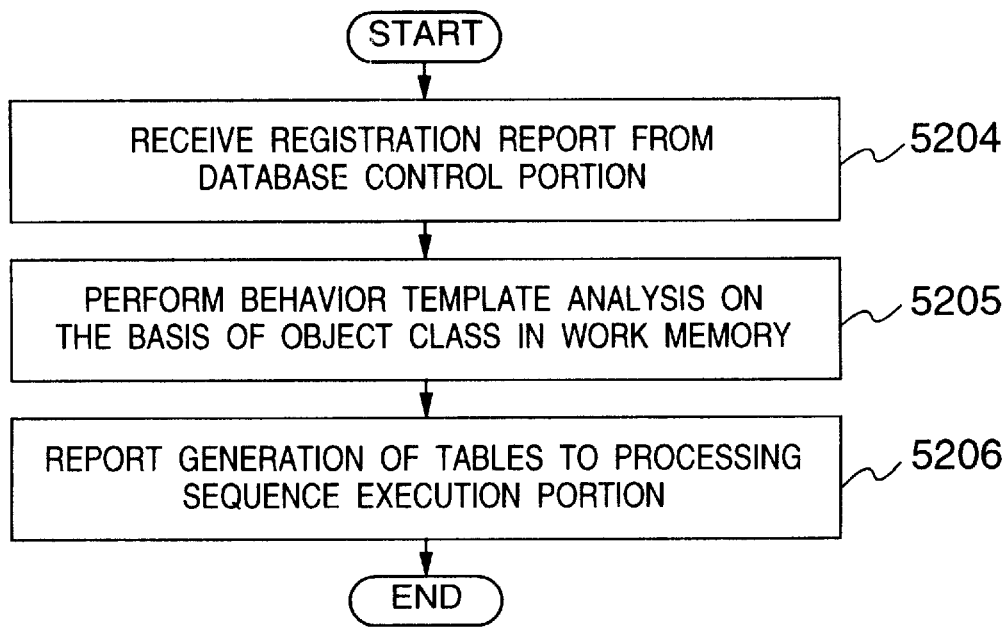
Figures 53, 54:
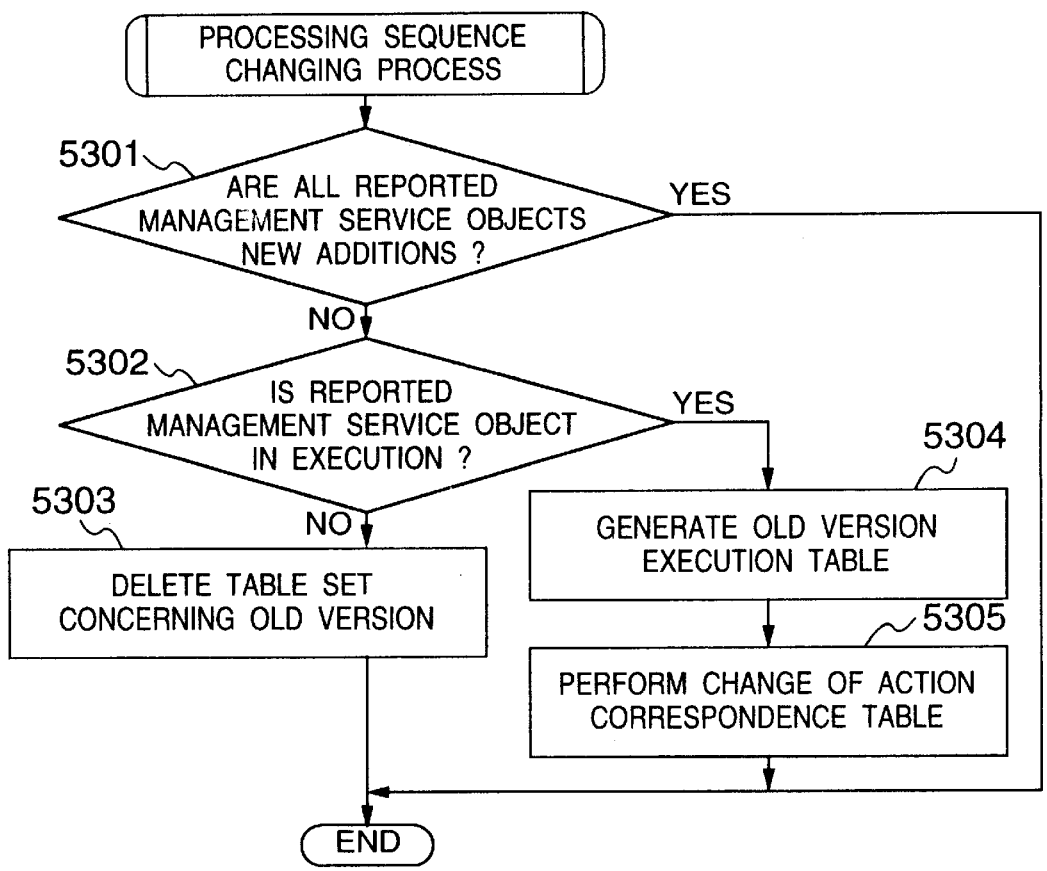
FIG. 53 is a flow chart of the processing sequence changing process.
FIG. 54 is an old version execution table showing the correspondence between the sequence table ID and the processing sequence start table.

FIGS. 52A and 52B are flow charts of a dynamically processing addition/change process. First, upon reception of an addition/change report to store GDMO defined by the operator into the database, the database control portion stores the GDMO in the database on the basis of the reported file name (5201). In this occasion, the database control portion stores the object identifier of the class of the template to be stored into the work memory (5202). Then, after the storage, the database control portion reports the change of the internal table generating function to the internal table generating portion 122 (5203). When the change is reported, the internal table generating portion 122 takes out the object identifier of the class in the work memory (5204) and performs development to the same table that as in the case of starting up on the basis of the object identifier (5205). When the internal table generating portion 122 generates all tables with respect to the processing object subjected to the change/addition report, the change report is delivered to the processing sequence execution portion 123 (5206). Upon reception of the change report, the processing sequence execution portion 123 carries out a processing sequence changing process (5112). FIG. 53 is a flow chart of the processing sequence changing process. In this process, first, examination is made as to whether the reported management service object indicates the change of the processing sequence or not (5301). If the change of the processing sequence is indicated, examination is made as to whether the changed processing sequence is used in any processing sequence which is being operated or not (5302). If the changed processing sequence is not used, the information of an old version is deleted from the action correspondence table. Further, the control table and operation table concerning the processing sequence of an old version are deleted (5303). If the changed processing sequence is used in the processing sequence which is being operated, an old version execution table (5401) in which the sequence table ID (5402) executed in an old version and the first control table (5403) of the control table concerning the version are stored is generated as shown in FIG. 54 so that various kinds of information are set in the old version execution table (5304). Further, the change point of the action correspondence table is changed (5305). Further, the processing sequence execution portion 123 waits for reception of a message.

Thereafter, the processing sequence which is being operated is terminated as it is on the basis of the control table of an old version so that a processing sequence of a new version is executed when a new request is given. After the processing sequence of an old version is entirely terminated, information of an old version is deleted from the action correspondence table. Further, the control table and operation table concerning the processing sequence of an old version are deleted.

By the aforementioned structure and operation, development is not required at the time of execution because the operation table is developed in advance.

Embodiment 3

An embodiment in which an operation control table or an operation table is developed as a program to increase processing speed at the time of requesting an operation will be explained as a third embodiment of the present invention with reference to FIGS. 55 through 59.

Figure 55:
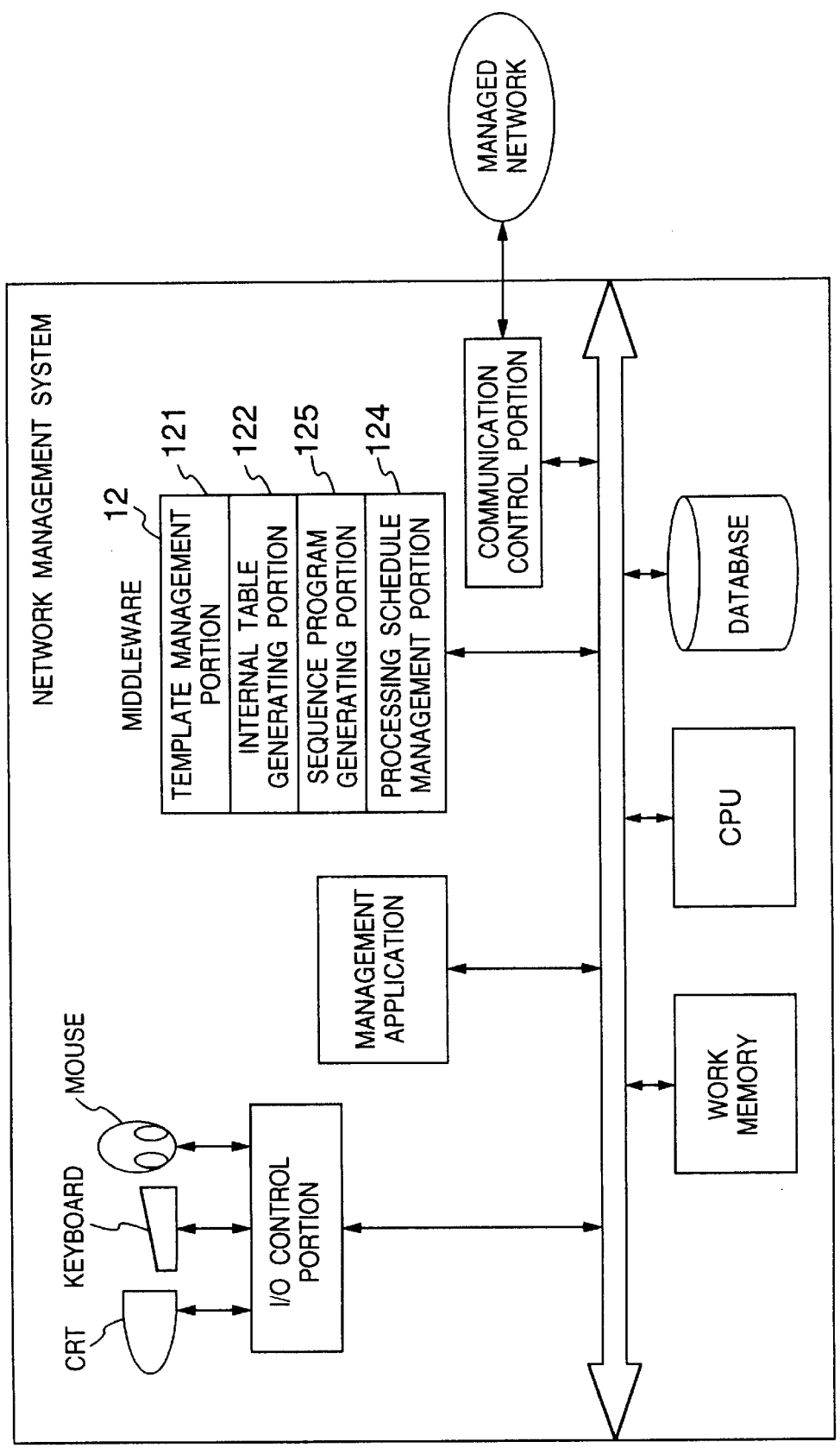
FIG. 55 is a configuration view of a network management system in which a sequence program is generated on the basis of the description of the behavior template.

As shown in FIG. 55, the system configuration of this embodiment is similar to the configuration of the first embodiment. This embodiment is however different from the first embodiment in that the middleware 12 in this embodiment is composed of a template management portion 121, an internal table generating portion 122, a sequence program generating portion 125, and a processing schedule management portion 124. The method of description in which management services are described as managed objects is the same as in the first embodiment.

The sequence program generating portion 125 generates a program on the basis of the table set generated by the internal table generating portion 122 through the process explained above in the second embodiment. In this case, the generated table set is defined as a constant. For example, FIG. 56 shows an example of the configuration of various kinds of tables in development to C program language. In this example, the action correspondence table, the operation table, the control table and the sequence table are set as structures respectively (5602–5605). Information such as operation type in which the content thereof is restricted in advance is provided as a definition statement (5601). Therefore, these kinds of generally used information are defined as structures, so that a process of setting values in tables generated by using these structures is generated as first definition functions. When these functions are added to a program obtained by coding the process explained in the second embodiment, a program for executing a processing sequence is generated.

Figure 57A:
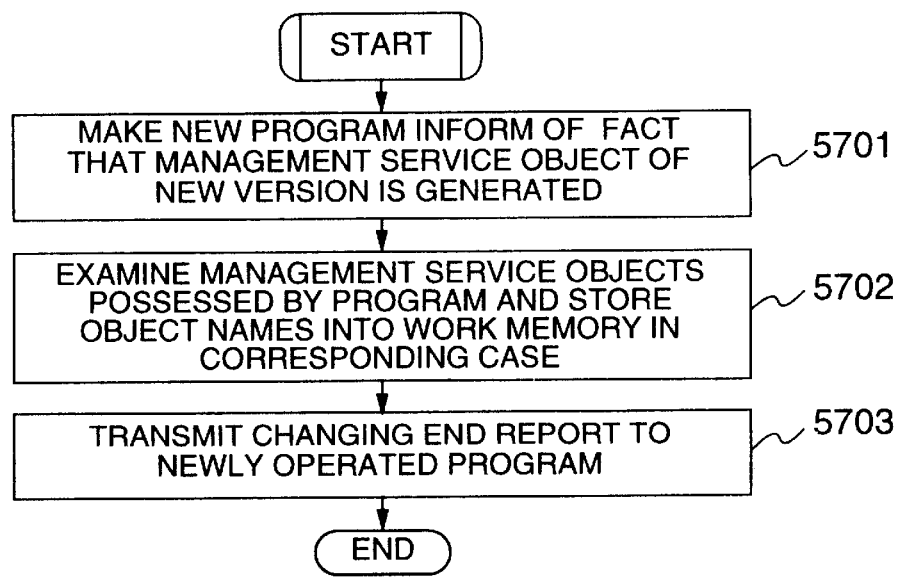
FIGS. 57A and 57B are flow charts of a process in the case where an execution file is changed.
Figure 57B:
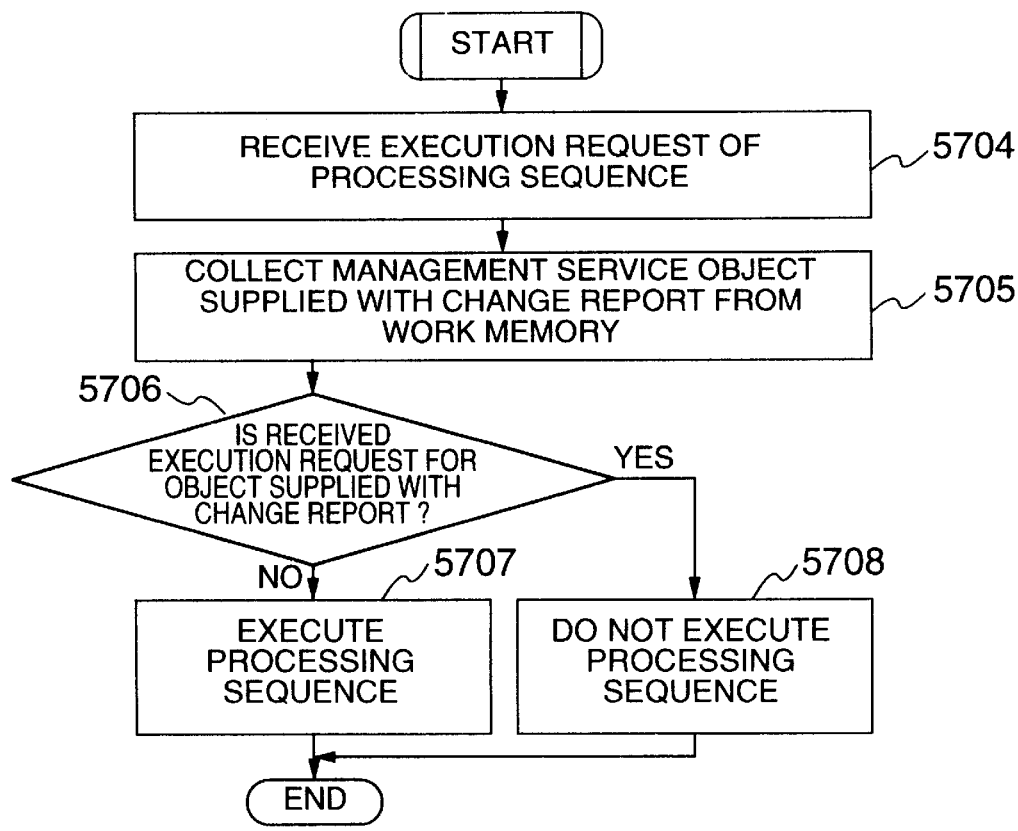

Further, a process in the case where the execution file is changed will be explained below with reference to FIGS. 57A and 57B. This is the case where a management service object generated as a program which is generated and being executed as the same management service object in the past. First, when a program for achieving a new process is operated, the process which has been executed receives the fact that a management service object of a new version is generated from the new processing program (5701). In this occasion, the program which is executed up to now examines management service objects possessed by the program, so that corresponding management service objects are stored into the work memory (5702). Then, a management service object processing end report is transmitted to the newly operated program (5703). The newly operated program accepts action requests to the management service objects after the reception of the report. When an action report to a management service object is received by the previously operated program (5704), management service objects subjected to the change report are first collected from the work memory (5705). Then, examination is made as to whether the received action request is that which has been informed of the change report or not (5706). If NOT as a result, the processing sequence is executed (5707). If YES, on the contrary, the process is terminated without execution of the processing sequence (5708). By the aforementioned process, the change of the processing sequence is performed without stopping of the program. If there is some change of the content of processing of the management service object in these processes, a reporting process for the execution program for the existing management service object is generated as a program.

A process of generating a program for executing a processing sequence provided by management service objects by taking the aforementioned table definition and the changing process in the program will be explained below.

Figure 58:
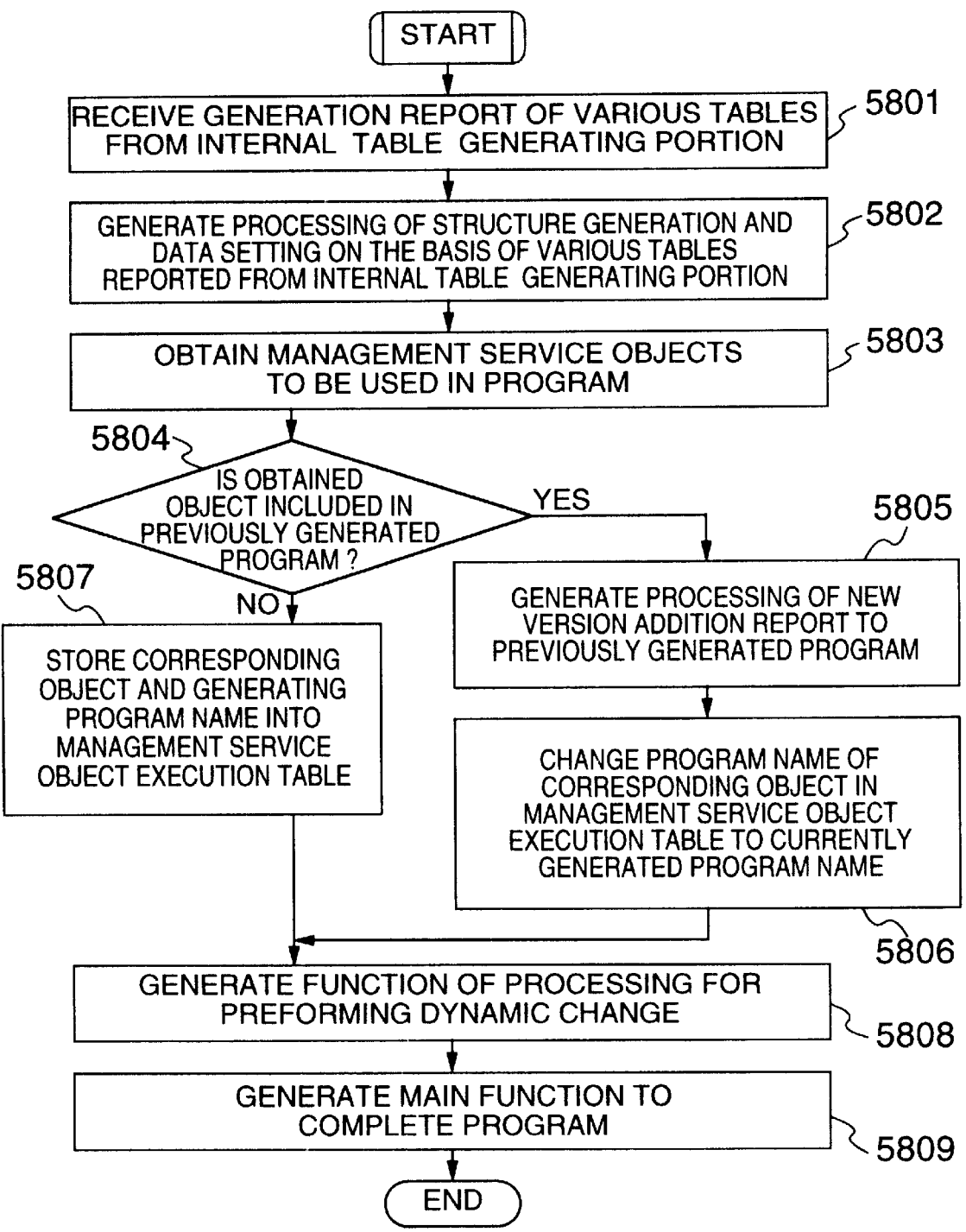
FIG. 58 is a flow chart of the method of generating a program executing a processing sequence.

First, when management service objects are registered, the process explained in the second embodiment is carried out by the internal table generating portion 122 on the basis of the registered information. After the process is completed, the end of the process is reported to the program generating portion. Upon reception of the report, the program generating portion generates a program for executing the processing sequence. FIG. 58 is a flow chart of this processing.

Upon reception of the report from the internal table generating portion 122 (5801), actual structures corresponding to the respective numbers of operation tables, control tables and action correspondence tables are first generated as initial definition. Then, the program generating portion generates the setting of respective data in the generated table set as an initial function (5802). Further, the program generating portion obtains a management service object set used in the program (5803). Further, the program generating portion examines whether the program currently generated is subjected to the processing change or not by using the management service object execution correspondence table (5901) indicating the correspondence between the object class (5902) of the management service object as shown in FIG. 59 and the program (5903) possessed by the program generating portion (5804). If YES, the program generating portion generates a process of reporting the changed management service object set to the program using the object (5805). Further, the program name of the changed object in the management service object execution table is changed to the program name of the currently generated program (5806). If the currently generated program is new, the program generating portion stores the object class of the management service object and the program name into the management service object execution table (5807). Thereafter, the program generating portion generates as a function the process of dynamic change explained above with reference to FIGS. 57A and 57B (5808). Further, the program generating portion adds the process shown in the second embodiment to these processes as a main function to thereby generate a management service object program (5809).

By the aforementioned structure and process, processing contents described as a list of management operations can be generated as a program automatically. Further, even in the case where the program is a program for changing management objects used by the existing program, the processing change can be performed dynamically without the necessity of reconfiguration of the program.

We claim:

1. A method of providing management services in a communication network management system for carrying out a management operation on constituent managed objects constituting a communication network, comprising the steps of:

storing in a storage means a management operation set file in which at least one said management operation to be applied to said managed objects is described in a time series as a combination of parameters and information sources for setting parameter values, in addition to predefined behavior information of said managed objects;

obtaining specified individual information according to an executed management operation of said management operation set file, and analyzing results of the operation to derive header information, used to make real parameters for a management operation, or response information, from said predefined behavior information, when a request operation is received from a management application or operator;

creating a common table consisting of individual information for executing management operations and for analyzing results thereof;

making a sequence table containing an index for indicating said common table and sequence indexes indicating sequence numbers of said management operations; and operating each management operation in real time based on said common table, and executing the required management operation sets in real time based on said sequence tables, according to said request operation.

2. A method of providing management services in a network management system according to claim 1, further comprising the steps of:

performing the obtaining, analyzing, creating, and making steps when said communication network management system is started up;

making said real parameters preliminarily before arrival of said request operation; and performing said operating step by referring to said preliminarily generated real parameters in response to arrival of said request operation.

3. A method of providing management services in a network management system according to claim 1, wherein:

said managed objects are defined as managed objects based on object-orientation by using GDMO (Guidelines for the Definition of Managed Object) defined in OSI (Open Systems Interconnection) management; and said management operation set file is constituted by data obtained by listing parameter sets in an order of time series, said parameter sets concerning said management operation provided as management services to said managed objects, said management services being defined on a basis of object-orientation.

4. A method of providing management services in a network management system according to claim 3, further comprising the steps of:

generating a table that is different from a table for a management service that already exists, in response to a request to change said management services to be provided to said managed objects in a condition in which processing of the table for the management services that already exists is being executed; and executing processing of said different table in response to arrival of a start request based on contents of table sets obtained by said generating step.

5. A method of providing management services in a network management system according to claim 4, wherein in a change of changed management service:

table sets corresponding to said changed management services are generated as table sets other than said table sets corresponding to said management services before changed; and said table sets corresponding to said management services before changed are deleted after execution of said existing management service is completed.

6. A method of providing management services in a network management system according to claim 3, further comprising the steps of:

generating in advance a function program equivalent to a set of management operations constituted by CMIS (Common Management Information Services) which are elements of said GDMO;

generating a set of tables constituted by a set of parameters to be delivered to said function program, on a basis of a list of said set of management operations described as behavior; and generating a source file of a program for executing said set of management operations by combining said generated set of tables and said function program.

7. A method of providing management services in a network management system according to claim 6, further comprising the step of additionally inserting, into said source file, a step of transmitting a report indicating a fact that a first execution file is generated newly to a second execution file already executing a set of management operations before start-up of said first execution file when contents of said first execution file are gained by modification of said second execution file; and a step of suppressing execution of said first execution file in response to said transmitting until said second execution file executes said set of management operations completely.

8. A network management system, comprising:

template management means for providing characteristic information of managed objects and management services as templates to be managed by using a database for a file in which a set of management operations are described;

internal table generating means for generating tables that include information necessary for execution of real operations by obtaining the information of operated managed objects from the database; and processing sequence execution means for identifying a management service requested from a management application or from an operator, executing each management operation based on said tables, analyzing the response to said management operation, and generating result information concerning said request.

* * * * *